United States Patent
Klier et al.

(10) Patent No.: US 9,547,246 B2
(45) Date of Patent: *Jan. 17, 2017

(54) AQUEOUS DISPERSIONS FOR USE AS TONERS

(75) Inventors: John Klier, Midland, MI (US); Richard D. Varjian, Kirkland, WA (US); Alastair S. Hill, Schonenberg (CH); Timothy J. Young, Bay City, MI (US); Richard A. Lundgard, Midland, MI (US); Michael J. Johnson, Midland, MI (US); Qichun Wan, Midland, MI (US); Matthew J. Kalinowski, Freeland, MI (US); Mechelle A. Churchfield, Midland, MI (US); Gary M. Strandburg, Mount Pleasant, MI (US); David J. Magley, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 700 days.

This patent is subject to a terminal disclaimer.

(21) Appl. No.: 12/635,565

(22) Filed: Feb. 25, 2010

(65) Prior Publication Data
US 2010/0143837 A1    Jun. 10, 2010

Related U.S. Application Data

(63) Continuation-in-part of application No. 11/712,206, filed on Feb. 28, 2007, now Pat. No. 8,007,978.
(Continued)

(51) Int. Cl.
*G03G 9/12* (2006.01)
*G03G 9/09* (2006.01)
(Continued)

(52) U.S. Cl.
CPC ............ *G03G 9/0926* (2013.01); *G03G 9/081* (2013.01); *G03G 9/0806* (2013.01);
(Continued)

(58) Field of Classification Search
CPC ............ G03G 9/08755; G03G 9/08797; G03G 9/0804; G03G 9/08795; G03G 9/08
See application file for complete search history.

(56) References Cited

U.S. PATENT DOCUMENTS 2,297,691 A    10/1942    Carlson
3,590,000 A    6/1971    Palermiti et al.
(Continued)

FOREIGN PATENT DOCUMENTS

EP    1748320    1/2007
EP    1722277    8/2009
(Continued)

OTHER PUBLICATIONS

Supplementary EPO Search Report, EPO Application No. 07752242.3, Dated—Feb. 8, 2011.
(Continued)

*Primary Examiner* — Michael A Salvitti

(57) ABSTRACT

A compound that includes an aqueous dispersion, wherein the dispersion includes a thermoplastic resin and at least one stabilizing agent, and at least one selected from the group consisting of a colorant and a magnetic pigment, wherein the dispersion has an average volume diameter particle size from about 0.05 to about 10 microns is described.

11 Claims, 1 Drawing Sheet

Related U.S. Application Data

(60) Provisional application No. 60/779,128, filed on Mar. 3, 2006.

(51) Int. Cl.
| | |
|---|---|
| *G03G 9/08* | (2006.01) |
| *G03G 9/083* | (2006.01) |
| *C08K 5/00* | (2006.01) |
| *C08K 11/00* | (2006.01) |
| *C08L 33/06* | (2006.01) |
| *C08L 67/02* | (2006.01) |

(52) U.S. Cl.
CPC ......... *G03G 9/0815* (2013.01); *G03G 9/0831* (2013.01); *G03G 9/0832* (2013.01); *G03G 9/0833* (2013.01); *G03G 9/09* (2013.01); *C08K 5/005* (2013.01); *C08K 11/00* (2013.01); *C08L 33/06* (2013.01); *C08L 67/02* (2013.01)

(56) References Cited

U.S. PATENT DOCUMENTS

| | | | |
|---|---|---|---|
| 3,645,992 A | 2/1972 | Elston | |
| 4,076,698 A | 2/1978 | Anderson et al. | |
| 4,599,392 A | 7/1986 | McKinney et al. | |
| 4,816,366 A | 3/1989 | Hyosu et al. | |
| 4,880,432 A | 11/1989 | Egan et al. | |
| 4,988,781 A | 1/1991 | McKinney et al. | |
| 5,100,471 A | 3/1992 | Winnik et al. | |
| 5,213,740 A * | 5/1993 | Fuller | 264/140 |
| 5,272,236 A | 12/1993 | Lai et al. | |
| 5,278,272 A | 1/1994 | Lai et al. | |
| 5,306,590 A * | 4/1994 | Felder | 430/115 |
| 5,501,935 A | 3/1996 | Patel et al. | |
| 5,504,172 A | 4/1996 | Imuta et al. | |
| 5,629,367 A * | 5/1997 | Lofftus et al. | 524/88 |
| 5,677,383 A | 10/1997 | Chum et al. | |
| 5,756,659 A | 5/1998 | Hughes et al. | |
| 5,840,462 A * | 11/1998 | Foucher et al. | 430/137.14 |
| 5,844,045 A | 12/1998 | Kolthammer et al. | |
| 5,869,575 A | 2/1999 | Kolthammer et al. | |
| 5,938,437 A | 8/1999 | DeVincenzo | |
| 5,974,281 A | 10/1999 | Fujii et al. | |
| 6,001,524 A | 12/1999 | Yoon et al. | |
| 6,007,959 A | 12/1999 | Matsuoka et al. | |
| 6,033,817 A * | 3/2000 | Yusa et al. | 430/106.1 |
| 6,068,961 A | 5/2000 | Dutoff et al. | |
| 6,111,023 A | 8/2000 | Chum et al. | |
| 6,130,021 A | 10/2000 | Patel et al. | |
| 6,207,339 B1 * | 3/2001 | Kato et al. | 430/137.15 |
| 6,316,549 B1 | 11/2001 | Chum et al. | |
| 6,432,605 B1 | 8/2002 | Yoon | |
| 6,448,341 B1 | 9/2002 | Kolthammer et al. | |
| 6,455,636 B2 | 9/2002 | Sanada | |
| 6,477,348 B2 | 11/2002 | Miyamoto et al. | |
| 6,521,679 B1 * | 2/2003 | Okada et al. | 523/336 |
| 6,538,070 B1 | 3/2003 | Cardwell et al. | |
| 6,566,446 B1 | 5/2003 | Parikh et al. | |
| 6,894,090 B2 * | 5/2005 | Shinzo et al. | 523/223 |
| 7,161,612 B2 | 1/2007 | Kamimura | |
| 7,166,401 B2 | 1/2007 | Tanaka et al. | |
| 7,169,525 B2 | 1/2007 | Sugiura et al. | |
| 7,177,570 B2 | 2/2007 | Nagame et al. | |
| 7,177,582 B2 | 2/2007 | Ohta et al. | |
| 8,007,978 B2 * | 8/2011 | Klier | C08L 25/14 430/137.1 |
| 8,329,812 B2 * | 12/2012 | Klier | G03G 9/08 430/137.1 |
| 8,673,533 B2 * | 3/2014 | Klier | G03G 9/08 430/137.1 |
| 2001/0028988 A1 * | 10/2001 | Magome et al. | 430/106.1 |
| 2002/0076639 A1 * | 6/2002 | Uno et al. | 430/137.1 |
| 2003/0027066 A1 * | 2/2003 | Yamashita | C08J 3/14 430/105 |
| 2003/0124448 A1 * | 7/2003 | Shinzo | G03G 9/08755 430/109.4 |
| 2004/0058268 A1 * | 3/2004 | Veregin et al. | 430/137.14 |
| 2004/0259016 A1 * | 12/2004 | Oya et al. | 430/126 |
| 2005/0089786 A1 * | 4/2005 | Sugiura et al. | 430/111.4 |
| 2005/0208408 A1 * | 9/2005 | Uchinokura et al. | 430/108.21 |
| 2005/0271965 A1 * | 12/2005 | Kamiyoshi et al. | 430/111.4 |
| 2006/0105262 A1 * | 5/2006 | Sata et al. | 430/109.4 |
| 2006/0278843 A1 | 12/2006 | Someda et al. | |
| 2007/0243481 A1 * | 10/2007 | Klier | G03G 9/08 430/111.35 |
| 2010/0143837 A1 * | 6/2010 | Klier et al. | 430/114 |
| 2010/0248119 A1 * | 9/2010 | Young et al. | 430/108.2 |
| 2011/0281212 A1 * | 11/2011 | Klier et al. | 430/109.3 |

FOREIGN PATENT DOCUMENTS

| | | |
|---|---|---|
| JP | 2004204033 | 7/2004 |
| WO | 0001745 | 1/2000 |

OTHER PUBLICATIONS

Canadian Office Action, Canadian Application No. 2,644,150, Mail Date—Dec. 3, 2010.
Korean Office Action, Korean Application No. 10-2008-7024157, Mail Date—Oct. 21, 2010.
Chinese Office Action, Chinese Application No. 200780008418.5, Mail Date—Nov. 4, 2010.
Russian Office Action, Russian Application No. 2008139297, Receipt Date—Dec. 21, 2009.
U.S. Appl. No. 60/818,911, Inventor Mark VanSumeren.
Japanese Office Action dated Oct. 20, 2014; from Japanese counterpart Application No. 2012-208099.
Response to Japanese Divisional Office Action dated Feb. 25, 2014 filed Aug. 26, 2014 from Japanese counterpart Application No. 2012-208099.
Japanese Divisional Office Action dated Feb. 25, 2014; from Japanese counterpart Application No. 2012-208099.
Instructions to Japanese Divisional Office Action dated May 13, 2014; from Japanese counterpart Application No. 2012-208099.
Response to Japanese Divisional Application dated May 21, 2014; from Japanese counterpart Application No. 2012-208099.
Japanese Office Action dated Dec. 17, 2015; from Japanese counterpart Application No. 2015-003319.

* cited by examiner

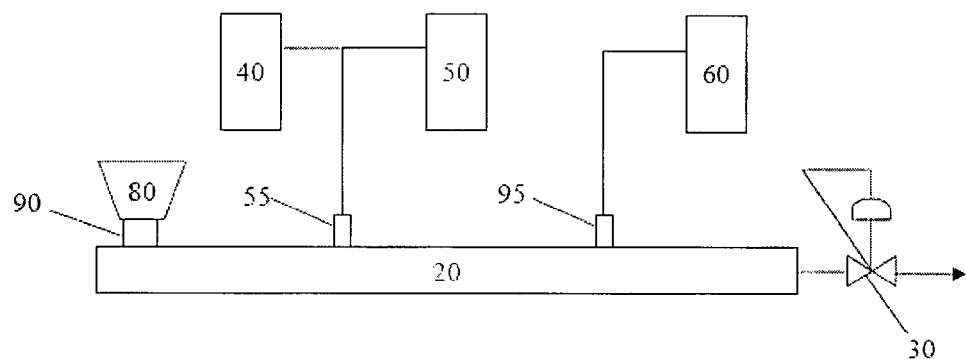

AQUEOUS DISPERSIONS FOR USE AS TONERS

CROSS-REFERENCE TO RELATED APPLICATION

The present application is a continuation-in-part application of the U.S. application Ser. No. 11/712,206, filed on Feb. 28, 2007 entitled "AQUEOUS DISPERSIONS FOR USE AS TONERS," which claims priority to U.S. Provisional Patent Application No. 60/779,126, filed Mar. 3, 2006, and it is also a continuation-in-part application of the U.S. application Ser. No. 12/635,565, filed on Feb. 25, 2010, from PCT Application No. PCT/US2008/084856, filed on Nov. 26, 2008, entitled "PROCESS TO PRODUCE TONER," which claims priority to U.S. Provisional Patent Application No. 60/991,180, filed Nov. 29, 2007, entitled "PROCESS TO PRODUCE TONER," the teachings of which are all incorporated by reference herein, as if reproduced in full hereinbelow.

BACKGROUND OF INVENTION

Field of the Invention

The present invention relates generally to aqueous dispersions. More specifically, the present invention relates to dispersion compounds that are useful as a print toner.

Background Art

In conventional electrophotography processes, a photoreceptive surface is charged with a negative electrical charge, which is then exposed to an image. Because the illuminated sections (the image areas) become more conductive, the charge dissipates in the exposed areas to form a latent image. Negatively charged toner particles spread over the surface adhere to the latent image area to form a toner image. Alternatively, a photosensitive surface is uniformly charged with static electricity, and a latent image may be formed thereon by exposing image area to light. Toner particles are spread over the surface and adhere to the light-formed latent image, which has less of a negative charge than the surrounding surface, thereby forming a toner image and making the latent image visible. If required, the toner image may be transferred onto a transfer material, such as paper. The toner image may then be fixed via fixing means, such as, by heat, pressure, heat and pressure, or solvent vapor to obtain a fixed image. Such process is described, for example, in U.S. Pat. No. 2,297,691.

Typically, toners used in the development and subsequent fixing of toner images in electrophotography have been produced by melt mixing a thermoplastic resin with a coloring agent made of a dye and/or a pigment to produce a resin composition having the coloring agent uniformly dispersed therein. To obtain a toner composition having a particular particle size, the resin composition may be pulverized and/or classified to remove coarse and/or fine particles that may affect the quality of the resulting image. Optimizing the particle size distribution of the toner will allow for a high resolution image. In particular, larger particles can cause blockage while ultra fine dust particles adhere to the print head surface and are too small to have enough charge to be controllable. Thus, as higher resolution images are desired, especially high resolution color images, smaller particle sizes and narrower particle size distributions are needed. Small particles are also desirable because they typically result in improved printing speeds and lower costs per page.

The typical pulverization processes for producing these toners, while able to control the size of the toner particles to produce a high quality toner, often have certain practical limitations. For example, pulverization is a costly and inefficient process for obtaining small particle size, and puts constraints on the type of polymer that may be used, so polymers that are excellent in every other respect may be excluded because they cannot be pulverized. Additionally, a block of a resin composition in which a colorant is dispersed is required to be micro-pulverized by means of an economically usable production device. However, because the resin composition is fragile, particles having a wide range of particle sizes are easily produced when the resin composition is micro-pulverized at high speed. Additionally, such fragile material is liable to be further pulverized in a developing apparatus of a copying machine.

Furthermore, in this pulverization process, it is extremely difficult to uniformly disperse solid fine particles such as the coloring agent in a resin. Therefore, sufficient attention must be paid to the degree of dispersion to avoid potential increased fogging, a reduced image density, and decreased color mixing or transparence of the toner, depending on the degree of dispersion. Additionally, the shape and surface conditions of such toner particles, which may also greatly affect the quality of a toner image, are determined by the cleavage fractures of the resultant particles in the pulverization. Specifically, the pulverization process presents difficulties in controlling the surface conditions of the toner particles, thus when the coloring agent is exposed from the cleavage surface of fine particles of the resin composition, the quality of the developing image may be reduced.

Therefore, to overcome the problems associated with the pulverization process, it has been previously proposed to produce a chemically produced toner through polymerization, which is described, for example, in U.S. Pat. No. 4,816,366. The polymerization process is a process of producing colored polymer particles (i.e., colored resin particles) by mixing a polymerizable monomer with additive components such as a colorant, a charge control agent, and a parting agent to prepare a polymerizable monomer composition and then polymerizing the polymerizable monomer composition by suspension polymerization, emulsion polymerization, dispersion polymerization, or the like. Alternatively, chemically produced toners may also be produced by aggregating pre-formed polymers with the necessary pigment and additives. In the polymerization processes, the polymer component formed by the polymerization becomes a binder resin to directly form the colored polymer particles.

By eliminating the pulverization step, suspension polymerization or emulsion polymerization can use a softer material for toner particles that need not be as fragile. The integrity of the shape of the toner particles may be better maintained, which also prevents the coloring agent from being exposed on the surface of the toner particles. Furthermore, the classification step may optionally be omitted; thus, significant cost reduction effects such as energy savings, a reduced production time, and an improved step yield may be achieved.

However, toners produced by these polymerization processes are not without inherent limitations. For example, these limitations may include high capital requirements, that the resulting toners may contain residual monomer or be contaminated with additives, and that limitations on polymer type may exist. Specifically, with respect to the limitations on the types of polymers that may exist, typically, only polymers which can be polymerized in the presence of water may be used, thus excluding broad types of polymers. For example, the polymerization processes of some polymers, including some polyolefins, are intolerant of water. With respect to residual monomers, it is difficult to completely react the polymerizable monomer in the polymerization step for forming the binder resin, and thus, an unreacted polymerizable monomer often remains in the resin. As a result, the toner may often contain residual, unreacted monomer. When the toner containing the residual, polymerizable monomer is used in an image forming apparatus, the polymerizable monomer is vaporized out of the toner by heating in a fixing step to worsen a working environment or emit offensive odor. When the content of the polymerizable monomer in the toner is high, the toner also tends to undergo blocking during its storage to aggregate or to cause an offset phenomenon or toner filming on individual members in the image forming apparatus.

Attempts to remove the polymerizable monomer have varied in their success due to the various additives that readily absorb any residual polymerizable monomer in the polymerized toner. The absorbance of the residual monomer by the additives complicates the removal of the residual monomer, as compared to removal of monomer from the binder resin alone. Even when the polymerized toner is fully washed after the polymerization, it is difficult to remove the residual polymerizable monomer adsorbed within the polymerized toner. Attempts to remove the residual polymerizable monomer by heat treatment of the polymerized toner results in aggregation of the polymerized toner.

U.S. Pat. No. 6,894,090 discloses a toner using certain types of resins, but specifically requires an organic solvent.

Accordingly, there exists a need for compositions and methods of forming high performance toner that will produce a high quality image without residual side effects.

SUMMARY OF INVENTION

In one aspect, the present invention relates to a compound that includes an aqueous dispersion, wherein the dispersion includes a thermoplastic resin and at least one stabilizing agent, and at least one selected from the group consisting of a colorant and a magnetic pigment, wherein the dispersion has an average volume diameter particle size from about 0.05 to about 10 microns.

In another aspect, the present invention relates to a method for forming a toner that includes forming a compound that includes an aqueous dispersion and a colorant, wherein the dispersion includes a thermoplastic resin and at least one stabilizing agent, and wherein the dispersion has an average volume diameter particle size from about 0.05 to about 10 microns and removing at least a portion of the water in the dispersion to form toner particles.

In one aspect, embodiments disclosed herein relate to a compound including: an aqueous dispersion, the dispersion including water and: (A) at least one thermoplastic resin; and (B) 0 to 5 weight percent of a stabilizing agent, based on the total weight of (A) and (B); (C) at least one of an internal additive and an external additive; and (D) a neutralizing agent, wherein the neutralizing agent is present in an amount sufficient to neutralize less than 90% on a molar basis of any acid groups in components (A) and (B); wherein the dispersion comprises particles having an average volume diameter particle size from about 0.05 to about 10 microns; and wherein a combined amount of the thermoplastic resin and the stabilizing agent has an acid number of less than 25 milligrams potassium hydroxide per gram of the combined amount (mg KOH/g).

In another aspect, embodiments disclosed herein relate to toners formed from a compound including: an aqueous dispersion, the dispersion including water and: (A) at least one thermoplastic resin; and (B) 0 to 5 weight percent of a stabilizing agent, based on the total weight of (A) and (B); (C) at least one of an internal additive and an external additive; and (D) a neutralizing agent, wherein the neutralizing agent is present in an amount sufficient to neutralize less than 90% on a molar basis of any acid groups in components (A) and (B); wherein the dispersion comprises particles having an average volume diameter particle size from about 0.05 to about 10 microns; and wherein a combined amount of the thermoplastic resin and the stabilizing agent has an acid number of less than 25 mg KOH/g. In another aspect, embodiments disclosed herein relate to cartridges or process cartridges containing such toner compounds.

In another aspect, embodiments disclosed herein relate to methods for forming a toner, the method including: forming a compound, the compound including: an aqueous dispersion, the aqueous dispersion including water and: (A) a thermoplastic resin; and (B) 0 to 5 weight percent of a stabilizing agent, based on the total weight of (A) and (B); wherein the aqueous dispersion comprises particles having an average volume diameter particle size from about 0.05 to about 2 microns; and wherein a combined amount of the thermoplastic resin and the stabilizing agent has an acid number of less than 25 mg KOH/g; and forming toner particles using at least a portion of the compound.

In another aspect, embodiments disclosed herein relate to methods for forming a toner, the method including: forming a compound, the compound including: an aqueous dispersion, the aqueous dispersion including water and: (A) a thermoplastic resin; and (B) 0 to 5 weight percent of a stabilizing agent, based on the total weight of (A) and (B); (C) at least one selected from the group consisting of an internal additive and an external additive, and (D) a neutralizing agent, wherein the neutralizing agent is present in an amount sufficient to neutralize less than 90% on a molar basis of any acid groups in components (A) and (B); wherein the aqueous dispersion comprises particles having an average volume diameter particle size from about 2 to about 10 microns; and wherein a combined amount of the thermoplastic resin and the stabilizing agent has an acid number of less than 25 mg KOH/g; and forming toner particles using at least a portion of the compound.

Other aspects and advantages of the invention will be apparent from the following description and the appended claims.

BRIEF DESCRIPTION OF DRAWINGS

FIG. 1 shows an extruder that may be used in formulating dispersions in accordance with embodiments of the present invention.

DETAILED DESCRIPTION

In one aspect, embodiments disclosed herein relate generally to aqueous dispersions. Aqueous dispersion, as used herein, refers to a thermoplastic resin (plus optional additives) as a discontinuous phase dispersed in a continuous phase that is predominantly water. More specifically, embodiments disclosed herein relate to aqueous dispersion compounds and processes to make aqueous dispersion compounds that are useful as a print toner.

Embodiments of the present invention relate to aqueous dispersions and compounds made from aqueous dispersions that are useful as toner compositions. Dispersions used in embodiments of the present invention comprise water, (A) at least one thermoplastic resin, and (B) a stabilizing agent. These are discussed in more detail below. The compounds involve an aqueous dispersion and the addition of at least one of a colorant and a magnetic pigment, and may further include a number of additives. These components in the compound are discussed in more detail below.

Thermoplastic Resin

The thermoplastic resin (A) included in embodiments of the aqueous dispersion of the present invention is a resin that is not readily dispersible in water by itself. The term "resin," as used herein, should be construed to include synthetic polymers or chemically modified natural resins such as, but not limited to, thermoplastic materials such as polyvinyl chloride, polystyrene, polyesters, styrene acrylates, and polyethylene and thermosetting materials such as polyesters, epoxies, and silicones that are used with fillers, stabilizers, pigments, and other components to form plastics.

The term resin as used herein also includes elastomers and is understood to include blends of olefin polymers. In some embodiments, the thermoplastic resin is a semicrystalline resin. The term "semi-crystalline" is intended to identify those resins that possess at least one endotherm when subjected to standard differential scanning calorimetry (DSC) evaluation. Some semi-crystalline polymers exhibit a DSC endotherm that exhibits a relatively gentle slope as the scanning temperature is increased past the final endotherm maximum. This reflects a polymer of broad melting range rather than a polymer having what is generally considered to be a sharp melting point. Some thermoplastic resins useful in the dispersions of the invention have a single melting point while other polymers have more than one melting point.

In some thermoplastic resins, one or more of the melting points may be sharp such that all or a portion of the polymer melts over a fairly narrow temperature range, such as a few degrees centigrade. In other embodiments, the thermoplastic resins may exhibit broad melting characteristics over a range of about 20° C. In yet other embodiments, the thermoplastic resins may exhibit broad melting characteristics over a range of greater than 50° C.

In certain other embodiments, the thermoplastic resin may have a density between 0.8 and 1.5 g/cc. In other embodiments, the thermoplastic resin may have a density between 0.85 and 1.4 g/cc; between 0.86 and 1.3 g/cc in other embodiments, and between 0.87 and 1.2 g/cc in yet other embodiments.

Examples of the thermoplastic resin (A) that may be used in the present invention include homopolymers and copolymers (including elastomers) of an alpha-olefin such as ethylene, propylene, 1-butene, 3-methyl-1-butene, 4-methyl-1-pentene, 3-methyl-1-pentene, 1-heptene, 1-hexene, 1-octene, 1-decene, and 1-dodecene, as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers (including elastomers) of an alpha-olefin with a conjugated or non-conjugated diene, as typically represented by ethylene-butadiene copolymer and ethylene-ethylidene norbornene copolymer; and polyolefins (including elastomers) such as copolymers of two or more alpha-olefins with a conjugated or non-conjugated diene, as typically represented by ethylene-propylene-butadiene copolymer, ethylene-propylene-dicyclopentadiene copolymer, ethylene-propylene-1,5-hexadiene copolymer, and ethylene-propylene-ethylidene norbornene copolymer; ethylene-vinyl compound copolymers such as ethylene-vinyl acetate copolymer, ethylene-vinyl alcohol copolymer, ethylene-vinyl chloride copolymer, ethylene acrylic acid or ethylene-(meth) acrylic acid copolymers, and ethylene-(meth)acrylate copolymer; styrenic copolymers (including elastomers) such as polystyrene, ABS, acrylonitrile-styrene copolymer, α-methylstyrene-styrene copolymer, styrene vinyl alcohol, styrene acrylates such as styrene methylacrylate, styrene butyl acrylate, styrene butyl methacrylate, and styrene butadienes and crosslinked styrene polymers; and styrene block copolymers (including elastomers) such as styrene-butadiene copolymer and hydrate thereof, and styrene-isoprene-styrene triblock copolymer; polyvinyl compounds such as polyvinyl chloride, polyvinylidene chloride, vinyl chloride-vinylidene chloride copolymer, polymethyl acrylate, and polymethyl methacrylate; polyamides such as nylon 6, nylon 6,6, and nylon 12; thermoplastic polyesters such as polyethylene terephthalate and polybutylene terephthalate; polycarbonate, polyphenylene oxide, and the like; and glassy hydrocarbon-based resins, including poly-dicyclopentadiene polymers and related polymers (copolymers, terpolymers); saturated mono-olefins such as vinyl acetate, vinyl propionate and vinyl butyrate and the like; vinyl esters such as esters of monocarboxylic acids, including methyl acrylate, ethyl acrylate, n-butylacrylate, isobutyl acrylate, dodecyl acrylate, n-octyl acrylate, phenyl acrylate, methyl methacrylate, ethyl methacrylate, and butyl methacrylate and the like; acrylonitrile, methacrylonitrile, acrylamide, mixtures thereof; resins produced by ring opening metathesis and cross metathesis polymerization and the like. These resins may be used either alone or in combinations of two or more. Examples of specific thermoplastic toner resins include styrene butadiene copolymers with a styrene content of from about 70 to about 95 weight percent.

Thermoplastic resins may include polymers containing at least one ester bond. For example, polyester polyols may be prepared via a conventional esterification process using a molar excess of an aliphatic diol or glycol with relation to an alkanedioic acid. Illustrative of the glycols that can be employed to prepare the polyesters are ethylene glycol, diethylene glycol, propylene glycol, dipropylene glycol, 1,3-propanediol, 1,4-butanediol and other butanediols, 1,5-pentanediol and other pentane diols, hexanediols, decanediols, and dodecanediols. In some embodiments, the aliphatic glycol may contain from 2 to about 8 carbon atoms. Illustrative of the dioic acids that may be used to prepare the polyesters are maleic acid, malonic acid, succinic acid, glutaric acid, adipic acid, 2-methyl-1,6-hexanoic acid, pimelic acid, suberic acid, and dodecanedioic acids. In some embodiments, the alkanedioic acids may contain from 4 to 12 carbon atoms. Illustrative of the polyester polyols are poly(hexanediol adipate), poly(butylene glycol adipate), poly(ethylene glycol adipate), poly(diethylene glycol adipate), poly(hexanediol oxalate), and poly(ethylene glycol sebecate).

As another example, polyester resins obtained by condensation of a dicarboxylic acid components (these dicarboxylic acid components may be substituted by a sulfonic acid group, a carboxyl group, and the like) and alcoholic components (these alcoholic components may be substituted by the hydroxyl group, and the like), polyacrylic acid ester resins or polymethacrylic acid ester resins such as polymethylmethacrylate, polybutylmethacrylate, polymethylacrylate, polybutylacrylate, and the like; polycarbonate resin, polyvinyl acetate resin, styrene acrylate resin, styrene-methacrylic acid ester copolymer resin, vinyltoluene acrylate resin, and the like.

In one embodiment, thermoplastic polymer is a polyester, as described in the U.S. Pat. No. 7,521,166, incorporated herein by reference. Such polyesters comprise crystalline polyesters having an index of crystallinity of from 0.6 to 1.5. The crystalline polyesters has an index of crystallinity of preferably from 0.8 to 1.3, more preferably from 0.9 to 1.1, and even more preferably from 0.98 to 1.05. The crystalline polyester may have acidic groups at the terminal of the molecule. The acidic group includes a carboxyl group, a sulfonate group, a phosphonate group, a sulfinate group and the like. The amount of the acidic groups at the terminal of the molecule of the crystalline polyester is one of the important factors for determining the stability of the emulsion particles and the particle size distribution and particle size of the toner. In order to stabilize the emulsion particles and obtain a toner having a small particle size with a sharp particle size distribution, the amount of the acidic groups at the terminal of the molecule is preferably from 0.015 to 0.9 mmol, more preferably from 0.08 to 0.85 mmol, even more preferably from 0.15 to 0.8 mmol, and even more preferably from 0.25 to 0.75 mmol, per 1 g of the crystalline polyester. In addition, a carboxyl group can be introduced into the main chain of the polyester molecule by using a polycarboxylic acid such as trimellitic acid as a carboxylic acid component or a polyhydric alcohol such as pentaerythritol as an alcohol component as occasion demands. The amount of the acidic groups in the main chain of the polyester molecule is preferably 5% by mole or less, more preferably 3% by mole or less, and even more preferably 1% by mole or less, based on the number of moles of the entire carboxylic acid component constituting the polyester, from the viewpoint of inhibition of crystallization. In addition, the molar ratio as expressed by acidic groups in the main chain of the molecule to acidic groups at the terminal of the molecule in the crystalline polyester is preferably 30% by mole or less, more preferably 20% by mole or less, even more preferably 10% by mole or less, even more preferably 5% by mole or less, and even more preferably 2% by mole or less, from the same viewpoint. The amount of the acidic groups in the main chain of the crystalline polyester molecule and at the terminal of the molecule thereof can be calculated from the structures and the charging ratio of the raw material acid and the raw material alcohol for the crystalline polyester, the number-average molecular weight of the crystalline polyester, and the determination of the acid value. Also, the amount can be obtained by using an analytic means such as nuclear magnetic resonance spectroscopy (NMR) or X-ray photoelectron spectroscopy (XPS, ESCA, or the like) in combination with the determination of the acid value. The crystalline polyester may be contained in the resin binder in an amount of preferably 60% by weight or more, more preferably 70% by weight or more, and even more preferably 80% by weight or more. The crystalline polyester contained in the toner in an amount of preferably 60% by weight or more, more preferably 70% by weight or more, and even more preferably from 80 to 95% by weight. The amorphous polyester has a softening point of preferably from 95° C. to 160° C., a glass transition temperature of preferably from 50° C. to 75° C., an acid value of preferably from 1 to 40 mg KOH/g, and a hydroxyl value of preferably from 3 to 60 mg KOH/g. The crystalline polyester has a melting point of preferably from 60° C. to 150° C., more preferably from 60° C. to 130° C., and even more preferably from 60° C. to 120° C., from the viewpoint of low-temperature fixing ability. The amorphous polyester has a number-average molecular weight of preferably from 1000 to 100000, more preferably from 1000 to 50000, and even more preferably from 1000 to 12000, from the viewpoint of durability and fixing ability. The crystalline polyester has a number-average molecular weight of preferably from 2000 to 100000, more preferably from 2000 to 20000, even more preferably from 2000 to 10000, and even more preferably from 2000 to 8000, from the viewpoint of emulsifiability, fixing ability and offset resistance.

In one embodiment, thermoplastic polymer is a polyester, as described in the US Publication No. 2009/0092918, incorporated herein by reference. Such polyesters comprise crystalline polyesters. Illustrative examples of crystalline polyesters include any of various polyesters, such as poly(ethylene-adipate), poly(propylene-adipate), poly(butylene-adipate), poly(pentylene-adipate), poly(hexylene-adipate), poly(octylene-adipate), poly(nonylene-adipate), poly(decylene-adipate), poly(undecylene-adipate), poly(ododecylene-adipate), poly(ethylene-glutarate), poly(propylene-glutarate), poly(butylene-glutarate), poly(pentylene-glutarate), poly(hexylene-glutarate), poly(octylene-glutarate), poly(nonyleno-glutarate), poly(decylene-glutarate), poly(undecylene-glutarate), poly(ododecylene-glutarate), poly(ethylene-succinate), poly(propylene-succinate), poly(butylene-succinate), poly(pentylene-succinate), poly(hexylene-succinate), poly(octylene-succinate), poly(nonylene-succinate), poly(decylene-succinate), poly(undecylene-succinate), poly(ododecylene-succinate), poly(ethylene-pimelate), poly(propylene-pimelate), poly(butylene-pimelate), poly(pentylene-pimelate), poly(hexylene-pimelate), poly(octylene-pimelate), poly(nonylene-pimelate), poly(decylene-pimelate), poly(undecylene-pimelate), poly(ododecylene-pimelate), poly(ethylene-sebacate), poly(propylene-sebacate), poly(butylene-sebacate), poly(pentylene-sebacate), poly(hexylene-sebacate), poly(octylene-sebacate), poly(nonylene-sebacate), poly(decylene-sebacate), poly(undecylene-sebacate), poly(ododecylene-sebacate), poly(ethylene-azelate), poly(propylene-azelate), poly(butylene-azelate), poly(pentylene-azelate), poly(hexylene-azelate), poly(octylene-azelate), poly(nonylene-azelate), poly(decylene-azelate), poly(undecylene-azelate), poly(ododecylene-azelate), poly(ethylene-dodecanoate), poly(propylene-dodecanoate), poly(butylene-dodecanoate), poly(pentylene-dodecanoate), poly(hexylene-dodecanoate), poly(octylene-dodecanoate), poly(nonylene-dodecanoate), poly(decylene-dodecanoate), poly(undecylene-dodecanoate), poly(ododecylene-dodecanoate), poly(ethylene-fumarate), poly(propylene-fumarate), poly(butylene-fumarate), poly(pentylene-fumarate), poly(hexylene-fumarate), poly(octylene-fumarate), poly(nonylene-fumarate), poly(decylene-fumarate), poly(undecylene-fumarate), poly(ododecylene fumarate), copoly-(butylene-fumarate)-copoly-(hexylene-fumarate), copoly-(ethylene-dodecanoate)-copoly-(ethylene-fumarate), mixtures thereof, and the like. Illustrative examples of amorphous polyesters include, for example poly(1,2-propylene-diethylene)terephthalate, polyethyleneterephthalate, polypropylene-terephthalate, polybutylene-terephthalate, polypentylene-terephthalate, polyhexylene-terephthalate, polyheptadene-terephthalate, polyoctalene-terephthalate, polyethylene-sebacate, polypropylene-sebacate, polybutylene-sebacate, polyethylene-adipate, polypropylene-adipate, polybutylene-adipate, polypentylene-adipate, polyhexylene-adipate polyheptadene-adipate, polyoctalene-adipate, polyethylene-glutarate, polypropylene-glutarate, polybutylene-glutarate, polypentylene-glutarate, polyhexylene-glutarate, polyheptadene-glutarate, polyoctalene-glutarate, polyethylene-pimelate, polypropylene-pimelate, polybutylene-pimelate, polypentylene-pimelate, polyhexylene-pimelate, polyheptadene-pimelate, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly (propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), or poly(1,2-propylene itaconate). The amorphous polyester resin may also be crosslinked or branched to, for example, assist in the achievement of a broad fusing latitude, or when black or matte prints are desired. Mixtures of two or more of the above polymers may also be used, if desired.

In one embodiment, thermoplastic polymer is a polyester, as described in the US Publication No. 2009/006139, incorporated herein by reference. Such polyesters comprise crystalline polyesters a crystalline resin. The crystalline resin is, for example, an alkali sulfonated polyester resin. Examples of polyester based crystalline resins include, but are not limited to alkali copoly(5-sulfoisophthaloyl)-co-poly(ethylene-adipate), alkali copoly(5-sulfoisophthaloyl)-copoly(propylene-adipate), alkali copoly(5-sulfoisophthaloyl)-co-poly(butylene-adipate), alkali copoly(5-sulfo-isophthaloyl)-copoly(pentylene-adipate), and alkali copoly(5-sulfo-iosphthaloyl)-copoly(octylene-adipate), alkali copoly(5-sulfo-isophthaloyl)-copoly(ethylene-adipate), alkali copoly (5-sulfo-isophthaloyl)-copoly(propylene-adipate), alkali copoly(5-sulfo-isophthaloyl)-co-poly(butylene-adipate), alkali copoly(5-sulfo-isophthaloyl)-copoly(pentylene-adipate), alkali copoly(5-sulfo-isoptthaloyl)-copoly(hexylene-adipate), alkali copoly(5-sulfo-isophthaloyl)-copoly(octylene-adipate), alkali copoly(5-sulfoisophthaloyl)-copoly (ethylene-succinate), alkali copoly(5-sulfoisophthaloyl-copoly(butylene-succinate), alkali copoly(5-sulfoisophthaloyl)-copoly(hexylene-succinate), alkali copoly(5-sulfoisophthaloyl)-copoly(octylene-succinate), alkali copoly(5-sulfo-isophthaloyl)-copoly(ethylene-sebacate), alkali copoly(5-sulfo-isophthaloyl)-copoly(propylene-sebacate), alkali copoly(5-sulfo-isophthaloyl)-copoly (butylene-sebacate), alkali copoly(5-sulfo-isophthaloyl)-copoly(pentylene-sebacate), alkali copoly(5-sulfo-isophthaloyl)-copoly(hexylene-sebacate), alkali copoly(5-sulfo-isophthaloyl)-copoly(octylene-sebacate), alkali copoly(5-sulfo-isophthaloyl)-copoly(ethylene-adipate), alkali copoly(5-sulfo-isophthaloyl)-copoly(propylene-adipate), alkali copoly(5-sulfo-iosphthaloyl)-copoly(butylene-adipate), alkali copoly(5-sulfo-isophthaloyl)-copoly(pentylene-adipate), alkali copoly(5-sulfo-isophthaloyl)copoly (hexylene-adipate), poly(octylene-adipate), and wherein alkali is a metal like sodium, lithium or potassium. In embodiments, the alkali metal is lithium. The crystalline resin is, in embodiments, present in an amount of from about 5 to about 30 percent by weight of the toner components, and, in other embodiments, from about 15 to about 25 percent by weight of the toner components. The crystalline resin can possess various melting points of, for example, from about 30° C. to about 120° C., and may be, in embodiments, from about 50° C. to about 90° C. The crystalline resin may have, for example, a number average molecular weight ($M_n$), as measured by gel permeation chromatography (GPC) of, for example, from about 1,000 to about 50,000, and may be from about 2,000 to about 25,000. The weight average molecular weight ($M_w$) of the resin may be, for example, from about 2,000 to about 100,000, and preferably from about 3,000 to about 80,000, as determined by gel permeation chromatography using polystyrene standards. The molecular weight distribution ($M_w/M_n$) of the crystalline resin is, for example, from about 2 to about 6, and more specifically, from about 2 to about 4.

In one embodiment, thermoplastic polymer is a polyester, as described in the US Publication No. 209/0061349, incorporated herein by reference. Such polyesters comprise crystalline polyesters include a branched amorphous resin. In embodiments, the branched amorphous resin is an alkali sulfonated polyester resin. Examples of suitable alkali sulfonated polyester resins include, but are not limited to, the metal or alkali salts of copoly(ethylene-terephthalate)-co-poly-(ethylene-5-sulfo-isophthalate), copoly(propylene-terephthalate)-copoly(propylene-5-sulfo-isophthalate), copoly (diethylene-terephthalate)-copoly(diethylene-5-sulfo-isophthalate), copoly(propylene-diethylene-terephthalate)-copoly(propylene-diethylene-5-sulfo-isophthalate), copoly (propylene-butylene-terephthalate)-copoly propylene-butylene-5-sulfo-isophthalate), copoly(propoxylated bisphenol-A-fumarate)-copoly(propoxylated bisphenol A-5-sulfo-isophthalate), copoly(ethoxylated bisphenol-A-fumarate)-copoly(ethoxylated bisphenol-A-5-sulfo-isophthalate), and copoly(ethoxylated bisphenol-A-maleate)-copoly (ethoxylated bisphenol-A-5-sulfo-isophthalate), and wherein the alkali metal is, for example, a sodium, lithium or potassium ion. The branched amorphous polyester resin, in embodiments, possess, for example, a number average molecular weight ($M_n$), as measured by gel permeation chromatography (GPC), of from about 10,000 to about 500,000, and may be from about 5,000 to about 250,000; a weight average molecular weight ($M_w$) of, for example, from about 20,000 to about 600,000, and may be from about 7,000 to about 300,000, as determined by gel permeation chromatography using polystyrene standards; and wherein the molecular weight distribution ($M_w/M_n$) is, for example, from about 1.5 to about 6, and more specifically, from about 2 to about 4. The onset glass transition temperature ($T_g$) of the resin as measured by a differential scanning calorimeter (DSC) is, in embodiments, for example, from about 55° C. to about 70° C., and more specifically, from about 55° C. to about 67° C.

Examples of suitable polyester resin binders, as described in U.S. Pat. No. 7,498,112, is incorporated herein by reference, include polyethylene-terephthalate, polypropylene-terephthalate, polybutylene-terephthalate, polypentylene-terephthalate, polyhexylene-terephthalate, polyheptadene-terephthalate, polyoctalene-terephthalate, polyethylene-sebacate, polypropylene sebacate, polybutylene-sebacate, polyethylene-adipate, polypropylene-adipate, polybutylene-adipate, polypentylene-adipate, polyhexylene-adipate, polyheptadene-adipate, polyoctalene-adipate, polyethylene-glutarate, polypropylene-glutarate, polybutylene-glutarate, polypentylene-glutarate, polyhexylene-glutarate, polyheptadene-glutarate, polyoctalene-glutarate polyethylene-pimelate, polypropylene-pimelate, polybutylene-pimelate, polypentylene-pimelate, polyhexylene-pimelate, polyheptadene-pimelate, poly(propoxylated bisphenol-fumarate), poly (propoxylated bisphenol-succinate), poly(propoxylated bisphenol-adipate) and poly(propoxylated bisphenol-glutarate).

In one embodiment, the thermoplastic polymer is a polyester, as described in the U.S. Pat. No. 5,593,807, U.S. Pat. No. 5,290,654, U.S. Pat. No. 5,308,734, and U.S. Pat. No. 5,370,963.

In one embodiment, the thermoplastic polymer is a polyester, sodio-sulfonated polyester resin as disclosed in a number of patents, such as U.S. Pat. Nos. 6,387,581 and 6,395,445.

Other polyesters such as those derived from a (meth) acrylic acid-modified rosin and a resin derived from a fumaric acid/maleic acid-modified rosin, as described in EP Pat. No. 2028551, are also included.

In one embodiment, the thermoplastic polymer is an amorphous resin, as described in U.S. Pat. No. 7,494,757, such amorphous resins include polyester resins, branched polyester resins, polyimide resins, branched polyimide resins, poly(styrene-acrylate) resins, crosslinked, for example from about 25 percent to about 70 percent, poly(styrene-acrylate) resins, poly(styrene-methacrylate) resins, crosslinked poly(styrene-methacrylate) resins, poly(styrene-butadiene) resins, crosslinked poly(styrene-butadiene) resins, alkali sulfonated-polyester resins, branched alkali sulfonated-polyester resins, alkali sulfonated-polyimide resins, branched alkali sulfonated-polyimide resins, alkali sulfonated poly(styrene-acrylate) resins, crosslinked alkali sulfonated poly(styrene-acrylate) resins, poly(styrene-methacrylate) resins, crosslinked alkali sulfonated-poly(styrene-methacrylate) resins, alkali sulfonated-poly(styrene-butadiene) resins, and crosslinked alkali sulfonated poly (styrene-butadiene) resins. The amorphous resin is preferably a branched amorphous sulfonated polyester resin or a linear amorphous sulfonated polyester resin. Branched amorphous sulfonated polyester resins are preferred, for example, when the fuser does not contain a fuser oil or when black or matte prints are desired. Liner amorphous sulfonated polyester resins are preferred, for example, when the fuser include an oil. Branched amorphous resins can be a polyester, a polyamide, a polyimide, a polystyrene-acrylate, a polystyrene-methacrylate, a polystyrene-butadiene, or a polyester-imide, an alkali sulfonated polyester, an alkali sulfonated polyamide, an alkali sulfonated polyimide, an alkali sulfonated polystyrene-acrylate, an alkali sulfonated polystyrene-methacrylate, an alkali sulfonated polystyrene-butadiene, or an alkali sulfonated polyester-imide, a sulfonated polyester resin, copoly(ethylene-terephthalate)-co-poly(ethylene-5-sulfo-isophthalate), copoly(propylene-terephthalate)-copoly(propylene-5-sulfo-isophthalate), copoly(diethylene-terephthalate)-copoly(diethylene-5-sulfo-isophthalate), copoly(propylene-diethylene-terephthalate)-copoly(propylene-diethylene-5-sulfoisophthalate), copoly(propylene-butylene-terephthalate)-copoly(propylene-butylene-5-sulf-o-isophthalate), copoly(propoxylated bisphenol-A-fumarate)-copoly (propoxylated bisphenol A-5-sulfo-isophthalate), copoly(ethoxylated bisphenol-A-fumarate)-copoly(ethoxylated bisphenol-A-5-sulfo-isophthalate), or copoly(ethoxylated bisphenol-A-maleate) copoly(ethoxylated bisphenol-A-5-sulfo-isophthalate). The amorphous resin is, for example, present in an amount from about 50 to about 90 percent by weight, and more preferably from about 65 to about 85 percent by weight of the binder. Preferably the amorphous resin is a branched amorphous sulfonated polyester resin. The amorphous resin in preferred embodiments possesses, for example, a number average molecular weight (Mn), as measured by gel permeation chromatography (GPC), of from about 10,000 to about 500,000, and preferably from about 5,000 to about 250,000; a weight average molecular weight (Mw) of, for example, from about 20,000 to about 600,000, and preferably from about 7,000 to about 300,000, as determined by GPC using polystyrene standards; and wherein the molecular weight distribution (Mw/M) is, for example, from about 1.5 to about 6, and more specifically, from about 2 to about 4. Sulfonated polyester resins are most preferred as the crystalline resin herein. The crystalline resin is sulfonated from about 0.5 weight percent to about 4.5 weight percent, and preferably from about 1.5 weight percent to about 4.0 weight percent. The crystalline resin is, for example, present in an amount of from about 10 to about 50 percent by weight of the binder, and preferably from about 15 to about 40 percent by weight of the binder. The crystalline resin can possess melting points of, for example, from at least about 70° C., and preferably from about 70° C. to about 80° C., and a number average molecular weight (Mn), as measured by gel permeation chromatography (GPC) of, for example, from about 1,000 to about 50,000, and preferably from about 2,000 to about 25,000; with a weight average molecular weight (Mw) of the resin of, for example, from about 2,000 to about 100,000, and preferably from about 3,000 to about 80,000, as determined by GPC using polystyrene standards. The molecular weight distribution (Mw/Mn) of the crystalline resin is, for example, from about 2 to about 6, and more specifically, from about 2 to about 4.

In one embodiment, thermoplastic polymer is an amorphous polyester resin, as described in the US Publication No. 2009/0047593, incorporated herein by reference. Illustrative examples of amorphous polymer resins include any of the various amorphous polyesters, such as polyethylene-terephthalate, polypropylene-terephthalate, polybutylene-terephthalate, polypentylene-terephthalate, polyhexylene-terephthalate, polyheptadene-terephthalate, polyoctalene-terephthalate, polyethylene-sebacate, polypropylene sebacate, polybutylene-sebacate, polyethylene-adipate, polypropylene-adipate, polybutylene-adipate, polypentylene-adipate, polyhexylene-adipate, polyheptadene-adipate, polyoctalene-adipate, polyethylene-glutarate, polypropylene-glutarate, polybutylene-glutarate, polypentylene-glutarate, polyhexylene-glutarate, polyheptadene-glutarate, polyoctalene-glutarate polyethylene-pimelate, polypropylene-pimelate, polybutylene-pimelate, polypentylene-pimelate, polyhexylene-pimelate, polyheptadene-pimelate, poly (propoxylated bisphenol-fumarate), poly(propoxylated bisphenol-succinate), poly(propoxylated bisphenol-adipate), poly(propoxylated bisphenol-glutarate), SPAR™ (Dixie Chemicals), BECKOSOL™ (Reichhold Inc), ARAKOTE™ (Ciba-Geigy Corporation), HETRON™ (Ashland Chemical), PARAPLEX™ (The Dow Chemical Company), POLYLITE™ (Reichhold Inc), PLASTHALL™ (The Dow Chemical Company), CYGAL™ (American Cyanamide), ARMCO™ (Armco Composites), ARPOL™ (Ashland Chemical), CELANEX™ (Celanese Eng), RYNITE™ (DuPont), STYPOL™ (Freeman Chemical Corporation), mixtures thereof and the like. The resins may also be functionalized, such as being carboxylated, sulfonated, or the like, such as sodio sulfonated. The amorphous resins may be linear or branched, and are available from a number of sources. The amorphous resin may possess various onset glass transition temperatures (Tg) of from about 40° C. to about 80° C., such as from about 50° C. to about 70° C., as measured by differential scanning calorimetry (DSC). The linear and branched amorphous polyester resins, in embodiments, may possess a number average molecular weight (Mn), as measured by gel permeation chromatography (GPC), of from about 10,000 to about 500,000, such as from about 5,000 to about 250,000; a weight average molecular weight (Mw) of from about 20,000 to about 600,000, such as from about 7,000 to about 300,000, as determined by GPC using polystyrene standards; and a molecular weight distribution (Mw/Mn) of from about 1.5 to about 6, such as from about 2 to about 4.

In one embodiment, thermoplastic polymer is a crystalline polyester resin, as described in the US Publication No. 2009/0047593, incorporated herein by reference. Illustrative examples of crystalline polymer resins include poly(ethylene-adipate), poly(propylene-adipate), poly(butylene-adipate), poly(pentylene-adipate), poly(hexylene-adipate), poly(octylene-adipate), poly(nonylene-adipate), poly(decylene-adipate), poly(undecylene-adipate), poly(ododecylene-adipate), poly(ethylene-glutarate), poly(propylene-glutarate), poly(butylene-glutarate), poly(pentylene-glutarate), poly(hexylene-glutarate), poly(octylene-glutarate), poly(nonylene-glutarate), poly(decylene-glutarate), poly(undecylene-glutarate), poly(ododecylene-glutarate), poly(ethylene-succinate), poly(propylene-succinate), poly(butylene-succinate), poly(pentylene-succinate), poly(hexylene-succinate), poly(octylene-succinate), poly(nonylene-succinate), poly(decylene-succinate), poly(undecylene-succinate), poly(ododecylene-succinate), poly(ethylene-pimelate), poly(propylene-pimelate), poly(butylene-pimelate), poly(pentylene-pimelate), poly(hexylene-pimelate), poly(octylene-pimelate), poly(nonylene-pimelate), poly(decylene-pimelate), poly(undecylene-pimelate), poly(ododecylene-pimelate), poly(ethylene-sebacate), poly(propylene-sebacate), poly(butylene-sebacate), poly(pentylene-sebacate), poly(hexylene-sebacate), poly(octylene-sebacate), poly(nonylene-sebacate), poly(decylene-sebacate), poly(undecylene-sebacate), poly(ododecylene-sebacate), poly(ethylene-azelate), poly(propylene-azelate), poly(butylene-azelate), poly(pentylene-azelate), poly(hexylene-azelate), poly(octylene-azelate), poly(nonylene-azelate), poly(decylene-azelate), poly(undecylene-azelate), poly(ododecylene-azelate), poly(ethylene-dodecanoate), poly(propylene-dodecanoate), poly(butylene-dodecanoate), poly(pentylene-dodecanoate), poly(hexylene-dodecanoate), poly(octylene-dodecanoate), poly(nonylene-dodecanoate), poly(decylene-dodecanoate), poly(undecylene-dodecanoate), poly(ododecylene-dodecanoate), poly(ethylene-fumarate), poly(propylene-fumarate), poly(butylene-fumarate), poly(pentylene-fumarate), poly(hexylene-fumarate), poly(octylene-fumarate), poly(nonylene-fumarate), poly(decylene-fumarate), poly(undecylene-fumarate), poly(ododecylene-fumarate), copoly-(butylene-fumarate)-copoly-(hexylene-fumarate), copoly-(ethylene-dodecanoate)-copoly-(ethylene-fumarate), mixtures thereof, and the like. The crystalline resin may be derived from monomers selected from, for example, organic diols and diacids in the presence of a polycondensation catalyst. The crystalline resin may be present in an amount of from about 3 to about 20 percent by weight of the core, such as from about 5 to about 15 percent by weight or from about 5 to about 10 percent by weight of the core. The shell is substantially free of crystalline polyester. The crystalline resin can possess a melting point of, for example, from at least about 60° C., such as from about 70° C. to about 80° C., and a number average molecular weight (Mn), as measured by gel permeation chromatography (GPC) of from about 1,000 to about 50,000, or from about 2,000 to about 25,000, with a weight average molecular weight (Mw) as determined by GPC using polystyrene standards of from about 2,000 to about 100,000, or from about 3,000 to about 80,000. The molecular weight distribution (Mw/Mn) of the crystalline resin is from about 2 to about 6, such as from about 2 to about 4.

In one embodiment, thermoplastic polymer is a polymer binder, as described in the US Publication No. 2009/0047591, incorporated herein by reference. Such polymer binders may include polyester based polymer binder. Illustrative examples of suitable polyester-based polymer binders may include any of the various polyesters, such as polyethylene-terephthalate, polypropylene-terephthalate, polybutylene-terephthalate, polypentylene-terephthalate, polyhexylene-terephthalate, polyheptadene-lerephthalate, polyoctalene-terephthalate, polyethylene-sebacate, polypropylene sebacate, polybutylene-sebacate, polyethylene-adipate, polypropylene-adipate, polybutylene-adipate, polypentylene-adipate, polyh, iexalene-adipate, polyheptadene-adipate, polyoctalenle-adipate, polyethylene-glutarate, polypropylene-glutarate, polybutylene-glutarate, polypentylene-glutarate, polyhexylene-glutarate, polyhepadene-glutarate, polyoctalene-glutarate polyethylene-pimelate, polypropylene-pimelate, polybutylene-pimelate, polypentylene-pimelate, polyhexylene-pimelate, polyheptadene-pinmelate, polyvpropoxylated bisphenol-fiimarate), poly(propoxylated bisphenol-succinate), poly propoxylated bisphenol-adipate), poly(propoxylated bisphenol-glutarate), SPAR™ (Dixie Chemicals), BECKOSOL™ (Reichhold Chemical Inc), AIAOTE™ (Ciba-Geigy Corporation), HETRON™ (Ashland Chemical), PARALEX™ (The Dow Chemical Company), POLYLITE™ (Reichliold Chemical Inc), PLAST-HALL™ (The Dow Chemical Company), CYGAL™ (American Cyanamide), ARMCO™ (Armco Composites), ARPOL™ (Ashland Chemical), CELANEX™ (Celanese Eng), RYNITE™ (DuPont), STYPOL™ (Freeman Chemical Corporation) mixtures thereof and the like.

In one embodiment, thermoplastic polymer is a polyester, as described in the US Publication No. 200900791, incorporated herein by reference. Such polyesters comprise polyester based polymers may include alkali copoly(5-sulfoisophtlhaloyl)-co-poly(ethylene-adipate), alkali copoly(5-sulfoisophthaloyl)-copoly(propylene-adipate), alkali copoly(5-sulfoisophthal(oyl)-copoly(butylene-adipate), alkali copoly(5-sulfo-isophthaloyl)-copolyfpentylene-adipate), and alkali copoly(5-sulfo-iosphthalovl)-ovoly(octylene-adipate), alkali copoly(5-sulfo-isophthaloyl)-copoly(ethylene-adipate), alkali copoly(5-sulfo-isophthaloyl)-copoly (propylene-adipate), alkali copoly(5-stilfo-isophtthaloyl)-co-poly(butylene-adipate), alkali copoly(5-sulfo-isophthaloyl)-copoly(pentylene-adipate), alkali copoly(5-sulfo-isophthaioyl)-copoly(hexylene-adipate), alkali copoly(5-sulfo-isophthaloyl)-copoly(octylene-adipate), alkali copoly(5-sulfoisophthaloyl)-copoly(ethylene-sticcinate), alkali copoly(5-sultoisophthaloyl-copolyfbutylene-succinate), alkali copoly 5-sulfoisophthaloyl)-copoly hexylene-suceinate), alkali copoly(5-sulfooisophthaloyl)-copoly(octylene-succinate), alkali copoly(5-sulfo-isophthaloyl)-copoly(ethylene-sebacate), alkali copoly(5-sulfo-isophthaloyl)-copoly (propylene-sebacate), alkali copoly(5-sulfo-isophthalyol)-copoly(butylene-sebacate), alkali copoly(5-sulfo-isophthaloyl)-copolypentylene-sebacate), alkali copoly(5-sulfo-isophthaloyl)-copoly(hexylene-sebacate). alkali copoly(5-sulfo-isophthaloyl)-copoly(octylene-sebacate), alkali copoly(5-sulfo-isophlthaloyl)-copoly(ethylene-adipate), alkali copoly(5-sulfo-isophthaloyl)-copolytpropylene-adipate), alkali copoly(5-sulfo-iosphthaloyl)-copoly (butylene-adipate), alkali copoly(5-sulfo-isophthaloyl)-copolyfpentylene-adipate), alkali copoly(5-sulfoisophthaloyl)copoly(hexylene-adipate), poly(octylene-adipate). Mixtures of two or more of the above polymers may also be used, if desired.

In one embodiment, thermoplastic polymer is a polymer binder, as described in the EP Patent No. 2026134, incorporated herein by reference. Such polymer binders may include a polyester based polymer binder. Illustrative examples of suitable polyester-based polymer binders may include any of the various polyesters, such as polyethylene-terephthalate, polypropylene terephthalate, polybutylene-terephthalate, polypentylene-terephthalate, polyhexylene terephthalate, polyheptadene-terephthalate, polyoctalene-terephthalate, polyethylene sebacate, polypropylene sebacate, polybutylenesebacate, polyethylene-adipate, polypropylene-adipate, polybutylene-adipate, polypentylene-adipate, polyhexylene adipate, polyheptadene-adipate, polyoctalene-adipate, polyethylene-glutarate, polypropylene-glutarate, polybutylene-glutarate, polypentylene-glutarate, polyhexylene glutarate, polyheptadene-glutarate, polyoctalene-glutarate polyethylene-pimelate, polypropylene-pimelate, polybutylene-pimelate, polypentylene-pimelate, polyhexylene pimelate, polyheptadene-pimelate, poly(propoxylated bisphenol-fumarate), poly(propoxylated bisphenol-succinate), poly(propoxylated bisphenol-adipate), poly(propoxylated bisphenol-glutarate), SPAR™ (Dixie Chemicals), BECKOSOL™ (Reichhold Chemical Inc), ARAKOTE™ (Ciba-Geigy Corporation), HETRON™ (Ashland Chemical), PARAPLEX™ (The Dow Chemical Company), POLYLITE™ (Reichhold Chemical Inc), PLASTHALL™ (The Dow Chemical Company), CYGAL™ (American Cyanamide), ARMCO™ (Armco Composites), ARPOL™ (Ashland Chemical), CELANEX™ (Celanese Eng), RYNITE™ (DuPont), STYPOL™ (Freeman Chemical Corporation), sulfonated polyesters, mixtures thereof and the like. Examples of polyester based polymers may include alkali copoly(5 sulfoisophthaloyl)-co-poly(ethylene-adipate), alkali copoly(5-sulfoisophthaloyl) copoly(propylene-adipate), alkali copoly(5-sulfoisophthaloyl)-copoly(butyleneadipate), alkali copoly(5-sulfo-isophthaloyl)-copoly(pentylene-adipate), and alkali copoly(5-sulfoiosphthaloyl)-copoly (octylene-adipate), alkalicopoly(5-sulfo-isophthaloyl) copoly(ethylene-adipate), alkalicopoly(5-sulfo-isophthaloyl)-copoly (propylene-adipate), alkali copoly(5-sulfo-isophthaloyl)-co-poly(butylene-adipate), alkali copoly(5-sulfo isophthaloyl)-copoly(pentylene-adipate), alkali copoly(5-sulfo-isophthaloyl) copoly(hexylene-adipate), alkali copoly(5-sulfoisophthaloyl)-copoly(octylene-adipate), alkali copoly(5-sulfoisophthaloyl)-copoly (ethylene-succinate), alkali copoly(5-sulfoisophthaloyl-copoly(butylene-succinate), alkali copoly(5-sulfoisophthaloyl) copoly(hexylene-succinate), alkali copoly(5-sulfoisophthaloyl)-copoly(octylene succinate), alkali copoly(5-sulfo-isophthaloyl)-copoly(ethylene-sebacate), alkali copoly(5-sulfo-isophthaloyl)-copoly(propylene-sebacate), alkali copoly(5-sulfo isophthaloyl)-copoly (butylene-sebacate), alkali copoly(5-sulfo-isophthaloyl) copoly(pentylene-sebacate), alkali copoly(5-sulfo-isophthaloyl)-copoly(hexylene-sebacate), alkali copoly(5-sulfo-isophthaloyl)-copoly(octylene-sebacate), alkali copoly(5 sulfo-isophthaloyl)-copoly (ethylene-adipate), alkali copoly (5-sulfo-isophthaloyl) copoly(propylene-adipate), alkali copoly(5-sulfo-iosphtaloyl)-copoly(butylene-adipate), alkali copoly(5-sulfo-isophthaloyl)-copoly(pentylene-adipate), alkali copoly(5-sulfo isophthaloyl) copoly(hexylene-adipate), poly(octylene-adipate). Mixtures of two or more of the above polymers may also be used, if desired.

In one embodiment, thermoplastic polymer is a polyester, as described in the WO Publication No. 2009/02155, incorporated herein by reference. Such polyesters comprise a polyester containing structural units derived from a carboxylic acid having a valence of 3 or higher.

In one embodiment, the binder resin may be a polyester resin, as described in the US Publication No. 2009/0017393, incorporated herein by reference. Examples of suitable polyester resins include polyethylene-terephthalate, polypropylene-terephthalate, polybutylene-terephthalate, polypentylene-terephthalate, polyhexylene-terephthalate, polyheptadene-terephthalate, polyoctalene-terephthalate, polyethylene-sebacate, polypropylene sebacate, polybutylene-sebacate, polyethylene-adipate, polypropylene-adipate, polybutylene-adipate, polypentylene-adipate, polyhexylene-adipate, polylheptadene-adipate, polyoctalene-adipate, polyethylene-glutarate, polypropylene-glutarate, polybutylene-glutarate, polypentylene-glutarate, polyhexylene-glutarate, polyheptadene-glutarate, polyoctalene-glutarate polyethylene-pimelate, polypropylene-pimelate, polybutylene-pimelate, polypentylene-pimelate, polyhexylene-pimelate, polyheptadene-pimelate, poly(propoxylated bisphenol-fumarate), poly(propoxylated bisphenol-succinate), poly(propoxylated bisphenol-adipate), poly(propoxylated bisphenol-glutarate) and mixtures thereof.

In one embodiment, thermoplastic polymer is a polyester, as described in the EP Patent No. 2015142, incorporated herein by reference. Such polyesters resins may be selected from the group consisting of polyethylene terephthalate, polypropylene-terephthalate, polybutylene-terephthalate, polypentylene-terephthalate, polyhexylene-terephthalate, polyheptadene-terephthalate, polyoctalene-terephthalate, polyethylene-sebacate, polypropylene sebacate, polybutylene-sebacate, polyethylene-adipate, polypropylene-adipate, polybutylene adipate, polypentylene-adipate, polyhexylene-adipate, polyheptadene-adipate, polyoctalene-adipate, polyethylene-glutarate, polypropylene-glutarate, polybutylene-glutarate, polypentylene-glutarate, polyhexylene-glutarate, polyheptadene-glutarate, polyoctalene-glutarate polyethylene-pimelate, polypropylene-pimelate, polybutylene-pimelate, polypentylene-pimelate, polyhexylene-pimelate, polyheptadene-pimelate, poly(propoxylated bisphenol-fumarate), poly(propoxylated bisphenol-succinate), poly(propoxylated bisphenol-adipate), poly(propoxylated bisphenol-glutarate) and mixtures thereof. a polyester resin, such as a sodio-sulfonated polyester resin. Examples of suitable polyester resins include polyethylene-terephthalate, polypropylene-terephthalate, polybutylene-terephthalate, polypentylene-terephthalate, polyhexylene-terephthalate, polyheptadene-terephthalate, polyoctalene-terephthalate, polyethylene-sebacate, polypropylene sebacate, polybutylene-sebacate, polyethylene-adipate, polypropylene-adipate, polybutylene-adipate, polypentylene-adipate, polyhexylene-adipate, polyheptadene-adipate, polyoctalene-adipate, polyethylene-glutarate, polypropylene-glutarate, polybutylene glutarate, polypentylene-glutarate, polyhexylene-glutarate, polyheptadene-glutarate, polyoctalene-glutarate polyethylene-pimelate, polypropylenepimelate, polybutylene-pimelate, polypentylene-pimelate, polyhexylene-pimelate, polyheptadene-pimelate, poly(propoxylated bisphenol-fumarate), poly(propoxylated bisphenol-succinate), poly(propoxylated bisphenol-adipate), poly(propoxylated bisphenol-glutarate) and mixtures thereof.

In one embodiment, thermoplastic polymer is a polyester, as described in the EP Patent No. 2012185, incorporated herein by reference. Such polyesters are obtainable by polycondensing an alcohol component and a carboxylic acid component wherein the carboxylic acid component contains a fumaric acid-modified rosin. The polyester has a softening point of preferably from 90° to 160° C., more preferably from 95° to 155° C., and even more preferably from 100° to 150° C., from the viewpoint of fixing ability, storage ability, and durability. The polyester has a glass transition temperature of preferably from 45° to 75° C., more preferably from 50° to 75° C., and even more preferably from 50° to 70° C., from the viewpoint of fixing ability, storage ability, and durability. The polyester has an acid value of preferably from 1 to 80 mg KOH/g, more preferably from 5 to 60 mg KOH/g, and even more preferably from 5 to 50 mg KOH/g, and a hydroxyl value of preferably from 1 to 80 mg KOH/g, more preferably from 8 to 50 mg KOH/g, and even more preferably from 8 to 40 mg KOH/g, from the viewpoint of triboelectric chargeability and environmental stability.

In one embodiment, thermoplastic polymer is a polyester, as described in the US Publication No. 2008/0318145, incorporated herein by reference. Such polyester tonor particles are created by the emulsion/aggregation (EA) process are illustrated in a number of patents, such as U.S. Pat. No. 5,593,807, U.S. Pat. No. 5,290,654. U.S. Pat. No. 5,308,734, and U.S. Pat. No. 5,370,963, each of which are incorporated herein by reference in their entirety.

In one embodiment, thermoplastic polymer is a polyester, as described in the EP Patent No. 1482381, incorporated herein by reference. Such polyesters are obtained by polycondensation of raw material monomers including an alcohol component containing a dihydric or higher polyhydric alcohol and a carboxylic acid component containing a dicarboxylic or higher polycarboxylic acid compound. The polyester may be an amorphous polyester. The amorphous polyester may have a ratio of the softening point to the maximum peak temperature of heat of fusion (softening point/maximum peak temperature of heat of fusion) of more than 1.3 and 4.0 or less, preferably from 1.5 to 3. The amorphous polyester has a softening point of preferably from 80° to 160° C. from the viewpoints of storage property and fixing ability. The acid value of the polyester is preferably from 0.5 to 60 mg KOH/g, and the hydroxyl value is preferably from 1 to 60 mg KOH/g, from the viewpoints of dispersibility of the colorant and transferability. In the case of a positively chargeable toner, the acid value of the polyester is preferably 5 mg KOH/g or less, more preferably from 0.5 to 5 mg KOH/g, from the viewpoint of securing an even higher durability.

In one embodiment, thermoplastic polymer is a polyester, as described in the EP Patent No. 1482382, incorporated herein by reference. Such polyesters may be any of amorphous polyesters or crystalline polyesters. The term "crystalline" means that the polyester has a ratio of the softening point to the maximum peak temperature of heat of fusion (softening point/maximum peak temperature of heat of fusion) of from 0.6 to 1.3, preferably from 0.9 to 1.2, more preferably greater than 1 and 1.2 or less. The term "amorphous" means that the polyester has a ratio of the softening point to the maximum peak temperature of heat of fusion (softening point/maximum peak temperature of heat of fusion) of greater than 1.3 and 4 or less, preferably from 1.5 to 3. The polyester is obtained by polycondensation of raw material monomers including an alcohol component containing dihydric or higher polyhydric alcohols with a carboxylic acid component containing dicarboxylic or higher polycarboxylic acid compounds. The polyester can be prepared by, for instance, polycondensation of the alcohol component and the carboxylic acid component under reduced pressure at a temperature of 180° to 250° C. in an inert gas atmosphere, in the presence of an esterification catalyst as desired. The amorphous polyester has a softening point of preferably from 80° to 165° C. and a glass transition temperature of preferably from 50° to 85° C. Also, the amorphous polyester has an acid value of preferably from 0.5 to 60 mg KOH/g, from the viewpoints of the dispersibility and the transferability of the colorant. Even more preferably, in the case of a positively chargeable toner, the acid value is preferably from 0.5 to 20 mg KOH/g, more preferably from 3 to 10 mg KOH/g. Also, in the case of a negatively chargeable toner, the acid value is preferably from 10 to 60 mg KOH/g. The hydroxyl value is preferably from 1 to 60 mg KOH/g, more preferably from 5 to 60 mg KOH/g, even more preferably from 10 to 50 mg KOH/g. Further, it is preferable that the polyester contains a high-softening point polyester and a low-softening point polyester. It is desired that the softening point of the high-softening point polyester is 120° C. or higher and 170° C. or lower, preferably from 130° to 170° C., more preferably from 135° to 155° C., and that the softening point of the low softening point polyester is from 80° C. or higher and less than 120° C., preferably from 90° to 115° C., more preferably from 95° to 110° C. The difference in softening point between the high-softening point polyester and the low-softening point polyester is preferably 10° C. or more, more preferably from 20° to 80° C., even more preferably from 30° to 60° C. It is preferable that both of the high-softening point polyester and the low softening point polyester are an amorphous polyester, and that the difference between the softening point and the glass transition temperature is preferably 20° C. or more, more preferably from 30° to 100° C. The weight ratio of the high-softening point polyester to the low-softening point polyester (high-softening point polyester/low-softening point polyester) is preferably from 5/95 to 95/5, more preferably from 20/80 to 90/10. Each of the high-_softening point polyester and the low-softening point polyester may be a mixture of a plurality of polyesters. The hybrid resin may be obtained by using two or more resins as raw materials, or it may be obtained by using one resin and raw material monomers of the other resin. Further, the hybrid resin may be obtained from a mixture of raw material monomers of two or more resins. In order to efficiently obtain a hybrid resin, those obtained from a mixture of raw material monomers of two or more resins are preferable.

In one embodiment, thermoplastic polymer is a polyester, as described in the US Publication No. 2005/0271965, incorporated herein by reference. Such polyesters comprise a resin binder containing a crystalline polyester, and further contains at least a colorant. The amount of the crystalline polyester in the resin binder is preferably 50% by weight or more, more preferably 70% by weight or more, and even more preferably 80% by weight or more, from the viewpoint of low-temperature fixing ability. Other resin components besides the crystalline polyester include amorphous polyesters, polyester-polyamides, vinyl resins such as styrene-acrylic resins, hybrid resins in which a plural resin components are partially chemically bonded to each other. These resin components can be used in admixture of two or more kinds. From the viewpoint of compatibility of these resins with the crystalline polyester and fixing ability of the resulting toner, the hybrid resin having an amorphous polyester component and a vinyl resin component, and the amorphous polyester are preferable. Among them, the amorphous polyester is more preferable. The crystalline polyester may have acidic groups at the terminal of the molecule. The acidic group includes a carboxyl group, a sulfonate group, a phosphonate group, a sulfinate group and the like. The carboxyl group is preferable from the viewpoint of satisfying both the emulsifiability of the resin and environmental durability of the toner prepared therefrom. The crystalline polyester having acidic groups to be used in the present invention can be prepared by a usual polycondensation reaction. In other words, the crystalline polyester can be prepared by a dehydration polycondensation of acid components and alcohol components as raw materials, in the presence of a catalyst. In addition, a cross-linked structure can be introduced into the polyester by using a polycarboxylic acid such as trimellitic acid as an acid component or a polyhydric alcohol such as pentaerythritol as an alcohol component as occasion demands. In this case, the number of acidic groups at the terminal of the molecule can be 3 or more per molecule. The amount of the acidic groups in the main chain of the polyester molecule is preferably 5% mole or less, more preferably 3% mole or less, and even more preferably 1% mole or less, based on the number of moles of the entire acid component constituting the polyester, from the viewpoint of inhibition of crystallization. In addition, the molar ratio as expressed by (acidic groups in the main chain of the molecule)/(acidic groups at the terminal of the molecule) in the polyester is, for example, 30% mole or less, preferably 20% mole or less, more preferably 10% mole or less, even more preferably 5% mole or less, and even more preferably 2% mole or less, from the same viewpoint. Here, the acidic groups in the main chain of the molecule refer to acidic groups other than the acidic groups at the terminal of the molecule; for example, a sulfonate group in the case where a dicarboxylic acid into which a sulfonate group is introduced is used as an acid component. The amount of the acidic groups at the terminal of the molecule of the crystalline polyester to be used in the present invention is one of important factors for determining the stability of the emulsion particles and the particle size distribution and particle size of the toner. In order to stabilize the emulsion particles and obtain a toner having a small particle size with a sharp particle size distribution, the above-mentioned amount of the acidic groups at the terminal of the molecule is, for example, preferably from 0.015 to 0.9 mmol, more preferably from 0.08 to 0.85 mmol, even more preferably from 0.15 to 0.8 mmol, and even more preferably from 0.25 to 0.75 mmol, per 1 g of the crystalline polyester. The amount of the acidic groups in the main chain of the crystalline polyester molecule and at the terminal of the molecule thereof can be calculated from the structures and the charging ratio of the raw material acid and the raw material alcohol for the crystalline polyester, the number-average molecular weight of the crystalline polyester, and the determination of the acid value. Also, the amount can be obtained by using an analytic means such as nuclear magnetic resonance spectroscopy (NMR) or X-ray photoelectron spectroscopy (XPS, ESCA) in combination with the determination of the acid value. Here, the amount of the acidic groups in the present invention include neutralized acidic groups. The crystalline polyester has an acid value of, for example, preferably from 1 to 50 mg KOH/g, more preferably from 5 to 48 mg KOH/g, even more preferably from 10 to 45 mg KOH/g, and even more preferably from 15 to 40 mg KOH/g, per 1 g of the crystalline polyester, from the viewpoint of stabilizing the emulsion particles and obtaining a toner having a small particle size with a sharp particle size distribution. The crystalline polyester has a melting point of preferably from 60° to 150° C., more preferably from 60° to 130° C., and even more preferably from 60° to 120° C., from the viewpoint of low-temperature fixing ability. The crystalline polyester has a number-average molecular weight of, for example, preferably from 2000 to 100000, more preferably from 2000 to 20000, even more preferably from 2000 to 10000, and even more preferably from 2000 to 8000, from the viewpoint of emulsifiability, fixing ability and offset resistance. The extent of the crystallinity of the polyester is expressed by crystallinity index as defined by a ratio of the softening point to the temperature of the maximum endothermic peak determined by a differential scanning calorimeter, i.e. (softening point)/(temperature of the maximum endothermic peak). Generally, when the value for the crystallinity index exceeds 1.5, the resin is amorphous, and when the value is less than 0.6, the crystallinity is low, and much of the portions are amorphous. The crystalline polyester may have a crystallinity index of from 0.6 to 1.5. The crystalline polyester has a crystallinity index of preferably from 0.8 to 1.3, more preferably from 0.9 to 1.1, and even more preferably from 0.98 to 1.05, from the viewpoint of low-temperature fixing ability. In addition, the extent of the crystallinity can be adjusted by the kinds of the raw material monomers and a ratio thereof, preparation conditions (for example, reaction temperature, reaction time, cooling rate), and the like.

In one embodiment, thermoplastic polymer is a polyester, as described in the U.S. Pat. No. 3,910,840, incorporated herein by reference. Such polyesters comprise crystalline polyesters stable polyester lattices comprising admixing under high shear agitation a polyester having an acid content of at least about 0.02 milliequivalents per gram of polyester with sufficient aqueous basic solution to render the pH of the resulting latex above at least about 8. The termination of such polyester chains may either be by an acid, hydroxyl or ester function. Either hydroxyl or ester termination can be thermally degraded in a controllable manner to form the required acid-containing polyesters. Thermal degradation provides a controllable means of regulating the acid content of polyesters. Polyesters pretreated in this manner have been found to be readily emulsifiable upon reaction with a basic solution. Controlled degradation can be obtained by heating the polyester at temperatures about the melting point, generally ranging from at least about 200° C., to below the degradation temperature of the polyester. This will, of course, vary with the particular polyester employed. Heating is continued until the desired acid content is obtained. Depending upon the nature of the particular polyester and the temperature employed, heating can be continued for from about 1 to about 2 hours. The acid groups in the polymer whether present initially in the molecule of formed by the controlled degradation described hereinabove need not be limited to carboxylic acid groups. Instead the acid group can be any acid group such as carboxylic, phosphonic, sulfonic and/or their metal salts. In the event the metal salts of these acids are employed, the need for admixture with a basic solution is reduced and may even be eliminated. However, the pH of the resulting emulsion must still be at least about 8, and preferably, at least about 10 in order to obtain a stable emulsion. These acid groups may be chemically attached to the polymer molecule by means well known in the art. For example, these groups may be present on the starting monomers used to form the polymer or they can be grafted to the polymer after polymerization. The polyester has a minimum acid content of at least about 0.02 milliequivalents pre gram of polyester. The acid content ranges from about 0.05 to about 1.5 milliequivalents per gram of polyester. Exemplary polyesters can be either crystalline or amorphous polyesters exhibiting an acid content of at least 0.02 milliequivalents per gram of polyester. The polyesters can be of varying molecular weight, for example, relatively low molecular weight are preferred. Polyesters exhibiting a molecular weight (Mw) less than about 20,000 are most preferred. Illustrative polyesters are poly (xylylene sebacate), poly (diethylene glycol terephthalate), poly (1,2 propylene isophthalate), poly (hexamethylene sebacate), poly (1,2 propylene terephthalate), the condensation product of 1,2 propylene glycol, hydroquinone di-(β-hydroxyethyl) etherand terephyhalic acid or an ester thereof, the propylene glycol adduct of bisphenol A condensed with terephthalic, isophthalic or phthalic acid and copolymers thereof with propylene glycol, and the like.

In one embodiment, thermoplastic polymer is a polyester, as described in the US Publication No. 2003/0232268, incorporated herein by reference. Such polyesters comprise a hydrophilic sulfonated polyester resin of the formula

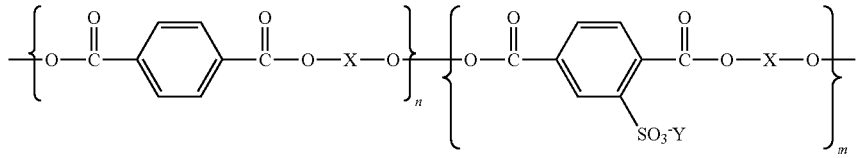

wherein Y is an alkali metal; X is selected from the group consisting of an alkylene, an oxy alkylene, and the like; and n and m represent the number of segments; a process wherein each of n and m represent a number of from about 3,000 to about 7,000, or from about 4,000 to about 6,000; process wherein the wax is a Carnauba wax, a paraffin wax, a montan wax, a microcrystalline polyethylene wax, a polybutylene wax, a polyethylene-acrylic wax, a polyester wax, a polyamide wax, a known Fischer-Tropasch wax, or mixture thereof; a process wherein each of the alkylene and the oxyalkylene contains from about 2 to about 20 carbon atoms; a process wherein the Y alkali is sodium, lithium, potassium, rubidium, cesium, hydrogen or mixtures thereof. Wherein the polyester is copoly(1,2-propylene-dipropylene--5-sulfoisophthalate)-copoly(1,2-propylene-dipropylene terephthalate), the magnesium salt of copoly(1,2-propylene-diethylene-5-sulfoisophthalate)-co-poly(1,2-propylene-di-ethylene terephthalate), the calcium salt of copoly(1,2-propylene-dipropylene-5-sulfoisophthalate)-copoly(1,2-propylen-e-dipropylene terephthalate), the barium salt of copoly(1,2-propylene-diet-hylene-5-sulfoisophthalate)-co-poly(1,2-propylene-diethylene terephthalate), and the like optionally including mixtures thereof. wherein the polyester is selected from the group consisting of sodio copoly(1,2-propylene-dipropylene-5-sulfoisophth-alate)-copoly (1,2-propylene-dipropylene terephthalate), lithio copoly(1,2-propylene-diethylene-5-sulfoisophthalate)-copoly(1,2-propylene- -diethylene terephthalate), potasio copoly(1,2-dipropylene-5-sulfoisophtha-late)-copoly(1,2-propylene terephthalate), sodio copoly(1,3-butylene-5-sul-foisophtha-late)-copoly(1,3-butylene terephthalate), lithio copoly(1,2-dipropylene-5-sulfoisophthalate)-copoly(1,2-propylene terephthalate), potasio copoly(1,3-butylene-5-sulfoisophtha-late)-copoly(1,3-butylene terephthalate), sodio copoly(1,2-propylene-diethylene-5-sulfoi-sophthalate)-copoly(1,2-propylene-diethylene terephthalate), lithio copoly(1,2-dipropylene-5-sulfo isophthalate)-copoly(1,2-propylene terephthalate), potasio copoly(1,3-butylene-5-sulfoisophtha-late)-copoly(1-,3-butylene terephthalate), and sodio copoly (1,2-dipropylene-5-sulfoisopht-halate)-copoly(1,2-propylene terephthalate), potasio copoly(1,3-butylene-5-sulfoisophthalate)-copoly(1,3-butylene terephthalate). Illustrative examples of polyesters include, for example, a sulfonated polyester resin as illustrated, for example, in U.S. Pat. Nos. 5,348,832; 5,853,944; 5,840,462; 5,660,965; 5,658,704; 5,648,193; and 5,593,807; the disclosures of each patent being totally incorporated herein by reference, and for example, wherein the polyester is of the formula

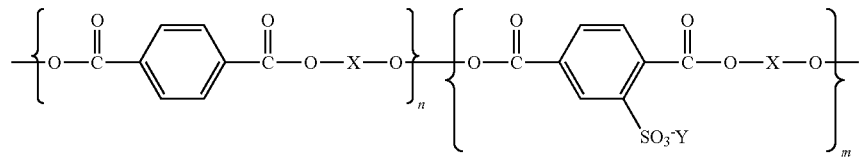

wherein Y is an alkali metal for the first polyester, such as sodium; X is an alkylene, and n and m represent the number of segments, and wherein each is, for example, a number of about 5 to about 5,000, and more specifically, from about 1,000 to about 2,000, and wherein the weight average molecular weight of the polyester is, for example, from about 2,000 grams per mole to about 100,000 grams per mole, and more specifically, from about 4,000 to about 70,000 grams per mole; the number average molecular weight is from about 1,000 grams per mole to about 50,000 grams per mole, and more specifically, from about 2,000 to about 20,000 grams per mole, and the polydispersity thereof is, for example, from about 2 to about 18, and more specifically, from about 2 to about 7, as measured by gel permeation chromatography. Wherein the formula of the polyester resin is

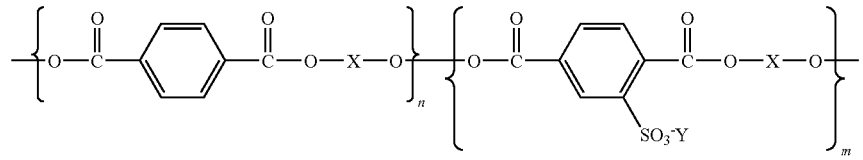

wherein Y is an alkali (II) metal, such as a magnesium (Mg$^{++}$), beryllium (Be$^{++}$), calcium (Ca$^{++}$); X is as indicated herein; and n and m represent the number of segments of about 10 to about 1,000 each, and wherein the weight average molecular weight is from about 2,000 grams per mole to about 100,000 grams per mole, the number average molecular weight is from about 1,000 grams per mole to about 50,000 grams per mole, and the polydispersity is from about 2 to about 18 as measured by gel permeation chromatography. Polyester examples are as indicated herein, and more specifically, examples of a number of polyesters are the beryllium salt of copoly(1,2-propylene-dipropylene-5-sulfoisophthalate)-copoly(1,2-propylen-e-dipropylene terephthalate), the barium salt of copoly(1,2-propylene-diethylene-5-sulfoisophthalate)-copoly(1,2-propylene-diethylene terephthalate), the magnesium salt of copoly(1,2-dipropylene-5-sulfoisoph-thalate)-copoly(1,2-propylene terephthalate), the magnesium salt of copoly(1,3-butylene-5-sulfoisophthalate)-copoly(1,3-butylene terephthalate), the calcium salt of copoly(1,2-dipropylene-5-sulfoisophthalate)-copoly(1,2-propylene terephthalate), the calcium salt of copoly(1,3-butylene-5-sulfoisophthalate)-copoly(1,3-butylene terephthalate), the cobalt salt of copoly(1,2-propylene-diethylene-5-sulf-o isophthalate)-copoly(1,2-propylene-diethylene terephthalate), the nickel salt of copoly(1,2-dipropylene-5-sulfoisophthalate)-copoly(1,2-propylene terephthalate), the iron salt of copoly(1,3-butylene-5-sulfoisophthalate)- -copoly(1,3-butylene terephthalate), the zirconium salt of copoly(1,2-dipropylene-5-sulfo isophthalate)-copoly(1,2-propylene terephthalate), the chromium salt of copoly(1,3-butylene-5-sulfoisophthal-ate)-copoly(1,3-butylene terephthalate), and the like.

In one embodiment, thermoplastic polymer is a polyester, as described in the U.S. Pat. No. 6,395,445, incorporated herein by reference. Such polyesters comprise crystalline polyesters, the polyester, most preferably a sulfonated polyester, may be formed from any suitable acid and alcohol. Preferably, the polyester is derived from one or more terephthalates and one or more glycols. For example, the polyester may be derived from a reaction that includes, for example, three glycol components. In a most preferred embodiment herein, the polyester is a sulfonated polyester derived from a reaction of dimethylterephthalate, sodium dimethyl 5-sulfoisophthalate, propanediol, diethylene glycol and dipropylene glycol. Additional examples of sulfonated polyesters which may be used in the present invention include those illustrated in U.S. Pat. Nos. 5,593,807 and 5,945,245, the disclosures of which are totally incorporated herein by reference, for example including sodium sulfonated polyester, and more specifically, a polyester such as poly(1,2-propylene-sodio 5-sulfoisophthalate), poly(neopentylene-sodio 5-sulfoisophthalate), poly(diethylene-sodio 5-sulfoisophthalate), copoly(1,2-propylene-sodio 5-sulfoisophthalate)-copoly-(1,2-propylene-terephthalate-phthalate), copoly(1,2-propylene-diethylene-sodio 5-sulfoisophthalate)-copoly-(1,2-propylene-diethylene-terephthalate-phthalate), copoly(ethylene-neopentylene-sodio 5-sulfoisophthalate)-copoly-(ethylene-neopentylene-terephthalate-phthalate), and copoly(propoxylated bisphenol A)-copoly-(propoxylated bisphenol A-sodio 5-sulfoisophthalate). The sulfonated polyesters may in embodiments be represented by the following formula, or random copolymers thereof wherein the n and p segments are separated.

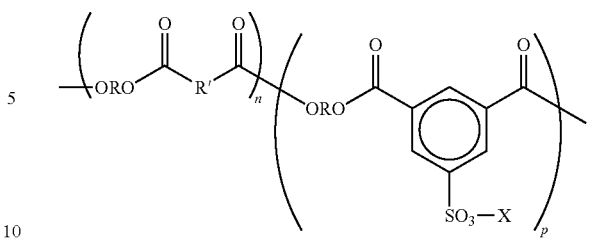

wherein R is an alkylene of, for example, from 2 to about 25 carbon atoms such as ethylene, propylene, butylene, oxyalkylene diethyleneoxide, and the like; R' is an arylene of, for example, from about 6 to about 36 carbon atoms, such as a benzylene, bisphenylene, bis(alkyloxy) bisphenolene, and the like; and p and n represent the number of randomly repeating segments, such as for example from about 10 to about 10,000. The alkali sulfopolyester possesses, for example, a number average molecular weight (Mn) of from about 1,500 to about 50,000 grams per mole and a weight average molecular weight (Mw) of from about 6,000 grams per mole to about 150,000 grams per mole as measured by gel permeation chromatography and using polystyrene as standards.

In one embodiment, thermoplastic polymer is a polyester, as described in the US Publication No. 2006/0223934, incorporated herein by reference. Such polyesters comprise crystalline polyesters, Examples of crystalline resins suitable for use herein include, for example, alkali sulfonated polyester resin. Specific crystalline resin examples include by are not limited to alkali copoly(5-sulfoisophthaloyl)-copoly(ethylene-adipate), alkali copoly(5-sulfoisophthaloyl)-copoly(propylene-adipate), alkali copoly(5-sulfoisophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfo-isophthaloyl)-copoly(ethylene-adipate), alkali copoly(5-sulfo-isophthaloyl)-copoly (propylene-adipate), alkali copoly(5-sulfo-isophthaloyl)-copoly (butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly (5-sulfoisophthaloyl)-copoly(ethylene-succinate), alkali copoly(5-sulfoisophthaloyl)-copoly(propylene-succinate), alkali copoly(5-sulfoisophthaloyl)-copoly(butylenes-succinate), alkali copoly(5-sulfoisophthaloyl)-copoly(pentylene-succinate), alkali copoly(5-sulfoisophthaloyl)-copoly(hexylene-succinate), alkali copoly(5-sulfoisophthaloyl)-copoly (octylene-succinate), alkali copoly(5-sulfo-isophthaloyl)-copoly(ethylene-sebacate), alkali copoly(5-sulfo-isophthaloyl)-copoly(propylene-sebacate), alkali copoly(5-sulfo-isophthaloyl)-copoly(butylene-sebacate), alkali copoly(5-sulfo-isophthaloyl)-copoly(pentylene-sebacate), alkali copoly(5-sulfo-isophthaloyl)-copoly(hexylene-sebacate), alkali copoly(5-sulfo-isophthaloyl)-copoly(octylene-sebacate), alkali copoly(5-sulfo-isophthaloyl)-copoly(ethylene-adipate), alkali copoly(5-sulfo-isophthaloyl)-copoly (propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), poly (octylene-adipate), and wherein alkali is a metal such as sodium, lithium or potassium. The crystalline resin can possess various melting points of, for example, from about 30° C. to about 120° C., and preferably from about 50° C. to about 90° C., and, for example, a number average molecular weight (Mn), as measured by gel permeation chromatography (GPC) of, for example, from about 1,000 to about 50,000, and preferably from about 2,000 to about 25,000; with a weight average molecular weight (Mw) of the resin of, for example, from about 2,000 to about 100,000, and preferably from about 3,000 to about 80,000, as determined by Gel Permeation Chromatography using polystyrene standards. The molecular weight distribution (Mw/Mn) of the crystalline resin is, for example, from about 2 to about 6, and more specifically, from about 2 to about 4. The linear and branched amorphous sulfonated polyester resins, in embodiments possess, for example, a number average molecular weight (Mn), as measured by GPC, of from about 10,000 to about 500,000, and preferably from about 5,000 to about 250,000; a weight average molecular weight (Mw) of, for example, from about 20,000 to about 600,000, and preferably from about 7,000 to about 300,000, as determined by GPC using polystyrene standards; and a molecular weight distribution (Mw/Mn) of, for example, from about 1.5 to about 6, and more specifically, from about 2 to about 4. The linear amorphous polyester resins are generally prepared by the polycondensation of an organic diol and a diacid or diester, at least one of which is sulfonated or a sulfonated difunctional monomer being included in the reaction, and a polycondensation catalyst. For the branched amorphous sulfonated polyester resin, the same materials may be used, with the further inclusion of a branching agent such as a multivalent polyacid or polyol.

In one embodiment, thermoplastic polymer is a polyester, as described in the US Publication No. 2007/088119, incorporated herein by reference. Such polyesters comprise crystalline polyesters, the polyester contained in the resin containing acidic group may be either a crystalline polyester or an amorphous polyester. The degree of crystallinity of the polyester may be expressed by a crystallinity index defined by a ratio of a softening point to a maximum endothermic peak temperature as measured by a differential scanning colorimeter (softening point/maximum endothermic peak temperature). In general, when the above ratio exceeds 1.5, the resin becomes amorphous, whereas when the ratio is less than 0.6, the resin exhibits a low crystallinity and contains a large amount of an amorphous portion. Therefore, the crystalline polyester preferably has a crystallinity index of 0.6 to 1.5. In view of good low-temperature fusing ability, the crystallinity index of the crystalline polyester is more preferably from 0.8 to 1.3 and even more preferably from 0.9 to 1.1. The degree of crystallinity of the polyester may be controlled according to the kinds and blending ratios of raw monomers, production conditions (such as, e.g., reaction temperature, reaction time and cooling rate), etc. Here, the maximum endothermic peak temperature means a temperature of such a peak located on a highest temperature side among endothermic peaks observed. When a difference between the maximum endothermic peak temperature and the softening point is within 20° C., the peak temperature is regarded as a melting point, whereas when the difference between the maximum endothermic peak temperature and the softening point exceeds 20° C., the peak is regarded as a peak attributed to a glass transition of the resin. The methods of measuring the softening point and the endothermic maximum peak temperature which define the crystallinity index, are explained in detail below. The resin contains an acid group, and the acid group is preferably bonded to a terminal end of a molecule of the resin containing acidic group. Examples of the acid group include a carboxyl group, a sulfonic group, a phosphonic group and a sulfinic group. Among these acid groups, from the viewpoint of satisfying both good emulsifiability of the resin and good environmental resistance of the resulting toner, preferred is a carboxyl group. The amount of the acid group bonded to a terminal end of a molecule of the resin containing acidic group is an important factor for attaining good stability of emulsified particles and determining the particle size distribution and particle size of the resulting toner. The resin binder preferably has an acid value of 10 to 50 mg KOH/g, more preferably 12 to 45 mg KOH/g, even more preferably 15 to 40 mg KOH/g and even more preferably 15 to 30 mg KOH/g in order to stabilize the emulsified particles and obtain a toner having a small particle size and a narrow particle size distribution. The amorphous polyester suitably satisfies at least one property selected from a softening point of 95 to 160° C., a glass transition point of 50 to 75° C., an acid value of 1 to mg KOH/g and a hydroxyl value of 3 to 60 mg KOH/g. The number-average molecular weight of the amorphous polyester is preferably from 1,000 to 100,000, more preferably from 1,000 to 50,000 and even more preferably from 1,000 to 12,000 from the viewpoint of good durability and good fusing ability. The content of the amorphous polyester in the resin binder is preferably 60% by weight or more and more preferably 70% by weight or more from the viewpoint of good durability and good chargeability of the resulting toner. When the crystalline polyester is used in order to achieve good low-temperature fusing ability, the number-average molecular weight of the crystalline polyester is preferably from 2,000 to 100,000, more preferably from 2,000 to 20,000, even more preferably from 2,000 to 10,000 and even more preferably from 2,000 to 8,000 from the viewpoints of good emulsifiability, good fusing ability and good offset resistance. The softening point or melting point of the crystalline polyester is preferably from 60 to 150° C., more preferably from 60 to 130° C. and even more preferably from 60 to 120° C. from the viewpoint of good low-temperature fusing ability.

In one embodiment, thermoplastic polymer is a polyester, as described in the US Publication No. 2007/0212628, incorporated herein by reference. Such polyesters comprise crystalline polyesters, examples of the resin binder include polyesters, styrene-acryl resins, epoxy resins, polycarbonates and polyurethanes. Among these resins, preferred are polyesters and styrene-acryl copolymers, and more preferred are polyesters in view of good dispersibility of colorants therein, good fixing property and good durability. The content of the polyesters in the resin binder is preferably 60% by weight or more, more preferably 70% by weight or more and even more preferably 80% by weight or more. The polyester contained in the resin binder may be either a crystalline polyester or an amorphous polyester. The polyester preferably contains an acid group bonded to a terminal end of a molecular chain thereof. Examples of the acid group include a carboxyl group, a sulfonic group, a phosphonic group and a sulfinic group. Among these acid groups, in view of achieving both good emulsification of the resin and good environmental resistance of a toner produced using the polyester resin, preferred is a carboxyl group. The amount of the acid groups bonded to a terminal end of a molecular chain of the polyester is an important factor for attaining good stability of emulsified particles and determining the particle size distribution and particle size of the resulting toner. In order to stabilize the emulsified particles and obtain a toner having a small particle size and a sharp particle size distribution, the amount of the acid groups bonded to a terminal end of a molecular chain of the polyester is preferably from 0.015 to 0.9 mmol, more preferably from 0.08 to 0.85 mmol, even more preferably from 0.15 to 0.8 mmol and even more preferably from 0.25 to 0.75 mmol per 1 g of the polyester. The acid value of the polyester is, for example, preferably from 1 to 50 mg KOH/g, more preferably from 5 to 48 mg KOH/g, even more preferably from 10 to 45 mg KOH/g and even more preferably from to 40 mg KOH/g in order to stabilize the emulsified particles and to obtain a toner having a small particle size and a sharp particle size distribution. Also, if required, a carboxyl group may be introduced into a main molecular chain of the polyester by using the carboxylic acid component composed of a polyvalent acid such as trimellitic acid and the alcohol component composed of a polyhydric alcohol such as pentaerythritol. The amount of the acid group contained in the main molecular chain of the polyester is preferably 5 mol % or less, more preferably 3 mol % or less and even more preferably 1 mol % or less on the basis of the number of moles of the whole carboxylic acid components constituting the polyester. From the same viewpoints as described above, the molar ratio of the acid groups contained in the main molecular chain of the polyester to the acid groups bonded to the terminal end of the molecular chain of the polyester (moles of acid groups contained in main molecular chain of polyester/moles of acid groups bonded to terminal end of molecular chain of polyester) is preferably 30 mol % or less, more preferably 20 mol % or less, even more preferably 10 mol % or less, even more preferably 5 mol % or less and even more preferably 2 mol % or less. The amount of the acid groups contained in the main molecular chain of the polyester and the acid groups bonded to the terminal end of the molecular chain of the polyester may be respectively calculated from the structures of the raw acid and the raw alcohol of the polyester, the ratio between these raw components charged, the number-average molecular weight of the polyester, and the measurement of the acid value of the polyester. In addition, the amount of these acid groups may be determined by using the measurement of the acid value of the polyester in combination with a nuclear magnetic resonance spectroscopic method (NMR) or photoelectric spectroscopic method (XPS, ESCA, etc.). The content of the polyester in the toner is preferably 60% by weight or higher, more preferably 70% by weight or more and even more preferably from 80 to 95% by weight. The polyester may be produced, for example, by polycondensing the alcohol component and the carboxylic acid component in an inert gas atmosphere at a temperature of about 180 to 250° C., if required, by using an esterification catalyst. The melting point of the crystalline polyester is preferably from 60 to 150° C., more preferably from 60 to 130° C. and even more preferably from 60 to 120° C. in view of good low-temperature fixing property. The softening point of the amorphous polyester is preferably from 95 to 160° C., and the glass transition point thereof is preferably from 50 to 75° C. The number-average molecular weight of the crystalline polyester is preferably from 2,000 to 100,000, more preferably from 2,000 to 20,000, even more preferably from 2,000 to 10,000 and even more preferably from 2,000 to 8,000 in view of good emulsifiability, good fixing property and good offset resistance. The number-average molecular weight of the amorphous polyester is preferably from 1,000 to 100,000, more preferably from 1,000 to 50,000 and even more preferably from 1,000 to 12,000 in view of good durability and good fixing property. The number-average molecular weight of the polyester may be determined by a gel permeation chromatography using polystyrene as a standard sample.

In one embodiment, thermoplastic polymer is a polyester, as described in the US Publication No. 2007/0219313, incorporated herein by reference. Such polyesters comprise crystalline polyesters, the polyester exhibits an excellent hydrolysis resistance. The softening point of the polyester is preferably from 80 to 160° C., more preferably from 85 to 150° C., even more preferably from 90 to 145° C. and further even more preferably from 95 to 140° C. in view of a good fixing property and a good durability. The glass transition point of the polyester is preferably from 40 to 70° C., more preferably from 45 to 70° C. and even more preferably from 50 to 67° C. in view of a good fixing property and a good durability. The acid value of the polyester is preferably from 1 to 40 mg KOH/g, more preferably from 2 to 35 mg KOH/g and even more preferably from 3 to 30 mg KOH/g.

In one embodiment, thermoplastic polymer is a polyester, as described in the US Publication No. 2008/006311, incorporated herein by reference. Such polyesters comprise crystalline polyesters, examples of the resin binder containing acid group include known resins for toners such as polyesters, styrene-acryl copolymers, epoxy resins, polycarbonates and polyurethanes. Among these resins, preferred are polyesters and styrene-acryl copolymers, and more preferred are polyesters, from the viewpoints of a good dispersibility of colorants therein, a good fusing property and a good durability. The content of the polyester in the resin binder is preferably 60% by weight or larger, more preferably 70% by weight or larger, even more preferably 80% by weight or larger and further even more preferably 90% by weight or larger. In the present invention, these resins may be used as the resin binder alone or in combination of any two or more thereof. The polyester contained in the resin binder containing acid group may be either a crystalline polyester or an amorphous polyester. The polyester has a softening point of preferably from 80 to 165° C. and more preferably from 95 to 160° C., and a glass transition point of preferably from 50 to 85° C. and more preferably from 50 to 75° C. in view of a good storage property of the resultant toner. The Polyester has an acid value of preferably from 6 to 30 mg KOH/g, more preferably from 6.5 to 29 mg KOH/g and even more preferably from 7 to 28 mg KOH/g, and a hydroxyl value of preferably from 3 to 60 mg KOH/g. The weight-average molecular weight of the polyester is preferably from 5,000 to 150,000 and more preferably from 10,000 to 120,000, and the number-average molecular weight of the polyester is preferably from 1,000 to 100,000, more preferably from 1,000 to 50,000 and even more preferably from 1,000 to 12,000 from the viewpoints of a good durability and a good fusing property. The resin binder used in the present invention contains an acid group. In particular, the acid group is preferably bonded to a terminal end of a molecular chain of the resin binder containing acid group. Examples of the acid group include a carboxyl group, a sulfonic group, a phosphonic group and a sulfinic group. Among these acid groups, from the viewpoint of satisfying both a good emulsifiability of the resin and a good environmental resistance of the resultant toner, preferred is a carboxyl group. The amount of the acid group bonded to a terminal end of a molecular chain of the resin binder containing acid group is one of important factors for attaining a good stability of emulsified particles and determining a particle size distribution and a particle size of the resultant toner. The resin binder has an acid value of preferably from 6 to 30 mg KOH/g, more preferably from 6.5 to 29 mg KOH/g and even more preferably from 7 to 28 mg KOH/g in order to stabilize the emulsified particles and obtain a toner having a small particle size and a narrow particle size distribution. The resin binder preferably has a softening point of 80 to 165° C. and a glass transition point of 50 to 85° C. The weight-average molecular weight and number-average molecular weight of the resin binder are preferably similar to those of the above polyester.

In one embodiment, thermoplastic polymer is a polyester, as described in the US Publication No. 2009/0123865, incorporated herein by reference. Such polyesters comprise crystalline polyesters, illustrative examples of resins include polyethylene-terephthalate, polypropylene-terephthalate, polybutylene-terephthalate, polypentylene-terephthalate, polyhexylene-terephthalate, polyheptadene-terephthalate, polyoctalene-terephthalate. Sulfonated polyesters such as sodio sulfonated polyesters as described in, for example, U.S. Pat. No. 5,593,807, may also be used. Additional resins, such as polyester resins, are as indicated herein and in the appropriate U.S. patents recited herein, and more specifically, examples further include copoly(1,2-propylene-dipropylene-5-sulfoisophthalate)-copoly(1,2-propylen-e-dipropylene terephthalate), copoly(1,2-propylene-diethylene-5-sulfoisophthalate)-copoly(1,2-propylene-1-diethylene terephthalate), copoly(propylene-5-sulfoisophthalate)-co-poly(1,2-propylene terephthalate), copoly(1,3-butylene-5-sulfoisophthalate)-copoly(1,3-butylene terephthalate), copoly(butylenesulfoisophthalate)-copoly(1,3-butylene terephthalate), and the like. In embodiments, the resin is a styrene butylacrylate resin.

In one embodiment, thermoplastic polymer is a polyester, as described in the US Publication No. 2009/0123863, incorporated herein by reference. Such polyesters comprise crystalline polyesters, the resin binder contains a crystalline polyester having a specified molecular weight, in a specified amount. "Crystallization ratio" means a proportion of a crystalline part in a system containing a melt-kneaded product or the like, based on a proportion of a crystalline part in the crystalline polyester used. In addition, "main component" as used herein refers to a component contained in an amount of 95% by weight or more of the resin binder. The crystallinity of the resin is expressed as a ratio of a softening point to a highest temperature of endothermic peak determined with a differential scanning calorimeter, i.e., softening point/highest temperature of endothermic peak. Generally, when the above-mentioned value exceeds 1.5, the resin is amorphous; and when the value is less than 0.6, the resin is low in crystallinity and mostly amorphous. The crystallinity of the resin can be adjusted by the kinds of the raw material monomers and a ratio thereof, production conditions (for example, reaction temperature, reaction time, and cooling rate), and the like. Crystalline polyester may be a polyester having a ratio of softening point/highest temperature of endothermic peak of from 0.6 to 1.5, and preferably from 0.8 to 1.2, and amorphous resin may be a resin having a ratio of softening point/highest temperature of endothermic peak, of more than 1.5, or less than 0.6, and preferably more than 1.5. The crystalline polyester has a number-average molecular weight of from 5,000 to 10,000, and preferably from 6,000 to 9,000. Crystalline polyester contains high-molecular weight component in a certain amount, from the viewpoint of durability of the toner; therefore, the crystalline polyester has a weight-average molecular weight (Mw) of from 40,000 to 150,000, and preferably from 50,000 to 120,000. The crystalline polyester has a ratio of the weight-average molecular weight (Mw) to the number-average molecular weight (Mn), i.e., Mw/Mn, of preferably from 5 to 20, more preferably from 6 to 18, and even more preferably from 8 to 15, from the viewpoint of durability of the toner. The crystalline polyester has a highest temperature of endothermic peak determined with a differential scanning calorimeter of from 100° to 140° C., preferably from 110° to 140° C., more preferably from 110° to 130° C., and even more preferably from 110° to 120° C., from the viewpoint of fixing ability, storage property and durability of the toner. The crystalline polyester has a softening point of preferably from 70° to 140° C., more preferably from 90° to 130° C., even more preferably from 90° to 110° C., and even more preferably from 90° to 100° C., from the viewpoint of low-temperature fixing ability of the toner. It is preferable that the amorphous resin contains two different kinds of amorphous polyesters of which softening points differ by preferably 10° C. or more, and more preferably 10° to 60° C., from the viewpoint of low-temperature fixing ability and offset resistance of the toner. The low-softening point polyester has a softening point of preferably from 80° to 120° C., and more preferably from 90° to 120° C., from the viewpoint of low-temperature fixing ability of the toner. The high-softening point polyester has a softening point of preferably from 120° to 150° C., and more preferably from 120° to 140° C., from the viewpoint of offset resistance. Here, when the amorphous resin is composed of three or more kinds of resins, it is preferable that the two kinds of resins contained in larger amounts satisfy the above. For example, when the second and third resins in descending order are contained in the same amount, it is preferable that the resin contained in a largest amount and either of the second resins satisfy the above. The weight ratio of the high-softening point polyester to the low-softening point polyester, i.e., high-softening point polyester/low-softening point polyester, is preferably from 1/9 to 9/1, and more preferably from 2/8 to 8/2. In addition, in order to further improve durability of the toner, high-softening point polyester/low-softening point polyester is preferably from 8/2 to 5/5, and in order to further improve low-temperature fixing ability of the toner, high-softening point polyester/low-softening point polyester is preferably from 4/6 to 2/8. When the amorphous resin contains two or more amorphous polyesters, the amorphous resin has an average softening point of preferably from 100° to 140° C., and more preferably from 110° to 130° C., from the viewpoint of low-temperature fixing ability of the toner. In the present paragraph, an average softening point refers to a weighed average softening point. The amorphous resin has a glass transition temperature of preferably from 40° to 70° C., and more preferably from 50° to 70° C., from the viewpoint of low-temperature fixing ability and durability of the toner. The amorphous resin has an acid value of preferably from 5 to 25 mgKOH/g, and more preferably from 5 to 20 mgKOH/g. The amorphous resin may be a polyester that has been modified to an extent that the polyester does not substantially impair the properties. The modified polyester includes a polyester grafted or blocked with phenol, urethane, epoxy, or the like, according to a method described in JP-A-Hei-11-133668, JP-A-Hei-10-239903, JP-A-Hei-8-20636, or the like, and a composite resin having two or more kinds of resin units including a polyester unit.

In one embodiment, thermoplastic polymer is a polyester, as described in the US Publication No. 2009/0123862, incorporated herein by reference. Such polyesters comprise crystalline polyesters, an amorphous polyester, which may be a homopolymer or copolymer of two or more monomers. Suitable polyesters include, in embodiments, those derived from a dicarboxylic acid and a diphenol. Examples of such resins include those disclosed in U.S. Pat. No. 3,590,000, the disclosure of which is hereby incorporated by reference in its entirety. Suitable amorphous polyester materials also include those commercially available as GTUF and FPESL-2 from Kao Corporation, Japan, and EM181635 from Reichhold, Research Triangle Park, N.C., and the like. This resin may be used in a linear form, or partially crosslinked as described in U.S. Pat. No. 6,359,105, the disclosure of which is hereby incorporated by reference in its entirety. In embodiments, a blend of a linear resin and a partially crosslinked resin may be used to adjust the rheology of the resulting toner. Branched amorphous resins which may be utilized in embodiments of the present disclosure include branched polyesters, branched polyamides, branched polyimides, branched polystyrene-acrylates, branched polystyrene-methacrylates, branched polystyrene-butadienes, or branched polyester-imides, branched alkali sulfonated polyesters, branched alkali sulfonated polyamides, branched alkali sulfonated polyimides, branched alkali sulfonated polystyrene-acrylates, branched alkali sulfonated polystyrene-methacrylates, branched alkali sulfonated polystyrene-butadienes, or branched alkali sulfonated polyester-imides, branched sulfonated polyester resins, branched copoly(ethylene-terephthalate)-copoly(ethylene-5-sulfo-isophthalate), branched copoly(propylene-terephthalate)-copoly(propylene-5-sulfo-isophthalate), branched copoly(diethylene-terephthalate)-copoly(diethylene-5-sulfo-isophthalate), branched copoly(propylene-diethylene-terephthalate)-copoly(propylene-diet-hylene-5-sulfo-isophthalate), branched copoly(propylene-butylene-terephthalate)-copoly(propylene-butylene-5-sulf-o-isophthalate), branched copoly(propoxylated bisphenol-A-fumarate)-copoly (propoxylated bisphenol A-5-sulfo-isophthalate), branched copoly(ethoxylated bisphenol-A-fumarate)-copoly(ethoxylated bisphenol-A-5-sulfo-isophthalate), or branched copoly(ethoxylated bisphenol-A-maleate)copoly(ethoxylated bisphenol-A-5-sulfo-isophthalate), combinations thereof, and the like. The amorphous polyester may have a glass transition temperature of from about 50° C. to about 65° C., in embodiments from about 54° C. to about 62° C. A crystalline resin which may be utilized in forming a toner may include, for example, a polyester, a polyamide, a polyimide, a polyolefin such as a polyethylene, a polypropylene, a polybutylene or an ethylene-propylene copolymer, a polyisobutyrate, an ethylene-vinyl acetate copolymer, combinations thereof, and the like. In embodiments, the crystalline polyester material may be derived from a monomer system including a diol and a diacid such as a dicarboxylic acid. Examples of suitable crystalline resins include, but are not limited to, poly(1,10-decamethylene sebacate), poly(1,9-nonyl dodecanoate), poly(1,9-nonyl sebacate), poly(1,6-hexamethylene sebacate), poly(1,12-dodecamethylene dodecanoate), poly(1,4-butylene dodecanoate), combinations thereof, and the like. For example, in embodiments the crystalline polyester may be derived from a 10 carbon diol such as 1,10-decanediol and an 8 carbon dicarboxylic acid such as suberic acid. The amorphous resin and crystalline resin may be combined to form a binder resin which, in turn, may be utilized to form a toner. The amorphous resin may be present in an amount from about 10 to about 90 percent by weight of the combination of amorphous resin and crystalline resin (i.e., the binder resin), in embodiments from about 65 to about 85 percent by weight of the binder resin. Thus, the crystalline resin may be present in an amount from about 90 to about 10 percent by weight of the combination of the binder resin, in embodiments from about 35 to about 15 percent by weight of the binder resin.

In one embodiment, thermoplastic polymer is a polyester, as described in the US Publication No. 2009/0123864, incorporated herein by reference. Such polyesters comprise crystalline polyesters, Examples of amorphous resins suitable for use herein include polyester resins, branched polyester resins, polyimide resins, branched polyimide resins, poly(styrene-acrylate) resins, crosslinked, for example from about 25 percent to about 70 percent, poly(styrene-acrylate) resins, poly(styrene-methacrylate) resins, crosslinked poly (styrene-methacrylate) resins, poly(styrene-butadiene) resins, crosslinked poly(styrene-butadiene) resins, alkali sulfonated-polyester resins, branched alkali sulfonated-polyester resins, alkali sulfonated-polyimide resins, branched alkali sulfonated-polyimide resins, alkali sulfonated poly(styrene-acrylate) resins, crosslinked alkali sulfonated poly(styrene-acrylate) resins, poly(styrene-methacrylate) resins, crosslinked alkali sulfonated-poly(styrene-methacrylate) resins, alkali sulfonated-poly(styrene-butadiene) resins, and crosslinked alkali sulfonated poly (styrene-butadiene) resins. The amorphous resin is preferably a branched amorphous sulfonated polyester resin or a linear amorphous sulfonated polyester resin. Branched amorphous sulfonated polyester resins are preferred, for example, when the fuser does not contain a fuser oil or when black or matte prints are desired. Liner amorphous sulfonated polyester resins are preferred, for example, when the fuser include an oil. Branched amorphous resins can be a polyester, a polyamide, a polyimide, a polystyrene-acrylate, a polystyrene-methacrylate, a polystyrene-butadiene, or a polyester-imide, an alkali sulfonated polyester, an alkali sulfonated polyamide, an alkali sulfonated polyimide, an alkali sulfonated polystyrene-acrylate, an alkali sulfonated polystyrene-methacrylate, an alkali sulfonated polystyrene-butadiene, or an alkali sulfonated polyester-imide, a sulfonated polyester resin, copoly(ethylene-terephthalate)-copoly(ethylene-5-sulfo-isophthalate), copoly(propylene-terephthalate)-copoly(propylene-5-sulfo-isophthalate), copoly(diethylene-terephthalate)-copoly(diethylene-5-sulfo-isophthalate), copoly(propylene-diethylene-terephthalate)-copoly(propylene-diethylene-5-sulfoisophthalate), copoly(propylene-butylene-terephthalate)-copoly(propylene-butylene-5-sulf-o-isophthalate), copoly(propoxylated bisphenol-A-fumarate)-copoly (propoxylated bisphenol A-5-sulfo-isophthalate), copoly(ethoxylated bisphenol-A-fumarate)-copoly(ethoxylated bisphenol-A-5-sulfo-isophthalate), or copoly(ethoxylated bisphenol-A-maleate) copoly(ethoxylated bisphenol-A-5-sulfo-isophthalate). The amorphous resin is, for example, present in an amount from about 50 to about 90 percent by weight, and more preferably from about 65 to about 85 percent by weight of the binder. Preferably the amorphous resin is a branched amorphous sulfonated polyester resin. The amorphous resin in preferred embodiments possesses, for example, a number average molecular weight (Mn), as measured by gel permeation chromatography (GPC), of from about 10,000 to about 500,000, and preferably from about 5,000 to about 250,000; a weight average molecular weight (Mw) of, for example, from about 20,000 to about 600,000, and preferably from about 7,000 to about 300,000, as determined by GPC using polystyrene standards; and wherein the molecular weight distribution (Mw/Mn) is, for example, from about 1.5 to about 6, and more specifically, from about 2 to about 4. The crystalline resin may be, for example, a polyester, a polyamide, a polyimide, a polyethylene, a polypropylene, a polybutylene, a polyisobutyrate, an ethylene-propylene copolymer, or an ethylene-vinyl acetate copolymer or a polyolefin. Preferably, the crystalline resins are sulfonated polyester resins. Examples of a crystalline resin that are suitable for use herein are poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly (butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), copoly(5-sulfoisophthaloyl)-copoly(ethylene-adipate), copoly(5-sulfoisophthaloyl)-copoly(propylene-adipate), copoly(5-sulfoisophthaloyl)-copoly(butylene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfo-isophthaloyl)-copoly(ethylene-adipate), copoly(5-sulfo-isophthaloyl)-copoly(propylene-adipate), copoly(5-sulfo-isophthaloyl)-copoly(butylene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfoisophthaloyl)-copoly(ethylene-succinate), copoly(5-sulfoisophthaloyl)-copoly(propylene-succinate), copoly(5-sulfoisophthaloyl)-copoly(butylene-succinate), copoly(5-sulfoisophthaloyl)-copoly(pentylene-succinate), copoly(5-sulfoisophthaloyl)-copoly(hexylene-succinate), copoly(5-sulfoisophthaloyl)-copoly(octylene-succinate), copoly(5-sulfo-isophthaloyl)-copoly(ethylene-sebacate), copoly(5-sulfo-isophthaloyl)-copoly(propylene-sebacate), copoly(5-sulfo-isophthaloyl)-copoly(butylenes-sebacate), copoly(5-sulfo-isophthaloyl)-copoly(pentylene-sebacate), copoly(5-sulfo-isophthaloyl)-copoly(hexylene-sebacate), copoly(5-sulfo-isophthaloyl)-copoly(octylene-sebacate), copoly(5-sulfo-isophthaloyl)-copoly(ethylene-adipate), copoly(5-sulfo-isophthaloyl)-copoly(propylene-adipate), copoly(5-sulfo-isophthaloyl)-copoly(butylene-adipate), copoly(5-sulfo-isophthaloyl)-copoly(pentylene-adipate), copoly(5-sulfo-isophthaloyl)-copoly(hexylene-adipate), or poly (octylene-adipate). The crystalline resin in the toner most preferably displays or possesses a melting temperature of between about 70° C. and 85° C., and a recrystallization temperature of at least about 47° C., and preferably the recrystallization temperature is between about 50° C. and 65° C. Sulfonated polyester resins are most preferred as the crystalline resin herein. The crystalline resin is sulfonated from about 0.5 weight percent to about 4.5 weight percent, and preferably from about 1.5 weight percent to about 4.0 weight percent. The crystalline resin is, for example, present in an amount of from about 10 to about 50 percent by weight of the binder, and preferably from about 15 to about 40 percent by weight of the binder. The crystalline resin can possess melting points of, for example, from at least about 70° C., and preferably from about 70° C. to about 80° C., and a number average molecular weight (Mn), as measured by gel permeation chromatography (GPC) of, for example, from about 1,000 to about 50,000, and preferably from about 2,000 to about 25,000; with a weight average molecular weight (Mw) of the resin of, for example, from about 2,000 to about 100,000, and preferably from about 3,000 to about 80,000, as determined by GPC using polystyrene standards. The molecular weight distribution (Mw/Mn) of the crystalline resin is, for example, from about 2 to about 6, and more specifically, from about 2 to about 4.

In one embodiment, thermoplastic polymer is a polyester, as described in the US Publication No. 2009/0117482, incorporated herein by reference. Such polyesters comprise crystalline polyesters, as the resin binder, it is preferable that a polyester is contained, and it is more preferable that a crystalline polyester and an amorphous polyesters are used together. The crystallinity of the polyester is expressed as an index of crystallinity as defined by a ratio of a softening point to a highest temperature of endothermic peak determined by a differential scanning calorimeter, i.e., (softening point)/(highest temperature of endothermic peak). Generally, when the above-mentioned value exceeds 1.5, the resin is amorphous; and when the value is less than 0.6, the resin is low in crystallinity and mostly amorphous. The crystallinity of the resin can be adjusted by the kinds of the raw material monomers and a ratio thereof, preparation conditions (for example, reaction temperature, reaction time, and cooling rate), and the like. The crystalline polyester may have an index of crystallinity of from 0.6 to 1.5. The crystalline polyesters has an index of crystallinity of preferably from 0.8 to 1.3, more preferably from 0.9 to 1.1, and even more preferably from 0.95 to 1.05, from the viewpoint of low-temperature fixing ability. In addition, the amorphous polyester may have an index of crystallinity of more than 1.5 or less than 0.6, and preferably more than 1.5. The crystalline polyester and the amorphous polyester are both obtained from an alcohol component and a carboxylic acid component as the raw material monomers. The crystalline polyester has a melting point of preferably from 70° to 150° C., and more preferably from 90° to 130° C. The amorphous polyester has a softening point of preferably from 80° to 160° C., and more preferably from 90° to 150° C. In addition, the amorphous polyester has a glass transition temperature of preferably from 50° to 75° C., and more preferably from 53° to 65° C. The crystalline polyester and the amorphous polyester have an acid value of preferably from 3 to 40 mgKOH/g.

In one embodiment, thermoplastic polymer is a polyester, as described in the US Publication No. 2009/011745, incorporated herein by reference. Such polyesters comprise crystalline polyesters, resin binders contain a polyester-based resin (A) and a polyester-based resin (B) having a softening point of a temperature higher than the polyester-based resin (A) by 10° C. or more, wherein at least one of said polyester-based resins (A) and (B) is a resin derived from a (meth)acrylic acid-modified rosin having a polyester unit obtainable by polycondensing an alcohol component and a carboxylic acid component containing a (meth)acrylic acid-modified rosin as a raw material monomer. The resin derived from the (meth)acrylic acid-modified rosin can be fixed at a very low temperature, and has excellent storage ability. In addition, the generation of fine powder in the developer vessel is reduced. The (meth)acrylic acid-modified rosin in the present invention refers to a rosin modified with (meth) acrylic acid, and obtained by an addition reaction of (meth) acrylic acid to a rosin of which main component is abietic acid, neoabietic acid, palustric acid, pimaric acid, isopimaric acid, sandaracopimaric acid, dehydroabietic acid, levopimaric acid, or the like. The difference in the softening points of the two kinds of the polyester-based resins is 10° C. or more, from the viewpoint of increasing dispersibility of an internal additive, thereby enhancing the effects for fixing ability and offset resistance, especially high-temperature offset resistance. In an achromatic toner, such as a black toner, the difference in the softening points is preferably from 10° to 60° C., and more preferably from 20° to 50° C., from the viewpoint of controlling gloss. In addition, in a chromatic toner such as a yellow toner, a magenta toner or a cyan toner, the difference in the softening points is preferably from 10° to 30° C., and more preferably from 10° to 30° C., and more preferably from 15° to 30° C., from the viewpoint of increasing gloss. The polyester-based resin (A) having a lower softening point has a softening point of preferably from 80° to 120° C., and more preferably from 90° to 110° C., from the viewpoint of fixing ability. On the other hand, the polyester-based resin (B) having a higher softening point has a softening point of preferably from 100° to 180° C., more preferably from 120° to 180° C., and even more preferably from 120° to 160° C., from the viewpoint of high-temperature offset resistance. The polyester-based resin (A) and the polyester-based resin (B) have a glass transition temperature of preferably from 45° to 75° C., and more preferably from 50° to 70° C., from the viewpoint of fixing ability, storage ability, and durability. The polyester-based resin (A) and the polyester-based resin (B) have an acid value of preferably from 1 to 80 mg KOH/g, more preferably from 5 to 60 mg KOH/g, and even more preferably from 5 to 50 mg KOH/g, and a hydroxyl value of preferably from 1 to 80 mg KOH/g, more preferably from 8 to 50 mg KOH/g, and even more preferably from 8 to 40 mg KOH/g, from the viewpoint of triboelectric chargeability and environmental stability. In the polyester-based resin (A) and the polyester-based resin (B), the low-molecular weight component having a molecular weight of 500 or less ascribed to the residual monomer component and the oligomer component or the like is contained in an amount of preferably 12% or less, more preferably 10% or less, even more preferably 9% or less, and even more preferably 8% or less, of the polyester-based resin, from the viewpoint of low-temperature fixing ability, offset resistance, and storage ability. The amount of the low-molecular weight component contained can be reduced by a method of increasing the modified degree, or the like. Here, the amount of the low-molecular weight component contained is determined by an areal proportion of molecular weights as determined by gel permeation chromatography (GPC) as described later. In the present invention, it is preferable that the polyester units in the polyester-based resins (A) and (B) are amorphous polyesters different from crystalline polyesters. Amorphous resin may be a resin having a difference between a softening point and a glass transition temperature (Tg) of 30° C. or more. The polyester-based resin (A) and the polyester-based resin (B) are in a weight ratio of preferably from 10/90 to 90/10, more preferably from 20/80 to 80/20, and even more preferably from 30/70 to 70/30, from the viewpoint of fixing ability and durability. Where the resin binder contains three or more kinds of polyester-based resins, the polyester-based resin (A) and the polyester-based resin (B) are contained in a total amount of preferably 70% by weight or more, more preferably 80% by weight or more, even more preferably 90% by weight or more, and even more preferably essentially 100% by weight, of the resin binder. Further, in a case where both of the polyester resin (A) and the polyester resin (B) are resins derived from (meth)acrylic acid-modified rosins, the resin derived from the (meth)acrylic acid-modified rosin is contained in an amount of preferably 70% by weight or more, more preferably 80% by weight or more, even more preferably 90% by weight or more, and even more preferably substantially 100% by weight, of the resin binder. Alternatively, in a case where the polyester-based resin (A) is a resin derived from a (meth)acrylic acid-modified rosin and the polyester-based resin (B) is a resin derived from a fumaric acid/maleic acid-modified rosin, the resin derived from a (meth)acrylic acid-modified rosin and the resin derived from a fumaric acid/maleic acid-modified rosin are contained in a total amount of preferably 70% by weight or more, more preferably 80% by weight or more, even more preferably 90% by weight or more, and even more preferably substantially 100% by weight, of the resin binder. The modified polyester includes a polyester which is grafted or blocked with phenol, urethane, epoxy or the like according to methods described in, for example, JP-A-Hei-11-133668, JP-A-Hei-10-239903, JP-A-Hei-8-20636, and the like; and a composite resin having two or more kinds of resin units including a polyester unit.

In one embodiment, thermoplastic polymer is a polyester, as described in the U.S. Pat. No. 7,528,218, incorporated herein by reference. Such polyesters comprise crystalline polyesters, a polyester for a toner obtained by polycondensing an alcohol component and a carboxylic acid component containing an alkylsuccinic acid, an alkenylsuccinic acid, or a mixture thereof, each having 10 or more carbon atoms, and has a feature that 6-methyl-2-heptanone and 5-methyl-2-heptanone are detected in an amount within a certain range as determined by thermal desorption-gas chromatography-mass spectrometry (TD-GC/MS). The polyester for a toner of the present invention has a softening point of preferably from 70° to 170° C., more preferably from 80° to 160° C., and even more preferably from 90° to 155° C., from the viewpoint of low-temperature fixing ability, fixable region, and storage property of a toner. Also, the polyester has a glass transition temperature of preferably from 40° to 80° C., and more preferably from 50° to 65° C., from the viewpoint of low-temperature fixing ability and storage property of the resulting toner. The polyester has an acid value of preferably from 1 to 40 mgKOH/g, and more preferably from 2 to 30 mgKOH/g, from the viewpoint of chargeability and environmental stability of the resulting toner.

In one embodiment, thermoplastic polymer is a polyester, as described in the U.S. Pat. No. 7,524,599, incorporated herein by reference. Such polyesters comprise crystalline polyesters, in embodiments, the polyester resin includes any suitable polyester resin or mixture of polyester resins, such as crystalline polyester resins. The crystalline resins, which are available from a number of sources, can be prepared by a polycondensation process by reacting an organic diol, and an organic diacid in the presence of a polycondensation catalyst. Examples of crystalline based polyester resins include alkali copoly(5-sulfo-isophthaloyl)-co-poly(ethylene-adipate), alkali copoly(5-sulfo-isophthaloyl)-copoly (propylene-adipate), alkali copoly(5-sulfo-isophthaloyl)-co-poly(butylene-adipate), alkali copoly(5-sulfo-isophthaloyl)-copoly(pentylene-adipate), alkali copoly(5-sulfo-isophthaloyl)-copoly(octylene-adipate), alkali copoly(5-sulfo-isophthaloyl)-copoly(ethylene-adipate), alkali copoly (5-sulfo-isophthaloyl)-copoly(propylene-adipate), alkali copoly(5-sulfo-isophthaloyl)-co-poly(butylene-adipate), alkali copoly(5-sulfo-isophthaloyl)-copoly(pentylene-adipate), alkali copoly(5-sulfo-isopthaloyl)-copoly(hexylene-adipate), alkali copoly(5-sulfo-isophthaloyl)-copoly(octylene-adipate), alkali copoly(5-sulfo-isophthaloyl)-copoly (ethylene-succinate), alkali copoly(5-sulfo-isophthaloyl-copoly(butylene-succinate), alkali copoly(5-sulfo-isophthaloyl)-copoly(hexylene-succinate), alkali copoly(5-sulfo-isophthaloyl)-copoly(octylene-succinate), alkali copoly(5-sulfo-isophthaloyl)-copoly(ethylene-sebacate), alkali copoly(5-sulfo-isophthaloyl)-copoly(propylene-sebacate), alkali copoly(5-sulfo-isophthaloyl)-copoly(butylene-sebacate), alkali copoly(5-sulfo-isophthaloyl)-copoly(pentylene-sebacate), alkali copoly(5-sulfo-isophthaloyl)-copoly (hexylene-sebacate), alkali copoly(5-sulfo-isophthaloyl)-copoly(octylene-sebacate), alkali copoly(5-sulfo-isophthaloyl)-copoly(ethylene-adipate), alkali copoly(5- sulfo-isophthaloyl)-copoly(propylene-adipate), alkali copoly(5-sulfo-iosphthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), poly(octylene-adipate); and wherein alkali is a metal of sodium, lithium or potassium, and the like. In embodiments, the alkali metal is lithium. The polyester resin, such as crystalline polyester resin, can possess various melting points of, for example, from about 30° C. to about 120° C., or from about 35° C. to about 90° C. such as from about 40° C. to about 80° C. The polyester resin may have, for example, a number average molecular weight ($M_n$), as measured by gel permeation chromatography (GPC) of from about 1,000 to about 50,000, or from about 2,000 to about 25,000. The weight average molecular weight ($M_w$) of the crystalline polyester resin may be, for example, from about 2,000 to about 100,000, and from about 3,000 to about 80,000, as determined by gel permeation chromatography using polystyrene standards. The molecular weight distribution ($M_w/M_n$) of the crystalline polyester resin may be, for example, from about 2 to about 6, and more specifically, from about 2 to about 4.

In one embodiment, thermoplastic polymer is a polyester, as described in the EP Patent No. 1736833, incorporated herein by reference. Such polyesters comprise crystalline polyester resins and an amorphous resins. The amorphous resin may be linear or branched. crystalline polyester resin and amorphous resin, regardless if linear or branched, may be sulfonated. The crystalline polyester resin contains a sulfonation of less than about 3.0 mole % and the amorphous sulfonated polyester resin contains a sulfonation percentage greater than the sulfonation of the crystalline sulfonated polyester resin, more preferably the amorphous polyester resin contains a sulfonation between about 0.25 mole % and about 5.0 mole %. The weight ratio of the crystalline polyester resin to the amorphous resin present in the mixture is preferably from about 10:90 to about 50:50, more preferably from about 10:90 to about 30:70. Examples of crystalline polyester resins suitable for use herein include, for example, alkali sulfonated polyester resins. Specific crystalline resin examples include, but are not limited to, alkali copoly(5-sulfoisophthaloyl)-copoly(ethylene-adipate), alkali copoly(5-sulfoisophthaloyl)-copoly(propylene-adipate), alkali copoly(5-sulfoisophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfo-isophthaloyl)-copoly(ethylene-adipate), alkali copoly (5-sulfo-isophthaloyl)-copoly (propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfoisophthaloyl)-copoly (ethylene-succinate), alkali copoly(5-sulfoisophthaloyl)-copoly(propylene-succinate), alkali copoly(5-sulfoisophthaloyl)-copoly(butylenes-succinate), alkali copoly(5-sulfoisophthaloyl)-copoly(pentylene-succinate), alkali copoly(5-sulfoisophthaloyl)-copoly(hexylene-succinate), alkali copoly(5-sulfoisophthaloyl)-copoly(octylene-succinate), alkali copoly(5-sulfo-isophthaloyl)-copoly(ethylene-sebacate), alkali copoly(5-sulfo-isophthaloyl)-copoly (propylene-sebacate), alkali copoly(5-sulfo-isophthaloyl)-copoly(butylene-sebacate), alkali copoly(5-sulfo-isophthaloyl)-copoly(pentylene-sebacate), alkali copoly(5-sulfo-isophthaloyl)-copoly(hexylene-sebacate), alkali copoly(5-sulfo-isophthaloyl)-copoly(octylene-sebacate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-copoly (butylene-adipate), alkali copoly(5-sulfo-isophthaloyl)-copoly(pentylene-adipate), alkali copoly(5-sulfo-isophthaloyl)-copoly(hexylene-adipate), poly(octylene-adipate), and wherein the alkali is a metal such as sodium, lithium or potassium. If semicrystalline polyester resins are employed herein, the semicrystalline resin includes, but is not limited to poly(3-methyl-1-butene), poly(hexamethylene carbonate), poly(ethylene-p-carboxy phenoxy-butyrate), poly(ethylene-vinyl acetate), poly(docosyl acrylate), poly(dodecyl acrylate), poly(octadecyl acrylate), poly(octadecyl methacrylate), poly(behenylpolyethoxyethyl methacrylate), poly(ethylene adipate), poly(decamethylene adipate), poly(decamethylene azelaate), poly(hexamethylene oxalate), poly(decamethylene oxalate), poly(ethylene oxide), poly(propylene oxide), poly(butadiene oxide), poly(decamethylene oxide), poly(decamethylene sulfide), poly(decamethylene disulfide), poly(ethylene sebacate), poly(decamethylene sebacate), poly(ethylene suberate), poly(decamethylene succinate), poly(eicosamethylene malonate), poly(ethylene-p-carboxy phenoxy-undecanoate), poly(ethylene dithione-sophthalate), poly(methyl ethylene terephthalate), poly(ethylene-p-carboxy phenoxy-valerate), poly(hexamethylene-4,4'-oxydibenzoate), poly(10-hydroxy capric acid), poly(isophthalaldehyde), poly(octamethylene dodecanedioate), poly(dimethyl siloxane), poly(dipropyl siloxane), poly(tetramethylene phenylene diacetate), poly (tetramethylene trithiodicarboxylate), poly(trimethylene dodecane dioate), poly(m-xylene), and poly(p-xylene pimelamide). The semicrystalline resins possess, for example, a suitable weight average molecular weight Mw, such as from about 7,000 to about 200,000, and more specifically from about 10,000 to about 150,000, a number average molecular weight Mn of, for example, from about 1,000 to about 60,000, and more specifically, from about 3,000 to about 50,000. The crystalline resin can possess various melting points of, for example, from about 30° C. to about 120° C., and preferably from about 50° C. to about 90° C., and, for example, a number average molecular weight (Mn), as measured by gel permeation chromatography (GPC) of, for example, from about 1,000 to about 50,000, and preferably from about 2,000 to about 25,000; with a weight average molecular weight (Mw) of the resin of, for example, from about 2,000 to about 100,000, and preferably from about 3,000 to about 80,000, as determined by GPC using polystyrene standards. The molecular weight distribution (Mw/Mn) of the crystalline resin is, for example, from about 2 to about 6, and more specifically, from about 2 to about 4. The linear and branched amorphous sulfonated resins, in embodiments, possess, for example, a number average molecular weight (Mn), as measured by GPC, of from about 10,000 to about 500,000, and preferably from about 5,000 to about 250,000; a weight average molecular weight (Mw) of, for example, from about 20,000 to about 600,000, and preferably from about 7,000 to about 300,000, as determined by GPC using polystyrene standards; and a molecular weight distribution (Mw/Mn) of, for example, from about 1.5 to about 6, and more specifically, from about 2 to about 4. The linear amorphous resins are generally prepared by the polycondensation of an organic diol and a diacid or diester, at least one of which is preferably a sulfonated or a sulfonated difunctional monomer being included in the reaction, and a polycondensation catalyst. For the branched amorphous sulfonated resin, the same materials may be used, with the further inclusion of a branching agent such as a multivalent polyacid or polyol.

Thermoplastic resins may include homopolymers and copolymers of styrene and derivatives thereof such as polystyrene, poly-p-chlorostyrene, polyvinyltoluene, styrene-p-chlorostyrene copolymer and styrene vinyltoluene copolymer, copolymers of styrene and acrylates such as styrene methylacrylate copolymer, styrene ethylacrylate copolymer, and styrene-n-butyl acrylate copolymer; copolymers of styrene and methacrylate such as styrene-methylmethacrylate copolymer, styrene-ethylmethacrylate copolymer, and styrene-n-butylmethacrylate copolymer; polynary copolymers of styrene, acrylate and methacrylate; as well as styrenic copolymers such as copolymers of styrene and other vinylic monomer, such as styrene-acrylonitrile copolymer, styrene-vinylmethyl ether copolymer, styrene-butadiene copolymer, styrene-vinyl methyl ketone copolymer, styrene-acrylonitrile-indene copolymer and styrene-maleate copolymer; polymethyl methacrylate, polybutyl methacrylate, polyvinyl acetate, polyester, polyamide, epoxy resin, polyvinyl butyral, polyacrylic acid, phenolic resin, aliphatic or cycloaliphatic hydrocarbon resin, petroleum resin and chlorinated paraffin, which may be used alone or may be used in an appropriate combination thereof.

Thermoplastic resins may include suitable non-conjugated diene monomers such as straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD).

One class of desirable thermoplastic resins that may be used in accordance with embodiments disclosed herein includes elastomeric interpolymers of ethylene, a $C_3$-$C_{20}$ α-olefin, especially propylene, and optionally one or more diene monomers. Preferred α-olefins for use in this embodiment are designated by the formula $CH_2$=CHR*, where R* is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. The propylene-based polymers are generally referred to in the art as EP or EPDM polymers. Suitable dienes for use in preparing such polymers, especially multi-block EPDM type polymers, include conjugated or non-conjugated, straight or branched chain-, cyclic- or polycyclic-dienes comprising from 4 to 20 carbon atoms. Dienes may include 1,4-pentadiene, 1,4-hexadiene, 5-ethylidene-2-norbornene, dicyclopentadiene, cyclohexadiene, and 5-butylidene-2-norbornene.

As one suitable type of thermoplastic resin, the esterification products of a di- or polycarboxylic acid and a diol comprising a diphenol may be used. These resins are illustrated in U.S. Pat. No. 3,590,000, which is incorporated herein by reference. Other specific examples of toner resins include styrene/methacrylate copolymers, and styrene/butadiene copolymers; suspension polymerized styrene butadienes; polyester resins obtained from the reaction of bisphenol A and propylene oxide followed by the reaction of the resulting product with fumaric acid; and branched polyester resins resulting from the reaction of dimethylterphthalate, 1,3-butanediol, 1,2-propanediol, and pentaerythritol, styrene acrylates, and mixtures thereof.

Further, specific embodiments of the present invention employ ethylene-based polymers, propylene-based polymers, propylene-ethylene copolymers, and styrenic copolymers as one component of a composition. Other embodiments of the present invention use polyester resins, including those containing aliphatic diols such as UNOXOL 3,4 diol available from The Dow Chemical Company (Midland, Mich.).

Polyesters useful in embodiments disclosed herein may not require functionalization. For example, toner compositions disclosed herein do not require the use of sulfonated polyesters. Additionally, toner compositions disclosed herein do not require the use of branched polyester resins or crystalline polyester resins. In certain embodiments, functionalized, branched, crystalline polyesters, or combinations thereof may be used, for use in toner compositions disclosed herein, whereas they may be required in various prior art toners.

In selected embodiments, one component is formed from ethylene-alpha olefin copolymers or propylene-alpha olefin copolymers. In particular, in select embodiments, the thermoplastic resin comprises one or more non-polar polyolefins.

In specific embodiments, polyolefins such as polypropylene, polyethylene, copolymers thereof, and blends thereof, as well as ethylene-propylene-diene terpolymers, may be used. In some embodiments, preferred olefinic polymers include homogeneous polymers, as described in U.S. Pat. No. 3,645,992 issued to Elston; high density polyethylene (HDPE), as described in U.S. Pat. No. 4,076,698 issued to Anderson; heterogeneously branched linear low density polyethylene (LLDPE); heterogeneously branched ultra low linear density polyethylene (ULDPE); homogeneously branched, linear ethylene/alpha-olefin copolymers; homogeneously branched, substantially linear ethylene/alpha-olefin polymers, which can be prepared, for example, by processes disclosed in U.S. Pat. Nos. 5,272,236 and 5,278,272, the disclosures of which are incorporated herein by reference; and high pressure, free radical polymerized ethylene polymers and copolymers such as low density polyethylene (LDPE) or ethylene vinyl acetate polymers (EVA).

Polymer compositions, and blends thereof, described in U.S. Pat. Nos. 6,566,446, 6,538,070, 6,448,341, 6,316,549, 6,111,023, 5,869,575, 5,844,045, or 5,677,383, each of which is incorporated herein by reference in its entirety, may also be suitable in some embodiments. In some embodiments, the blends may include two different Ziegler-Natta polymers. In other embodiments, the blends may include blends of a Ziegler-Natta polymer and a metallocene polymer. In still other embodiments, the thermoplastic resin used herein may be a blend of two different metallocene polymers. In other embodiments, single site catalyst polymers may be used.

In some embodiments, the thermoplastic resin is a propylene-based copolymer or interpolymer. In some particular embodiments, the propylene/ethylene copolymer or interpolymer is characterized as having substantially isotactic propylene sequences. The term "substantially isotactic propylene sequences" and similar terms mean that the sequences have an isotactic triad (mm) measured by 13C NMR of greater than about 0.85, preferably greater than about 0.90, more preferably greater than about 0.92 and most preferably greater than about 0.93. Isotactic triads are well-known in the art and are described in, for example, U.S. Pat. No. 5,504,172 and WO 00/01745, which refer to the isotactic sequence in terms of a triad unit in the copolymer molecular chain determined by 13C NMR spectra.

In other particular embodiments, the thermoplastic resin may be ethylene vinyl acetate (EVA) based polymers. In other embodiments, the base polymer may be ethylene-methyl acrylate (EMA) based polymers. In other particular embodiments, the ethylene-alpha olefin copolymer may be ethylene-butene, ethylene-hexene, or ethylene-octene copolymers or interpolymers. In other particular embodiments, the propylene-alpha olefin copolymer may be a propylene-ethylene or a propylene-ethylene-butene copolymer or interpolymer.

Embodiments disclosed herein may also include a polymeric component that may include at least one multi-block olefin interpolymer. Suitable multi-block olefin interpolymers may include those described in, for example, U.S. Provisional Patent Application No. 60/818,911, incorporated herein by reference. The term "multi-block copolymer" or "multi-block interpolymer" refers to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In certain embodiments, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property.

Other olefin interpolymers include polymers comprising monovinylidene aromatic monomers including styrene, o-methyl styrene, p-methyl styrene, t-butylstyrene, and the like.

In particular, interpolymers comprising ethylene and styrene may be used. In other embodiments, copolymers comprising ethylene, styrene and a $C_3$-$C_{20}$ α-olefin, optionally comprising a $C_4$-$C_{20}$ diene, may be used.

In certain embodiments, the thermoplastic resin may be an ethylene-octene copolymer or interpolymer having a density between 0.863 and 0.911 g/cc and melt index (ASTM D1238, 190° C. with 2.16 kg weight) from 0.1 to 100 g/10 min. In other embodiments, the ethylene-octene copolymers may have a density between 0.863 and 0.902 g/cc and melt index (ASTM D1238, 190° C. with 2.16 kg weight) from 0.8 to 35 g/10 min.

In certain embodiments, the thermoplastic resin may be a propylene-ethylene copolymer or interpolymer having an ethylene content between 5 and 20% by weight and a melt flow rate (ASTM D1238, 230° C. with 2.16 kg weight) from 0.5 to 300 g/10 min. In other embodiments, the propylene-ethylene copolymer or interpolymer may have an ethylene content between 9 and 12% by weight and a melt flow rate (ASTM D1238, 230° C. with 2.16 kg weight) from 1 to 100 g/10 min.

In certain other embodiments, the thermoplastic resin may be a highly branched low density polyethylene having a density between 0.911 and 0.925 g/cc and melt index (ASTM D1238, 190° C. with 2.16 kg weight) from 0.1 to 100 g/10 min.

In other embodiments, the thermoplastic resin may have a crystallinity of less than 50 percent. In preferred embodiments, the crystallinity of the thermoplastic resin may be from 5 to 35 percent. In more preferred embodiments, the crystallinity may range from 7 to 20 percent.

In certain other embodiments, the thermoplastic resin is a semi-crystalline polymer and may have a melting point of less than 110° C. In preferred embodiments, the melting point may be from 25 to 100° C. In more preferred embodiments, the melting point may be between 40 and 85° C.

In other embodiments, the thermoplastic resin is a glassy polymer and may have a glass transition temperature of less than 130° C.; less than 110° C. in other embodiments. In preferred embodiments, the glass transition temperature may be from 20 to 100° C. In more preferred embodiments, the glass transition temperature may be from 50 to 75° C.

In certain embodiments, the thermoplastic resin may have a weight average molecular weight greater than 10,000 g/mole. In other embodiments, the weight average molecular weight may be from 20,000 to 150,000 g/mole; in yet other embodiments, from 50,000 to 100,000 g/mole.

The one or more thermoplastic resins may be contained within the aqueous dispersion in an amount from about 1% by weight to about 96% by weight. For instance, during particle formation, the thermoplastic resin may be present in the aqueous dispersion in an amount from about 40% by weight to about 95% by weight, such as from about 45% to 90% by weight in some embodiments, and from about 60% to about 80% by weight in yet other embodiments. After particle formation, the dispersion can be further diluted to aid in handling.

In one or more embodiments of the present invention, one or more resins selected from the following may be used in the dispersion disclosed herein to form a toner composition. Suitable resins include SAA100, SAA101, and SAA104, which are commercially available from Lyondell Chemical and comprise styrenic/allyl alcohol copolymers having 60-80% styrene, weight average molecular weight from 3,000 to 8,000, number average molecular weight from 1,500 to 3,200, and glass transition temperature from 57 to 78° C.; the DIANAL® FB series (styrenic-acrylic copolymers) and DIACRON® series (polyester resins), and acrylic resins including SE-5437, SE-5102, SE-5377, SE-5649, SE-5466, SE-5482, HR-169, 124, HR-1127, HR-116, HR-113, HR-148, HR-131, HR-470, HR-634, HR-606, HR-607, LR-1065, 574, 143, 396, 637, 162, 469, 216, BR-50, BR-52, BR-60, BR-64, BR-73, BR-75, BR-77, BR-79, BR-80, BR-83, BR-85, BR-87, BR-88, BR-90, BR-93, BR-95, BR-100, BR-101, BR-102, BR-105, BR-106, BR-107, BR-108, BR-112, BR-113, BR-115, BR-116, BR-117, which are commercially available from Misubishi Rayon Co Ltd. and its subsidiary Dianal America, Inc.; Himer ST95 and ST120, which are acrylic copolymers commercially available from Sanyo Chemical Industries, Ltd.; FM601, which is an acrylic resin commercially available from Mitsui Chemicals; HRJ11441, which is a branched partially crosslinked polyester resin commercially available from Schenectady Int'l; TUFTONE® NE-382, TUFTONE® U-5, ATR-2009, and ATR-2010, which are polyester resins commercially available from Kao Specialties Americas, LLC; S103C and S111, which are styrene acrylonitrile terpolymers commercially available from Zeon Chemicals, LP; LUPRETON® resins, which polyester resins with color concentrates commercially available from BASF Corp.; FINE-TONE® T382ESHHMW, T382ES, T6694, TCX 100, TCX700, TPL400TRM70, which are polyester resins commercially available from Reichhold Chemicals, Inc.; TOPAS® TM, TOPAS® TB, and TOPAS® 8007, which are cyclic olefin copolymers commercially available from Ticona GMBH Corp.; S-LEC resins, including SE-0020, SE-0030, SE-0040, SE-0070, SE-0080, SE-0090, SE-0100, SE-1010, and SE-1035, which are styrene-acrylic copolymers commercially available from Sekisui Chemical Co., Ltd.; BAILON 290, BAILON 200, BAILON 300, BAILON 103, BAILON GK-140, and BAILON GK-130 which are commercially available from Toyobo Co., Ltd; Eritel UE3500, UE3210, and XA-8153, which are commercially available from Unitika Ltd.; and Polyester TP-220 and R-188, which are commercially available from The Nippon Synthetic Chemical Industry Co., Ltd.

In some embodiments, thermoplastic resins useful in embodiments disclosed herein, such as a self-stabilizing resin, may have an acid number of 50 mg KOH/g or less, such that with the addition of a neutralizing agent an aqueous resin dispersion can be prepared. In other embodiments, the thermoplastic resin may have an acid number of 25 mg KOH/g or less; 20 mg KOH/g or less in other embodiments; and 15 mg KOH/g or less in yet other embodiments. In other various embodiments, thermoplastic resins useful in embodiments disclosed herein may have an acid number ranging from a lower limit of 0, 1, 2, 3, 4, 5, 6, 7, 8, 9, 10, 11, 12, 13, or 15 mg KOH/g to an upper limit of 10, 11, 12, 13, 14, 15, 16, 17, 18, 19, 20, 21, 22, 23, 24, 25 or 50 mg KOH/g, where the range may be from any lower limit to any upper limit. Acid number may be determined, for example, by titration with a solution of potassium hydroxide of a known concentration or other methods as known in the art.

In some embodiments, blends of any of the above-described polymers may be used in the aqueous dispersions disclosed herein. For example, blends of various polymers may be used to result in desired toner properties, such as hot and cold offset resistance, fusing temperature, melt flow, additive compatibility, and triboelectric properties, among others.

Polymer blends used in some embodiments disclosed herein may include blends of various molecular weight polymers. For example, a blend of high and low molecular weight polymers may result in a desired melt flow or other properties as discussed above. Toner compositions disclosed herein, for example, may be formed using two or more polyesters having different molecular weights.

Polymer blends used in other embodiments disclosed herein may include blends of polymers having differing acid number. For example, a self-stabilizing resin, as described above, may be used with one or more neutral polymers. In other embodiments, a self-stabilizing resin may be used in conjunction with one or more resins having a higher or lower acid number, which may provide the ability to tailor the charge susceptibility of the final toner particle. Any resin component of acid value up to 50 can be used in any amount as long as the combined resin blend acid value is 25 or less. For example, a polyester resin having an acid number of 30 may be used in combination with a polyester resin having an acid number of 5.

Those having ordinary skill in the art will recognize that the above list is a non-comprehensive listing of suitable polymers. It will be appreciated that the scope of the present invention is restricted by the claims only.

Stabilizing Agent

Embodiments of the present invention use a stabilizing agent to promote the formation of a stable dispersion or emulsion. In selected embodiments, the stabilizing agent may be a surfactant, a polymer (different from the thermoplastic resin detailed above), or mixtures thereof. In other embodiments, the thermoplastic resin is a self-stabilizer, so that an additional exogenous stabilizing agent may not be necessary. For example, a self-stabilizing system may include a partially hydrolyzed polyester, where by combining polyester with an aqueous base, a polyester resin and surfactant-like stabilizer molecule may be produced. In addition, stabilizing agents may be used alone or in a combination of two or more.

In certain embodiments, the stabilizing agent may be a polar polymer, having a polar group as either a comonomer or grafted monomer. In preferred embodiments, the stabilizing agent may include one or more polar polyolefins, having a polar group as either a comonomer or grafted monomer. Typical polymers include ethylene-acrylic acid (EAA) and ethylene-methacrylic acid copolymers, such as those available under the trademarks PRIMACOR™ (trademark of The Dow Chemical Company), NUCREL™ (trademark of E.I. DuPont de Nemours), and ESCOR™ (trademark of ExxonMobil) and described in U.S. Pat. Nos. 4,599,392, 4,988,781, and 5,938,437, each of which is incorporated herein by reference in its entirety. Other suitable polymers include ethylene-ethyl acrylate (EEA) copolymer, ethylene-methyl methacrylate (EMMA), and ethylene-butyl acrylate (EBA). Other ethylene-carboxylic acid copolymers may also be used. Those having ordinary skill in the art will recognize that a number of other useful polymers may also be used.

If the polar group of the polymer is acidic or basic in nature, the stabilizing polymer may be partially or fully neutralized with a neutralizing agent to form the corresponding salt. The salts may be alkali metal or ammonium salts of the fatty acid, prepared by neutralization of the acid with the corresponding base, e.g., NaOH, KOH, and NH$_4$OH. These salts may be formed in situ in the dispersion step, as described more fully below. In certain embodiments, neutralization of the stabilizing agent, such as a long chain fatty acid or EAA, may be from to 200% on a molar basis; from 25 to 200% on a molar basis in other embodiments; from to 110% on a molar basis in other embodiments, and from 50 to 110% on a molar basis in yet other embodiments. For example, for EAA, the neutralizing agent is a base, such as ammonium hydroxide or potassium hydroxide. Other neutralizing agents can include lithium hydroxide or sodium hydroxide, for example. Those having ordinary skill in the art will appreciate that the selection of an appropriate neutralizing agent depends on the specific composition formulated, and that such a choice is within the knowledge of those of ordinary skill in the art.

If the polar group of the polymeric stabilizing agent or surfactant is acidic or basic in nature, the polymer or surfactant may be partially or fully neutralized with a neutralizing agent to form the corresponding salt. A suitable polymeric stabilizing agent or surfactant may have any acid number greater than 50. In other embodiments, the combined amount of thermoplastic resin and stabilizing agent used, if any, may have an acid number of less than 25. In other embodiments, the combined amount of thermoplastic resin and stabilizing agent used may have an acid number of 20 or less; 15 or less in yet other embodiments. In other various embodiments, the combined amount of thermoplastic resin and stabilizing agent used may have an acid number ranging from a lower limit of 0, 1, 2, 3, 4, 5, 6, 7, 8, 9, 10, 11, 12, 13, or 15 to an upper limit of 10, 11, 12, 13, 14, 15, 16, 17, 18, 19, 20, 21, 22, 23, 24, or 25, where the range may be from any lower limit to any upper limit.

Other surfactants that may be used include long chain fatty acids or fatty acid salts having from 12 to 60 carbon atoms. In other embodiments, the long chain fatty acid or fatty acid salt may have from 12 to 40 carbon atoms.

Additional surfactants that may be useful in the practice of the present invention include cationic surfactants, anionic surfactants, non-ionic surfactants, or combinations thereof. Examples of anionic surfactants include sulfonates, carboxylates, and phosphates. Examples of cationic surfactants include quaternary amines. Examples of non-ionic surfactants include block copolymers containing ethylene oxide and silicone surfactants. Surfactants useful as a stabilizing agent may be either external surfactants or internal surfactants. External surfactants are surfactants that do not become chemically reacted into the polymer during dispersion preparation. Examples of external surfactants useful herein include salts of dodecyl benzene sulfonic acid and lauryl sulfonic acid. Internal surfactants are surfactants that do become chemically reacted into the polymer during dispersion preparation. An example of an internal surfactant useful herein includes 2,2-dimethylol propionic acid and its salts or sulfonated polyols neutralized with ammonium chloride.

In particular embodiments, the dispersing agent or stabilizing agent may be used in an amount ranging from greater than zero to about 60% by weight based on the amount of thermoplastic resin (or thermoplastic resin mixture) used. With respect to the thermoplastic resin and the dispersion stabilizing agent, in some embodiments, the thermoplastic resin may comprise between about 30% to 99% (by weight) of the total amount of thermoplastic resin and dispersion stabilizing agent in the composition. In other embodiments, the thermoplastic resin may comprise between about 50% and about 80% (by weight) of the total amount of thermoplastic resin and dispersion stabilizing agent in the composition. In yet other embodiments, the thermoplastic resins may comprise about 70% (by weight) of the total amount of thermoplastic resin and dispersion stabilizing agent in the composition. For example, long chain fatty acids or salts thereof may be used from 0.5 to 10% by weight based on the amount of thermoplastic resin. In other embodiments, ethylene-acrylic acid or ethylene-methacrylic acid copolymers may be used in an amount from 0.5 to 60% by weight based on the amount of the thermoplastic resin. In yet other embodiments, sulfonic acid salts may be used in an amount from 0.5 to 10% by weight based on the amount of thermoplastic resin.

Neutralizing Agent

Embodiments of the present invention use a neutralizing agent to promote the formation of a stable aqueous dispersion or emulsion. If the polar group of the polymeric stabilizing agent, surfactant, or self-stabilizing polymer is acidic or basic in nature, they may be partially or fully neutralized with a neutralizing agent to form the corresponding salt. The salts may be alkali metal or ammonium salts of the fatty acid, prepared by neutralization of the acid with the corresponding base, e.g., NaOH, KOH, and $NH_4OH$. These salts may be formed in situ in the aqueous dispersion formation step, as described more fully below. In certain embodiments, neutralization may be from 10 to 200% on a molar basis of the resin plus stabilizer; from 25 to 200% on a molar basis in other embodiments; from 20 to 110% on a molar basis in other embodiments, from 15 to 90% on a molar basis in other embodiments; less than 90% on a molar basis in other embodiments; and from 50 to 110% on a molar basis in yet other embodiments. For example, for EAA, the neutralizing agent is a base, such as ammonium hydroxide or potassium hydroxide. Other neutralizing agents can include amines or lithium hydroxide, for example. In addition, neutralizing agents may be used alone or in a combination of two or more. Those having ordinary skill in the art will appreciate that the selection of an appropriate neutralizing agent depends on the specific composition formulated, and that such a choice is within the knowledge of those of ordinary skill in the art.

Amines useful in embodiments disclosed herein may include monoethanolamine, diethanolamine, triethanolamine, AMP-95 and TRIS AMINO (each available from Angus), NEUTROL TE (available from BASF), as well as triisopropanolamine, diisopropanolamine, and N,N-dimethylethanolamine (each available from The Dow Chemical Company, Midland, Mich.). Other useful amines may include ammonia, monomethylamine, dimethylamine, trimethylamine, monoethylamine, diethylamine, triethylamine, mono-n-propylamine, dimethyl-n propylamine, N-methanol amine, N-aminoethylethanolamine, N-methyldiethanolamine, monoisopropanolamine, N,N-dimethyl propanolamine, 2-amino-2-methyl-1-propanol, tris(hydroxymethyl)-aminomethane, N,N,N'N'-tetrakis(2-hydroxylpropyl) ethylenediamine. In some embodiments, mixtures of amines or mixtures of amines and other neutralizing agents may be used.

Internal Additives

Wax

Optionally, a wax may also be included in the toner composition. When included, the wax may be present in an amount of from, for example, about 1 weight percent to about 25 weight percent, or from about 5 weight percent to about 20 weight percent, of the toner particles.

Waxes that may be used include waxes with, for example, a weight average molecular weight of from about 100 to about 20,000, in other embodiments from about 500 to about 10,000. Waxes that may be used include, for example, polyolefins such as polyethylene, polypropylene, and polybutene waxes such as those commercially available from Allied Chemical and Petrolite Corporation, for example POLYWAX polyethylene waxes from Baker Petrolite, wax emulsions available from Michaelman, Inc. and the Daniels Products Company, EPOLENE N-15, commercially available from Eastman Chemical Products, Inc., and VISCOL 550-P, a low weight average molecular weight polypropylene available from Sanyo Kasei K. K.; plant-based waxes, such as carnauba wax, rice wax, candelilla wax, sumacs wax, and jojoba oil; animal-based waxes, such as beeswax; mineral-based waxes and petroleum-based waxes, such as montan wax, ozokerite, ceresin, paraffin wax, microcrystalline wax, and Fischer-Tropsch wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethyleneglycol monostearate, dipropyleneglycol distearate, diglyceryl distearate, and triglyceryl tetrastearate; sorbitan higher fatty acid ester waxes, such as sorbitan monostearate, and cholesterol higher fatty acid ester waxes, such as cholesteryl stearate. Examples of functionalized waxes that may be used include, for example, amines, amides, for example AQUA SUPERSLIP 6550, SUPERSLIP 6530, available from Micro Powder Inc., fluorinated waxes, for example POLYFLUO 190, POLYFLUO 200, POLYSILK 19, POLYSILK 14, available from Micro Powder Inc., mixed fluorinated, amide waxes, for example MICROSPERSION 19, also available from Micro Powder Inc., imides, esters, quaternary amines, carboxylic acids or acrylic polymer emulsion, for example JONCRYL 74, 89, 130, 537, and 538, all available from SC Johnson Wax, and chlorinated polypropylenes and polyethylenes available from Allied Chemical and Petrolite Corporation and SC Johnson wax. Mixtures of waxes may also be used. Waxes may be included as, for example, fuser roll release agents.

Colorant

Embodiments of the present invention may employ a colorant as part of the composition. A variety of colors may be used. Typically, colors such as yellow, magenta, and cyan may be used. As a black coloring agent, carbon black, a magnetic material, and a coloring agent toned to black using the yellow/magenta/cyan coloring agents shown below may be used.

As a yellow coloring agent, compounds typified by a condensed azo compound, an isoindolynone compound, an anthraquinone compound, an azometal complex methine compound, and an allylamide compound as pigments may be used. Specifically, C.I. pigment yellows 3, 7, 10, 12 to 15, 17, 23, 24, 60, 62, 74, 75, 83, 93 to 95, 99, 100, 101, 104, 108 to 111, 117, 123, 128, 129, 138, 139, 147, 148, 150, 166, 168 to 177, 179, 180, 181, 183, 185, 191:1, 191, 192, 193, and 199 may be suitable for use as a yellow coloring agent. Examples of dyes include C.I. solvent yellows 33, 56, 79, 82, 93, 112, 162, and 163, and C.I. disperse yellows 42, 64, 201, and 211.

As a magenta coloring agent, a condensed azo compound, a diketopyrrolopyrrole compound, anthraquinone, a quinacridone compound, a base dye lake compound, a naphthol compound, a benzimidazolone compound, a thioindigo compound, and a perylene compound may be used. Specifically, C.I. pigment reds 2, 3, 5 to 7, 23, 48:2, 48:3, 48:4, 57:1, 81:1, 122, 146, 166, 169, 177, 184, 185, 202, 206, 220, 221, and 254, and C.I. pigment violet 19 may be suitable for use as a magenta coloring agent.

As a cyan coloring agent, a copper phthalocyanine compound and its derivative, an anthraquinone compound, a base dye lake compound, and the like may be used. Specifically, C.I. pigment blues 1, 7, 15, 15:1, 15:2, 15:3, 15:4, 60, 62, and 66 may be suitable for use as a cyan coloring agent.

These coloring agents may be used singly, in mixture, or as a solid solution. The coloring agent of the present invention is selected in terms of the hue angle, saturation, brightness, weather resistance, OHP transparency, and dispersibility into the toner. The coloring agent may be added in an amount of 0.5 to 20 parts by weight based on 100 parts by weight of the thermoplastic resin.

Magnetic Pigment

Further, the toner of the present invention may contain a magnetic material and be used as a magnetic toner. In this case, the magnetic material may also function as a coloring agent. Examples of the magnetic material contained in a magnetic toner in the present invention include iron oxides such as magnetite, hematite, and ferrite; metals such as iron, cobalt, and nickel, or alloys of these metals with metals such as aluminum, cobalt, copper, lead, magnesium, tin, zinc, antimony, beryllium, bismuth, cadmium, calcium, manganese, selenium, titanium, tungsten, and vanadium; and mixtures thereof.

The magnetic material used in the present invention may preferably be a surface modified magnetic material. Examples of surface modifiers that may be used to hydrophobically treat magnetic material include a silane coupling agent and a titanium coupling agent.

The magnetic material used in the compounds disclosed here may have a mean particle size of 2 µm or smaller, preferably from 0.1 to 0.5 µm. The magnetic material may be included in the compound in an amount ranging from 20 to 200 parts by weight, preferably from 40 to 150 parts by weight, based on 100 parts by weight of the thermoplastic resin.

The magnetic material preferably has magnetic properties when 796 kA/m (10 k oersted) is applied such as a coercive force (Hc) of 1.59 to 23.9 kA/m (20 to 300 oersted), a saturation magnetization (as) of 50 to 200 emu/g, and a remnant magnetization (or) of 2 to 20 emu/g.

Charge Control Agent

In certain embodiments of the present invention, a charge control agent may be included in the compounds disclosed herein. Examples of a charge control agent used to control the charge to be negative include an organometallic compound, a chelate compound, a monoazometallic compound, an acetylacetone metallic compound, a urea derivative, a metal-containing salicylic acid compound, a metal-containing naphthoic acid compound, a tertiary ammonium salt, calixarene, a silicon compound, and a non-metal carboxylic acid compound and its derivative.

Examples of a charge control agent used to control the charge to be positive include nigrosine and its modified product by a fatty acid metal salt; quaternary ammonium salts such as tributylbenzylammonium-1-hydroxy-4-naphthosulfonate and tetrabutylammonium tetrafluoroborate, and onium salts and their analogues such as a phosphonium salt, and their lake pigments, and triphenylmethane dyes and their lake pigments, of which laking agents include phosphotungstic acid, phosphomolybdic acid, phosphotungstic-molybdic acid, tannic acid, lauric acid, gallic acid, a ferricyanide, and a ferrocyanide; metal salts of higher fatty acids; diorganotin oxides such as dibutyltin oxide, dioctyltin oxide, and dicyclohexyltin oxide; and diorganotin borates such as dibutyltin borate, dioctyltin borate, and dicyclohexyltin borate. These may be used singly or in a combination of two or more. Of these, charge control agents such as nigrosins and quaternary ammonium salts may be preferable.

The toner compound may include a charge control agent in an amount ranging from 0.01 to 20 parts by weight, preferably from 0.5 to 10 parts by weight, based on 100 parts by weight of the thermoplastic resin in the toner.

Auxiliary Fine Particles

In select embodiments, it is advantageous to add auxiliary fine particles to the base toner particles in order to improve the fluidity, the electrification stability, or the blocking resistance at a high temperature, etc. The auxiliary fine particles to be fixed on the surface of the base toner particles may be suitably selected for use among various inorganic or organic fine particles.

As the inorganic fine particles, various carbides such as silicon carbide, boron carbide, titanium carbide, zirconium carbide, hafnium carbide, vanadium carbide, tantalum carbide, niobium carbide, tungsten carbide, chromium carbide, molybdenum carbide and calcium carbide, various nitrides such as boron nitride, titanium nitride and zirconium nitride, various borides such as zirconium boride, various oxides such as titanium oxide, calcium oxide, magnesium oxide, zinc oxide, copper oxide, aluminum oxide, cerium oxide, silica and colloidal silica, various titanate compounds such as calcium titanate, magnesium titanate and strontium titanate, phosphate compounds such as calcium phosphate, sulfides such as molybdenum disulfide, fluorides such as magnesium fluoride and carbon fluoride, various metal soaps such as aluminum stearate, calcium stearate, zinc stearate and magnesium stearate, talc, bentonite, various carbon black and conductive carbon black, magnetite and ferrite, may, for example, be employed. As the organic fine particles, fine particles of a styrene resin, an acrylic resin, an epoxy resin or a melamine resin, may, for example, be employed.

Among such auxiliary fine particles, silica, titanium oxide, alumina, zinc oxide, various carbon black or conductive carbon black may, for example, be particularly preferably employed. Further, such auxiliary fine particles may include the above mentioned inorganic or organic fine particles, where the surface of the particles is treated by surface treatment, such as hydrophobic treatment by a treating agent such as a silane coupling agent, a titanate coupling agent, a silicone oil, a modified silicone oil, a silicone varnish, a fluorinated silane coupling agent, a fluorinated silicone oil or a coupling agent having amino groups or quaternary ammonium bases. Such treating agents may be used alone or in combination as a mixture of two or more of them.

The above auxiliary fine particles may have an average particle size of from 0.001 to 3 µm, preferably from 0.005 to 1 µm, and a plurality having different particle sizes may be used in combination. The average particle size of the auxiliary fine particles may be obtained by observation by an electron microscope.

As the above auxiliary fine particles, two or more different types of auxiliary fine particles may be used in combination. For example, surface-treated particles and non-surface-treated particles may be used in combination, or differently surface-treated particles may be used in combination. Otherwise, positively chargeable particles and negatively chargeable particles may be suitably combined for use. As a method for adding the auxiliary fine particles to the base toner particles, a method is known to add and blend them by means of a high speed stirring machine such as a Henschel mixer.

Other Additives

A number of other additives, known to those of ordinary skill in the art, may be used in embodiments of the present invention. For example, an additive may be used in order to improve various properties of the toner. Examples of such additives include metal oxides such as silicon oxide, aluminum oxide, titanium oxide, and hydrotalcite; carbon black, and fluorocarbon. Preferably, these additives may be hydrophobically treated.

Other additives that may be used to improve various properties of the toner include waxes such as metallocene waxes and polypropylene waxes.

A polishing agent may be used in accordance with embodiments of the present invention. Typical polishing agents include strontium titanate; metal oxides such as cerium oxide, aluminum oxide, magnesium oxide, and chromium oxide; nitrides such as silicon nitride; carbides such as silicon carbide; and metal salts such as calcium sulfate, barium sulfate, and calcium carbonate.

A lubricant may be used in accordance with embodiments of the present invention. Typically lubricants include fluororesin powders such as vinylidene fluoride and polytetrafluoroethylene; and fatty acid metal salts such as zinc stearate and calcium stearate.

Additionally, charge controlling particles include metal oxides such as tin oxide, titanium oxide, zinc oxide, silicon oxide, and aluminum oxide; and carbon black.

These additives may be used in an amount ranging from 0.1 to 10 parts by weight, preferably from 0.1 to 5 parts by weight, based on 100 parts by weight of the toner particles. These external additives may be used singly or in a combination.

Formulations

In preferred formulations, dispersions in accordance with the present invention may include a thermoplastic resin, a stabilizing agent (which may be polymeric or a surfactant), and at least one of a colorant and a magnetic pigment. A number of other additives, depending on the particular formulation, and the nature of the toner to be produced may also be used.

In certain preferred formulations, aqueous dispersions in accordance with the present invention may include a thermoplastic resin, optionally a stabilizing agent, and optionally an internal or external additive. In various embodiments, the thermoplastic resin and the stabilizing agent may be present in an amount of 45-99% by weight, based on a total weight of the dispersion Additives described above may be used in the compositions external to the dispersion particles, such as incorporated in the composition following the formation of the aqueous dispersion, or may be used in the compositions internal to the dispersion particles, such as incorporated in the compositions prior to or during the formation of the aqueous dispersion.

The amount and type of additive may depend on whether it is used as an internal or external additive. For example, when used as an internal additive, a wax may be used in an amount ranging from 0.1 to 20 parts by weight, but may be used as an external additive in an amount ranging from 0.1 to 10 parts by weight, due to the differences in surface exposure and other factors when additives are used as an internal additive.

In one embodiment, a thermoplastic resin, a stabilizing agent, and at least one of a colorant and a magnetic pigment are melt-kneaded in an extruder along with water and a neutralizing agent, such as ammonia, potassium hydroxide, or a combination of the two to form a dispersion compound. The additives may be mixed with the thermoplastic resin either during or prior to the formation of the dispersion and/or extrusion. Those having ordinary skill in the art will recognize that a number of other neutralizing agents may be used. In some embodiments, the at least one of a colorant and a magnetic pigment may be added after blending the thermoplastic resin and stabilizing agent. In other preferred embodiments, the at least one of a colorant and a magnetic pigment may be added after the dispersion is formed. In addition, any other suitable additive (such as any of those discussed above) may be added to the composition prior to the formation of the dispersion.

In one embodiment, a thermoplastic resin, a stabilizing agent, if used, and optionally at least one of an internal additive are melt-kneaded along with water and a neutralizing agent, such as ammonia, potassium hydroxide, or a combination of the two to form an aqueous dispersion compound. The internal additives may be mixed with the thermoplastic resin either during or prior to the formation of the aqueous dispersion and/or extrusion. Those having ordinary skill in the art will recognize that a number of other neutralizing agents may be used, as described above. In some embodiments, an internal additive may be added after blending the thermoplastic resin and stabilizing agent, if used. In other preferred embodiments, an external additive may be added after the aqueous dispersion is formed. In addition, any other suitable additives (such as any of those discussed above) may be added to the composition prior to, during, or after the formation of the aqueous dispersion.

In another embodiment, a thermoplastic resin, such as a self-stabilizing resin, and at least one of a colorant and a magnetic pigment are melt-kneaded in an extruder along with water and a neutralizing agent, such as ammonia, potassium hydroxide, or a combination of the two to form a dispersion compound. In yet another embodiment, a thermoplastic resin, a stabilizing agent, and at least one of a colorant and a magnetic pigment are melt-kneaded in an extruder along with water without use of a neutralizing agent to form a dispersion compound.

In another embodiment, a thermoplastic resin, such as a self-stabilizing resin, and optionally at least one internal additive are melt-kneaded along with water and a neutralizing agent, such as ammonia, potassium hydroxide, or a combination of the two to form an aqueous dispersion compound. In yet another embodiment, a thermoplastic resin, a stabilizing agent, and optionally at least one internal additive are melt-kneaded in an extruder along with water without use of a neutralizing agent to form an aqueous dispersion compound.

Any melt-kneading means known in the art may be used. In some embodiments, a kneader, a BANBURY® mixer, a single-screw extruder, or a multi-screw extruder is used. A process for producing the dispersions in accordance with the present invention is not particularly limited. Any reference to use of an extruder herein is not intended to be a limitation on the present invention. One preferred process, for example, is a process comprising melt-kneading the above-mentioned components according to U.S. Pat. No. 5,756,659 and U.S. Pat. No. 6,455,636, which are herein incorporated by reference in their entirety. An alternative example in which an extruder is not required allows for the mechanical dispersion to be formed in a high shear mixer. The high shear mixer may be specifically applicable to dispersions using polyesters and some styrenic copolymers, for example. In some embodiments, an extruder, such as used for melt blending, may be coupled to a disperser, such as used for emulsification, as described in U.S. Pat. No. 6,512,024, which is incorporated herein by reference.

FIG. 1 schematically illustrates an extrusion apparatus that may be used in embodiments of the invention. An extruder 20, in certain embodiments a twin screw extruder, is coupled to a back pressure regulator, melt pump, or gear pump 30. Embodiments also provide a base reservoir 40 and an initial water reservoir 50, each of which includes a pump (not shown). Desired amounts of base and initial water are provided from the base reservoir 40 and the initial water reservoir 50, respectively. Any suitable pump may be used, but in some embodiments a pump that provides a flow of about 150 cc/min at a pressure of 240 bar is used to provide the base and the initial water to the extruder 20. In other embodiments, a liquid injection pump provides a flow of 300 cc/min at 200 bar or 600 cc/min at 133 bar. In some embodiments, the base and initial water are preheated in a preheater.

Thermoplastic resin in the form of pellets, powder or flakes is fed from the feeder 80 to an inlet 90 of the extruder 20 where the thermoplastic resin is melted or compounded. In some embodiments, the dispersing agent is added to the thermoplastic resin through and along with the thermoplastic resin and in other embodiments, the dispersing agent is provided separately to the twin screw extruder 20. The thermoplastic resin melt is then delivered from the mix and convey zone to an emulsification zone of the extruder where the initial amount of water and base from the reservoirs 40 and 50 is added through inlet 55. In some embodiments, dispersing agent may be added additionally or exclusively to the water stream. In some embodiments, the emulsified mixture is further diluted with additional water through inlet 95 from reservoir 60 in a dilution and cooling zone of the extruder 20. Typically, the dispersion is diluted to at least 30 weight percent water in the cooling zone. In addition, the diluted mixture may be diluted any number of times until the desired dilution level is achieved. In some embodiments, water is not added into the twin screw extruder 20 but rather to a stream containing the resin melt after the melt has exited from the extruder. In this manner, steam pressure build-up in the extruder 20 is eliminated.

Advantageously, by using an extruder in certain embodiments, the thermoplastic resin and the stabilizing agent may be blended in a single process to form a dispersion. Also, advantageously, by using one or more of the stabilizing agents listed above, the dispersion is stable with respect to the additives. The process of forming the aqueous dispersions disclosed herein may be solvent-free, reducing environmental concerns and cost. Additionally, additives may be concurrently homogeneously blended with the thermoplastic resins, providing additional cost and performance benefits.

Dispersions formed in accordance with embodiments of the present invention are characterized as having an average particle size of between about 0.05 to about 10 microns. In other embodiments, the dispersion may have an average particle size between about 0.05 to about 8.0 microns. In other embodiments, dispersions have an average particle size of from about 0.1 to about 6.0 microns. As used herein, "average particle size" refers to the volume-mean particle size. In order to measure the particle size, laser-diffraction techniques may be employed, for example. A particle size in this description refers to the diameter of the polymer in the dispersion. For polymer particles that are not spherical, the diameter of the particle is the average of the long and short axes of the particle. Particle sizes can be measured, for example, on a Beckman-Coulter LS230 laser-diffraction particle size analyzer or other suitable device. In one embodiment, the desired particle sizes may be obtained by forming very small particles and aggregating these to the desired particle size.

After forming the dispersion, at least a portion of the water may be removed to form toner particles. In selected embodiments, substantially all of the water may be removed to form base toner particles. In one embodiment, drying of the dispersion may be accomplished by spray drying the dispersion. As is known, spray drying involves the atomization of a liquid feedstock into a spray of droplets and contacting the droplets with hot air in a drying chamber. The sprays are typically produced by either rotary (wheel) or nozzle atomizers. Evaporation of moisture from the droplets and formation of dry particles proceed under controlled temperature and airflow conditions. Powder is discharged substantially continuously from the drying chamber. Operating conditions and dryer design are selected according to the drying characteristics of the product and powder specification. Other drying techniques known in the art may also be used, including fluid bed drying, vacuum drying, radiant drying, and flash drying, among others.

Thus, in one embodiment, a dispersion may be formed, and shipped to another location, where the dispersion is subjected to a post-treatment process such as spray drying to form a toner powder.

After forming the aqueous dispersion, at least a portion of the water may be removed to form toner particles. In selected embodiments, substantially all of the water may be removed to form base toner particles. In one embodiment, drying of the aqueous dispersion may be accomplished by spray drying the aqueous dispersion. Other drying techniques known in the art may also be used, including fluid bed drying, vacuum drying, radiant drying, and flash drying, among others.

In addition to drying of the aqueous dispersion particles, forming toner particles from aqueous dispersions may also include the steps of washing and filtering to result in particles useful in toners according to embodiments disclosed herein. In some embodiments, the washing may be performed using a neutral or acidic wash medium, such as water or an aqueous mixture having a pH of about 4 to less 7. Wash media may also include organic solvents in embodiments disclosed herein. Washing, for example, may be used to remove surfactants and other unwanted residual components from the resulting aqueous dispersion particles. In addition, by adjustment of the pH of the wash water, modification of surface acid groups may be accomplished on the aqueous dispersion particles. For example, negatively charged carboxylate salt groups may be converted to neutral carboxylic groups once the particles have been formed.

Thus, in one embodiment, an aqueous dispersion may be formed, and shipped to another location, where the aqueous dispersion is subjected to a post-treatment process such as spray drying to form a toner powder.

In some embodiments, aqueous dispersion particles formed by the above described processes may be aggregated and/or coalesced to form toner particles. Any suitable dispersion aggregation process may be used in forming the aggregated dispersion particles. In some embodiments, the aggregating processes may include one or more of the steps of a) aggregating an emulsion containing binder, optionally one or more colorants, optionally one or more surfactants, optionally a wax, optionally a coagulant and one or more additional optional additives to form aggregates, b) subsequently coalescing or fusing the aggregates, and c) recovering, optionally washing, and optionally drying, the obtained aggregated particles.

One embodiment of an aggregation process includes forming an aqueous dispersion compound including a thermoplastic resin and 0 to 5 weight percent of a stabilizing agent, optional colorant, optional additives, and an aggregating agent in a vessel. The mixture is then stirred until homogenized and heated to a temperature of, for example, about 50° C. The mixture may be held at such temperature for a period of time to permit aggregation of the toner particles to the desired size. Once the desired size of aggregated toner particles is achieved, the pH of the mixture may be adjusted in order to inhibit further aggregation. The toner particles may be further heated to a temperature of, for example, about 90° C. and the pH lowered in order to enable the particles to coalesce and spherodize. The heater is then turned off and the reactor mixture allowed to cool to room temperature, at which point the aggregated and coalesced toner particles are recovered and optionally washed and dried.

Any aggregating agent capable of causing complexation may be used. Both alkali earth metal and transition metal salts may be used as aggregating agents. Examples of the alkali (II) salts that may be used include beryllium chloride, beryllium bromide, beryllium iodide, beryllium acetate, beryllium sulfate, magnesium chloride, magnesium bromide, magnesium iodide, magnesium acetate, magnesium sulfate, calcium chloride, calcium bromide, calcium iodide, calcium acetate, calcium sulfate, strontium chloride, strontium bromide, strontium iodide, strontium acetate, strontium sulfate, barium chloride, barium bromide, and barium iodide. Examples of transition metal salts or anions that may be used include acetates, acetoacetates, sulfates of vanadium, niobium, tantalum, chromium, molybdenum, tungsten, manganese, iron, ruthenium, cobalt, nickel, copper, zinc, cadmium, silver or aluminum salts such as aluminum acetate, polyaluminum chloride, aluminum halides, mixtures thereof and the like.

In some embodiments, the aggregated particles may have a volume average diameter of less than 30 microns; from about 0.1 to about 15 microns in other embodiments; and from about 1 to about 10 microns in yet other embodiments. Once the aggregate particles reach the desired size, the resulting suspension may be allowed to coalesce. This may be achieved by heating to a temperature at or above the glass transition temperature of the primary thermoplastic resin used in the aqueous dispersion.

The aggregate particles may be removed from the suspension, such as by filtration, and subjected to washing/rinsing with, for example, water to remove residual aggregating agent, and drying, to obtain toner composition particles comprised of resin, wax, if used, and optional additives, such as colorants and other additives described above. In addition, the toner composition particles may be subjected to classifying, screening, and/or filtration steps to remove undesired coarse particles from the toner composition.

In select embodiments, it is advantageous to add auxiliary fine particles to the base toner particles in order to improve the fluidity, the electrification stability, or the blocking resistance at a high temperature, etc. The auxiliary fine particles to be fixed on the surface of the base toner particles may be suitably selected for use among various inorganic or organic fine particles.

As the inorganic fine particles, various carbides such as silicon carbide, boron carbide, titanium carbide, zirconium carbide, hafnium carbide, vanadium carbide, tantalum carbide, niobium carbide, tungsten carbide, chromium carbide, molybdenum carbide and calcium carbide, various nitrides such as boron nitride, titanium nitride and zirconium nitride, various borides such as zirconium boride, various oxides such as titanium oxide, calcium oxide, magnesium oxide, zinc oxide, copper oxide, aluminum oxide, cerium oxide, silica and colloidal silica, various titanate compounds such as calcium titanate, magnesium titanate and strontium titanate, phosphate compounds such as calcium phosphate, sulfides such as molybdenum disulfide, fluorides such as magnesium fluoride and carbon fluoride, various metal soaps such as aluminum stearate, calcium stearate, zinc stearate and magnesium stearate, talc, bentonite, various carbon black and conductive carbon black, magnetite and ferrite, may, for example, be employed. As the organic fine particles, fine particles of a styrene resin, an acrylic resin, an epoxy resin or a melamine resin, may, for example, be employed.

Among such auxiliary fine particles, silica, titanium oxide, alumina, zinc oxide, various carbon black or conductive carbon black may, for example, be particularly preferably employed. Further, such auxiliary fine particles may include the above mentioned inorganic or organic fine particles, where the surface of the particles is treated by surface treatment, such as hydrophobic treatment by a treating agent such as a silane coupling agent, a titanate coupling agent, a silicone oil, a modified silicone oil, a silicone varnish, a fluorinated silane coupling agent, a fluorinated silicone oil or a coupling agent having amino groups or quaternary ammonium bases. Such treating agents may be used alone or in combination as a mixture of two or more of them.

The above auxiliary fine particles may have an average particle size of from 0.001 to 3 μm, preferably from 0.005 to 1 μm, and a plurality having different particle sizes may be used in combination. The average particle size of the auxiliary fine particles may be obtained by observation by an electron microscope.

As the above auxiliary fine particles, two or more different types of auxiliary fine particles may be used in combination. For example, surface-treated particles and non-surface-treated particles may be used in combination, or differently surface-treated particles may be used in combination. Otherwise, positively chargeable particles and negatively chargeable particles may be suitably combined for use.

As a method for adding the auxiliary fine particles to the base toner particles, a method is known to add and blend them by means of a high speed stirring machine such as a Henschel mixer. However, in order to improve the blocking resistance at a high temperature, it is preferred to have the auxiliary fine particles fixed on the surface of the base toner particles. In the present invention, fixing means an addition method employing an apparatus capable of exerting a compression sharing stress (hereinafter referred to as a compression shearing treatment apparatus) or an apparatus capable of melting or softening the surface of the base toner particles (hereinafter referred to as a particle surface-melting treatment apparatus). By such fixing treatment, the auxiliary fine particles may be firmly fixed to the surface of the base toner particles without substantial pulverization of the base toner particles, whereby blocking resistance during storage at a high temperature may be improved, and it is possible to produce a toner which is less likely to bring about fusion to components of a copying machine or a printer even in a continuous copying operation.

The above-mentioned compression shearing treatment apparatus is constructed to have a narrow clearance defined by a head surface and a head surface, a head surface and a wall surface, or a wall surface and a wall surface, which are mutually mobile while a distance is maintained, so that the particles to be treated are forcibly passed through the clearance, whereby a compression stress and a shearing stress will be exerted to the surface of the particles without substantially pulverizing them. As the compression shearing treatment apparatus to be used, a mechanofusion apparatus manufactured by Hosokawa Micron K.K., may, for example, be mentioned.

The above-mentioned particle surface-melting treatment apparatus is usually constructed so that a mixture of the base toner fine particles and the auxiliary fine particles is instantaneously heated to a temperature of at least the melting-initiation temperature by means of, for example, a hot air stream thereby to have the auxiliary fine particles fixed. As the particle surface-melting treatment apparatus to be used, a surfusing system manufactured by Nippon Neumatic K.K. may, for example, be mentioned.

In another embodiment, the thermoplastic resin may be formed in a continuous or in situ polymerization process. In this embodiment, a mechanical dispersion or emulsion of monomers in an aqueous solution may be formed. Polymerization of the monomers may occur either during or after the emulsification. Additives may be added to the system either during or after the emulsification and/or polymerization. In another embodiment, a resin produced by a continuous polymerization process may be directly coupled to emulsification and finishing processes.

Applications

The toners described above may be used in cartridges, process cartridges, and image forming apparatus. For example, process cartridges using toners described herein may include photoconductors, charging units, developing units, cleaning units, and may be attached to the main body of an image forming apparatus in an attachable and detachable manner. As another example, toner cartridges may include an electrostatic image bearing member, and a developing means to form a visible image by developing with a toner a latent electrostatic image formed on the image bearing member. Image forming apparatus may include a latent electrostatic image bearing member, a latent electrostatic image forming means, a developing means for developing the electrostatic image and forming a visible image, a transferring means that transfers the visible image to a substrate medium, and a fixing means the fixes the transferred image to the substrate medium. Cartridges, process cartridges, and image forming apparatus are disclosed in, for example, U.S. Pat. Nos. 7,177,582, 7,177,570, 7,169,525, 7,166,401, 7,161,612, 6,477,348, 5,974,281, and others.

EXAMPLES

Embodiments of the present invention may have a thermoplastic resin component (A) plus stabilizing agent in an amount of about 45% to about 99% by weight of the overall toner composition. In other embodiments, this may range from 60% to 80%. Further, embodiments of the present invention may use colorant in an amount from greater than about 0% to about 30% by weight of the overall toner composition. Still further, embodiments of the present invention may use magnetic pigment in an amount from greater than about 0% to about 50% by weight of the overall toner composition. Still further, embodiments of the present invention may use a number of additional additives, in an amount of greater than about 0% to about 10% by weight of the overall toner composition.

In one embodiment, the toner may include 5-15 wt. % black pigment, 2-5 wt. % polyester resin, 70-85 wt. % styrene butyl acrylate resin, 0.2-0.8 wt. % CCA, 5-15 wt. % wax (ester wax), 0.5-2 wt. % silica (may be added after toner is made), 0.5-2 wt. % TiO2 (may be added after toner is made), and 0.5-2 wt. % surfactant (based on solids). In a particular embodiment, the toner may include 9 wt. % black pigment, 3.5 wt. % polyester resin, 77 wt. % styrene butyl acrylate resin, 0.5 wt. % CCA, 10 wt. % wax (ester wax), 1 wt. % silica, 1 wt. % TiO2, and 1 wt. % surfactant (based on solids).

In one embodiment, a cyan color toner may be prepared by forming an aqueous dispersion with a 79 wt. % styrene butyl acrylate copolymer, 2 wt. % zinc salicylic acid, a charge control agent, 4 wt. % polypropylene wax, 1 wt. % silica powder, 9.5 wt. % pigment dispersion of 30.8 wt. % BFD-1121 pigment blue, 60 wt. % water, and 9.2 wt. % acrylic polymer stabilizer, and 4.5 wt. % Keystone Blue GN, a dry pigment available from Keystone Aniline Co. The mixture may be extruded and dried to remove excess water. Post-additive agents that may be included to enhance flow control include 1 wt. % hydrophobic silane-treated silica and 0.7 wt. % hydrophobic titanium dioxide.

In another embodiment, a yellow color toner may be prepared by forming an aqueous dispersion with a 77 wt. % styrene butyl acrylate copolymer, 2 wt. % zinc salicylic acid, a charge control agent, 4 wt. % polypropylene wax, 1% silica powder, 11.5 wt. % pigment dispersion of 30.8 wt. % YFD-4244 pigment yellow, 60 wt. % water, and 9.2 wt. % acrylic polymer stabilizer, and 4.5 wt. % Clarient Permanent Yellow 17, a dry pigment available from Keystone Aniline Co. The mixture may be extruded and dried to remove excess water. Post-additive agents that may be included to enhance flow control include 1 wt. % hydrophobic silane-treated silica and 0.7 wt. % hydrophobic titanium dioxide.

In one embodiment, a magenta color toner may be prepared by forming an aqueous dispersion with a 69 wt. % styrene butyl acrylate copolymer, 2 wt. % zinc salicylic acid, a charge control agent, 4 wt. % polypropylene wax, 21 wt. % pigment dispersion of 30.8 wt. % QFD-1146 pigment red, 60 wt. % water, and 9.2 wt. % acrylic polymer stabilizer, and 4 wt. % Clarient Hostacopy M-501 Pigment Red 122, a dry pigment available from Keystone Aniline Co. The mixture may be extruded and dried to remove excess water. Post-additive agents that may be included to enhance flow control include 1 wt. % hydrophobic silane-treated silica and 0.7 wt. % hydrophobic titanium dioxide.

In yet another embodiment, a magnetic black toner may be prepared by forming an aqueous dispersion with 100 parts polyester, 95 parts magnetite, 1 part polydimethylsiloxane, and 1 part conductive carbon black.

Comparative Example 1

The desired amount of stabilizer and resin are weighed into a 300 ml pressurizable batch mixer where they are heated and then stirred using a Cowles blade. After reaching the mixing temperature of 140° C., water is pumped in at a rate of 5 ml/min while increasing the stirring rate to 1800 rpm. Upon addition of 120 ml water the sample is cooled for 30 minutes with continued stirring. At room temperature the sample is removed and its particle size measured. Thus, 50 g of polyester resin (Reichhold FineTone T382ES, acid number 21 mg KOH/g) is added to the mixer with 6.3 g of 25% w/w KOH aqueous solution to achieve about 150% neutralization on a molar basis. The mixer is heated to 140° C. while stirring, and 120 g of water is pumped in at a rate of 5 ml/min with additional stirring. The mixture is then cooled and the aqueous dispersion product mean volumetric particle size is found to be 0.16 microns.

The procedure in Comparative Example 1 was used to prepare the emulsions containing polyester resins as listed in Table 1.

TABLE 1

| Resin phase components | Stabilizer phase components | Molar Neutralization (Percent) | Vol. mean particle size (microns) |
| --- | --- | --- | --- |
| 50 g FineTone T382ES (acid number 21) | 2.1 g of 25% w/w aq. KOH solution | 50 | Not dispersed |
| 50 g FineTone T382ES (acid number 21) | 4.2 g of 25% w/w aq. KOH solution | 100 | 450 |
| 50 g FineTone T382ES (acid number 21) | 6.3 g of 25% w/w aq. KOH solution | 150 | 0.16 |

INVENTIVE EXAMPLES

Example 1

Toner components are fed into a twin screw extruder at the rate of 45.5 g/min polyester resin (Reichhold FineTone T-382-ES, acid number 21 mg KOH/g), 6.2 g/min pigment masterbatch (40% Pigment Red 122, HOSTACOPY E02-M101, Clariant), and 4.9 g/min wax (Baker Petrolite POLYWAX 400). The components are melted at about 11° C. and forwarded to the emulsification zone, where an aqueous solution of 1.5% 2-amino-2-methyl-1-propanol is added at a rate of 27.4 g/min to partially neutralize the resin and stabilize the resulting emulsion (neutralization level of about 26% on a molar basis). The resulting mixture is diluted with additional water fed at 62 g/min and subsequently cooled below 100° C. before exiting the extruder into an open collection vessel. The resulting product had a volumetric mean particle size of 4.9 microns and a solids level of 39%. The emulsion is washed, filtered, and dried to result in a powder useful in producing toner. Microscopy shows that the pigment and wax are well-dispersed within the particles.

Example 2

Toner components are dry blended using a HENSCHEL mixer in the proportions 95% polyester resin (Reichhold FineTone T-382-ES) and 5% pigment yellow 180 (Toner Yellow HG, Clariant). The powder blend is fed to a twin screw extruder at a rate of 51 g/min along with 4 g/min POLYWAX 400 (Baker Petrolite). The components are melted at about 110° C. and forwarded to the emulsification zone where an aqueous solution of 3.3% ethanolamine is added at a rate of 26 ml/min to partially neutralize and stabilize the resulting emulsion (neutralization level of about 34% on a molar basis). The resulting mixture is diluted with additional water fed at 44 g/min and cooled below 100° C. before exiting the extruder. The resulting product had a volumetric mean particle size of 5.4 microns and a solids level of 44%.

Example 3

Polyester resin (Reichhold FINETONE T-382-ES, acid number 21 mg KOH/g) is melted at 140° C. and fed to a rotor-stator mixer at 50 g/min. A solution of 25% (w/w) KOH is fed at 2.1 g/min and blended with additional water pumped at a rate of 30 g/min and injected into the mixer to create an emulsion. The mixer speed is set at about 750 rpm. The resulting emulsion is fed to a second rotor-stator mixer (mixer speed set at about 500 rpm) where an additional 50 g/min water is added, diluting and cooling the emulsion to less than 100° C. before exiting the mixing system into an open collection vessel. The neutralization level of the acid with base is about 50% on a molar basis, which yields a volume average particle size of 0.11 microns. The emulsion has a final solids concentration of 38% based on weight.

Example 4

Polyester resin (Reichhold FINETONE T-6694, acid number 13 mg KOH/g) is melted at 140° C. and fed to a rotor-stator mixer at 50 g/min. A solution of 25% (w/w) AMP-95 is fed at 1.1 g/min, DOWFAX 2A1 (48% w/w) is fed at 1.1 g/min, and additional water at a rate of 22.5 g/min are injected into the mixer to create an emulsion. The mixer speed is set at about 750 rpm. The resulting emulsion is fed to a second rotor-stator mixer (mixer speed set at about 500 rpm) where an additional 54 g/min water is added, diluting and cooling the emulsion to less than 100° C. before exiting the mixing system into an open collection vessel. The neutralization level of the acid with base is about 27% on a molar basis, which yields a volume average particle size of 0.19 microns. The emulsion has a final solids concentration of 39% based on weight.

Example 5

Polyester resin (Reichhold FINETONE T-382-ES, acid number 21 mg KOH/g) is fed into a twin screw extruder at 47 g/min along with 4 g/min Baker-Petrolite POLYWAX 400 polyethylene wax. The polyester resin and wax are melt blended at about 110° C. and then merged in a high shear emulsification zone with an aqueous solution of 10.6% triethanolamine at a rate of 14.4 g/min to achieve about 60% neutralization on a molar basis. Downstream from the emulsification zone, additional water is added to dilute the emulsion to 40% solids. The polyester-wax emulsion is cooled and exits the extruder into an open collection vessel. The mean volume average particle size of the resulting product is 0.31 microns.

Example 6

Polyester resin (Reichhold FINETONE T-382-ES, acid number 21 mg KOH/g) is fed into a twin screw extruder at 44 g/min along with 6.3 g/min of a cyan pigment masterbatch in the same resin (40% Pigment Blue 15:3, HOSTACOPY BG-C101, Clariant). The pigment masterbatch and resin are melt blended at about 110° C. and then merged in a high shear emulsification zone where a stream of 11.3% triethanolamine is added at a rate of 13.9 g/min to achieve neutralization of about 60% on a molar basis. Downstream from the emulsification zone, additional water is added to dilute the product to 35% solids. The polyester-wax emulsion is cooled and exits the extruder into an open collection vessel. The volume average particle size of the resulting polyester-pigment emulsion was 0.19 microns.

Example 7

Polyester resin A (Reichhold FINETONE T-382-ES, acid number 21 mg KOH/g) is fed at a rate of 30 g/min and polyester resin B (Dianal DIACRON ER 535, acid number 7 mg KOH/g) is fed separately at a rate of 30 g/min into a twin screw extruder where they are melt blended at about 110° C. and forwarded into the emulsification zone. An aqueous solution of 8.8% triethanolamine is added at a rate of 16.5 g/min to partially neutralize the resin and stabilize the resulting emulsion (neutralization level about 66% on a molar basis). The resulting mixture is diluted with additional water and subsequently cooled below 100° C. before exiting the extruder into an open collection vessel. The volumetric mean particle size of the emulsion is 0.24 microns, with a final solids level of 40% based on weight.

Example 8

A toner particle is formed by first mixing 82 parts of the polyester emulsion from Example 2 with 10 parts Baker-Petrolite LX1381 wax aqueous dispersion, 8 parts carbon black aqueous dispersion, and 0.50 parts polyaluminum chloride. The mixture is allowed to aggregate for 2 hours at 48° C., and then allowed to coalesce for 4 hours at 85° C. The final median particle size by volume of the toner particles is 6.1 microns.

Example 9

A toner particle is formed by first mixing 92 parts of the polyester-pigment aqueous dispersion from Example 5 with 8 parts aqueous wax dispersion, and 0.50 parts polyaluminum chloride. The mixture is allowed to aggregate for 1 hour at 48° C., and then the pH is adjusted to 8 using sodium hydroxide. After addition of 5% DOWFAX 2A1 surfactant (by dry weight of polymer) the particles are allowed to coalesce for 6 hours at 85° C. The final median particle size by volume of the toner particles is 5.5 microns.

Advantageously, embodiments disclosed herein may allow for a broad range of polymers to be used in toner compositions. For example, complex polymer blends may be used, such that a portion of the blend includes crystalline, semi-crystalline, and/or amorphous polymers, fractions of the polymer blends may include cross-linked fractions, branched fractions, and blends of multiple polymers, such as styrene butylacrylate blended with polyester polymers, may be used. In addition, blends of polymers having different molecular weight and/or glass transition temperatures may also be used in order to adjust the properties of the resulting toners. This flexibility allows the toner manufacturer to adjust important toner resin properties such as pigment wetting, melt rheology, hot and cold offset, adhesion, blocking resistance, and fusing temperature.

Further, embodiments disclosed herein may involve a solvent-free process as aqueous dispersions of high viscosity polymers can be made. This provides both a cost and environmental benefit over prior art processes and toners. Further, polymerization is not needed, providing a monomer-free process, which is environmentally superior to other prior art processes. Further, embodiments may provide for smaller particle sizes and narrower particle size distributions than prior art processes.

Toners formed from the processes described herein may be more stable with respect to humidity. Low surfactant levels and no required sulfonation may result in a toner which is more environmentally stable with respect to generation and maintenance of triboelectric charge and additionally may allow for improved aggregation and coalescence. Further, the low to no surfactant required may reduce or eliminate the difficult and costly washing of the toner particles, an expensive process step including large amounts of wash water which is typically required to provide quality toner products. Additionally, the low acid values may also result in improved environmental stability and tribocharge properties of the resulting toners compared to prior art approaches. Further, low levels of base and relatively short times at elevated temperatures used for embodiments disclosed herein may result in reduced hydrolysis or transesterification of polymers used to form the toner particles.

Example 10

Polyester resin (Reichold Fine-tone T-382-ES, acid number 21 mg KOH/g) was melted at 150° C. and fed into a rotor-stator mixer at 50 g/min. 25% (w/w) KOH solution was fed at 2.1 g/min and blended with additional water pumped at a rate 30 g/min and injected into the mixer to create the emulsion. The mixer speed was set at ~750 rpm. The resulting emulsion was fed to a second rotor-stator mixer (mixer speed set at ~500 rpm) where an additional 50 g/min of water was added. In this way the emulsion was diluted and cooled to less than 100° C. before exiting the mixing system into a collection vessel. The properties of the resulting dispersion can be found in Table 1.

Example 11

Polyester resin (Reichold Fine-tone T-382-ES-HMW, acid number 18 mg KOH/g) was melted at 160° C. and fed into a rotor-stator mixer at 50 g/min. 30% (w/w) KOH solution was fed at 1.1 g/min and blended with additional water pumped at a rate 16.5 g/min and injected into the mixer to create the emulsion. The mixer speed was set at ~800 rpm. The resulting emulsion was fed to a second rotor-stator mixer (mixer speed set at ~500 rpm) where an additional 55 g/min of water was added. In this way the emulsion was diluted and cooled to less than 100° C. before exiting the mixing system into a collection vessel. The properties of the resulting dispersion can be found in Table 1.

| Resin | Particle Size Dv (microns) | Solids (%) | Starting Powder Mw | Dispersion Mw (Δ) | pH |
|---|---|---|---|---|---|
| Fine-Tone T-382-ES | 0.11 | 38 | 13200 | 12400 (~6%) | 6.6 |
| Fine-Tone T-382-ES-HMW | 0.23 | 42 | 37800 | 35800 (~5%) | 6.7 |

Advantageously, embodiments disclosed herein allow for a broad range of polymers to be used in toner compositions. Further, embodiments disclosed herein may involve a non-solvent, monomer-free process, which is environmentally superior to prior art processes. Further, embodiments may provide for smaller particle sizes, and narrower particle size distributions than in the prior art.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A compound comprising:
   an aqueous dispersion, the dispersion consisting of the melt blending product of:
   (A) one or more polyesters having an acid number in the range of from 5 to 25 mg KOH/g;
   (B) up to 5 weight percent by weight of at least one stabilizing agent, based on the total weight of (A) and (B);
   (C) at least one wax, one colorant, and one magnetic pigment;
   (D) optionally one or more selected from the group consisting of auxiliary fine particles, a charge control agent, a lubricant, and a polishing agent; and
   (E) in the presence of water and one or more neutralizing agents selected from the group consisting of potassium hydroxide, sodium hydroxide and amine, and in the absence of any solvents, via an extruder, wherein said neutralizing agent is present in a sufficient amount to neutralize less than 90 percent on a molar basis of any acid groups in components (A) and (B), wherein the dispersion has an average volume diameter particle size from about 0.05 to about 8.0 microns, and wherein the combined amount of said one or more polyesters and said at least one stabilizing agent has an acid number of less than 25 mg KOH/g;
   wherein components A and B together are present in an amount of in the range of from 60 to 80% by weight, based on the weight of the dispersion;
   wherein the colorant is present in an amount in the range of from 0.5 to 20 parts per 100 parts of component A; and
   wherein the magnetic pigment is present in an amount in the range of from 40 to 150 parts per 100 parts of component A.

2. The compound of claim 1, wherein the one or more polyesters comprises at least one polyester formed by reacting an aliphatic diol with a diacid.

3. A toner formed from the compound of claim 1.

4. A cartridge or process cartridge comprising the toner of claim 3.

5. An image forming device for use with the process cartridge of claim 4.

6. A method for forming a toner, the method comprising:
   forming a compound, the compound comprising an aqueous dispersion, the dispersion consisting of the melt blending product of:
   (A) one or more polyesters having an acid number in the range of from 5 to 25 mg KOH/g;
   (B) up to 5 weight percent by weight of at least one stabilizing agent, based on the total weight of (A) and (B);
   (C) at least one wax, one colorant, and one magnetic pigment;
   (D) optionally one or more selected from the group consisting of auxiliary fine particles, a charge control agent, a lubricant, and a polishing agent; and
   (E) in the presence of water and one or more neutralizing agents selected from the group consisting of potassium hydroxide, sodium hydroxide and amine, and in the absence of any solvents, via an extruder, wherein said neutralizing agent is present in a sufficient amount to neutralize less than 90 percent on a molar basis of any acid groups in components (A) and (B), wherein the dispersion has an average volume diameter particle size from about 0.05 to about 8.0 microns, and wherein the combined amount of said one or more polyesters and said at least one stabilizing agent has an acid number of less than 25 mg KOH/g;
   wherein components A and B together are present in an amount of in the range of from 60 to 80% by weight, based on the weight of the dispersion;
   wherein the colorant is present in an amount in the range of from 0.5 to 20 parts per 100 parts of component A; and
   wherein the magnetic pigment is present in an amount in the range of from 40 to 150 parts per 100 parts of component A;
   removing at least a portion of the water in the dispersion to form toner particles.

7. The method of claim 6, further comprising post-treating the toner particles.

8. The method of claim 7, wherein the removing comprises spray-drying the compound.

9. The method of claim 6, wherein the compound further comprises at least one of auxiliary fine particles, a charge control agent, a lubricant, and a polishing agent.

10. The method of claim 6, wherein at least one of the one or more polyesters is formed by reacting an aliphatic diol with a diacid.

11. The method of claim 10, wherein the aliphatic diol comprises at least one of ethylene diethylene glycol, propylene glycol, dipropylene glycol, 1,3-propanediol, a butane diol, pentane diol, a hexane diol, a decane diol, and a dodecane diol.

* * * * *